US011029915B1

(12) United States Patent
Vercellotti et al.

(10) Patent No.: US 11,029,915 B1
(45) Date of Patent: Jun. 8, 2021

(54) OPTIMIZING AUDIO SIGNAL NETWORKS USING PARTITIONING AND MIXER PROCESSING GRAPH RECOMPOSITION

(71) Applicant: Avid Technology, Inc., Burlington, MA (US)

(72) Inventors: Paul A. Vercellotti, Albany, CA (US); Robert E. Majors, Bellingham, WA (US); Kyle M. Splittgerber, San Francisco, CA (US)

(73) Assignee: Avid Technology, Inc., Burlington, MA (US)

( * ) Notice: Subject to any disclaimer, the term of this patent is extended or adjusted under 35 U.S.C. 154(b) by 0 days.

(21) Appl. No.: 16/730,179

(22) Filed: Dec. 30, 2019

(51) Int. Cl.
*H04R 3/00* (2006.01)
*G06F 3/16* (2006.01)

(52) U.S. Cl.
CPC ............... *G06F 3/165* (2013.01); *H04R 3/00* (2013.01)

(58) Field of Classification Search
CPC .......... H04R 3/00; H04R 3/005; H04R 27/00; H04R 2227/003; H04R 2420/09; H04R 2420/01; H04R 25/43; H04H 60/04
USPC .......................................... 381/119, 109, 103
See application file for complete search history.

(56) References Cited

U.S. PATENT DOCUMENTS

| | | | | |
|---|---|---|---|---|
| 6,728,584 B1 * | 4/2004 | Duan | ..................... | H04H 60/04 381/119 |
| 9,031,262 B2 * | 5/2015 | Silfvast | ................... | H04H 60/04 381/119 |
| 9,319,792 B1 * | 4/2016 | Coleman | ................... | G06F 3/165 |
| 9,514,723 B2 * | 12/2016 | Silfvast | ..................... | G10H 1/18 |
| 10,770,045 B1 * | 9/2020 | Barram | ...................... | G10H 1/46 |
| 2012/0027229 A1 * | 2/2012 | Bruey | ...................... | H04R 3/00 381/119 |
| 2012/0195445 A1 * | 8/2012 | Inlow | ................... | G11B 27/038 381/119 |
| 2014/0064519 A1 * | 3/2014 | Silfvast | .................. | H04H 60/04 381/119 |
| 2014/0270636 A1 * | 9/2014 | Manes | ................. | G02B 6/4453 385/24 |

(Continued)

OTHER PUBLICATIONS

Apogee Electronics introduces New Ensemble 30×34 Thunderbold Audio Interface, Press Release, Oct. 7, 2014, 2 pages.

(Continued)

*Primary Examiner* — Disler Paul
(74) *Attorney, Agent, or Firm* — Oliver Strimpel

(57) ABSTRACT

An audio signal processing graph is automatically recomposed to optimize its properties by reassigning and instantiating its nodes on available locales such that the number of inter-locale connections is minimized and latency between inputs, such a performer's live input, and outputs, such as a monitored recording mix, is minimized. The recomposition exploits associative, commutative, and decomposition properties of certain node types, including mixer nodes. A graph recomposition may decompose a mixer node into a first stage instantiated by a software plug-in hosted by a computer running a digital audio workstation in a first locale, and a second stage assigned to an audio processing device in a second locale. Automatic signal graph recomposition occurs when the system is initialized, the graph is reconfigured, a new desired behavior of the graph is specified, or the available network resources are changed.

25 Claims, 50 Drawing Sheets

(56) References Cited

U.S. PATENT DOCUMENTS

2020/0304908 A1\* 9/2020 Mate ..................... H04R 5/04

OTHER PUBLICATIONS

Apogee Electronics Element Series Product Information, apogeedigital.com/products, 26 pages.
Apogee Electronics, FX Rack Plug-Ins Product Information, apogeedigital.com/products, 23 pages.
Antelope Audio announces Orion Studio Synergy Core Thunderbold 3 Audio Interface and Effects Processor, Press Release, Aug. 15, 2019, 8 pgs.
Antelope Audio Orion Studio Synergy Product Information, antelopeaudio.com/products, 21 pages.
Universal Audio introduces Apollo high resolution audio interface, Press Release, Jan. 19, 2012, 3 pages.
Universal Audio Interfaces Product Information, uaudio.com/audio-interfaces, 10 pages.
Waves Audio introduces SoundGrid Server-C, Press Release, Nov. 5, 2018, 2 pgs.
Waves Audio introduces SoundGrid Server-One-C, Press Release, Nov. 5, 2018, 2 pgs.
Waves SoundGrid Systems Product Information, www.waves.com/soundgrid-systems, 3 pages.

\* cited by examiner

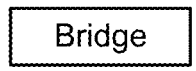 Basic connections between nodes in the same locale

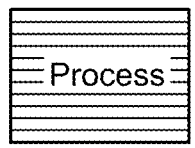 Bridge connections between locales

Shaded objects are only supported on a particular locale: horizontal shading for locale 1 and vertical shading for locale 2.

Unshaded objects are supported on multiple locales, and may be assigned to any of the locales on which they are supported. The outline indicates their assigned locale: dashed outline for locale 1 and dashed-dot outline for locale 2.

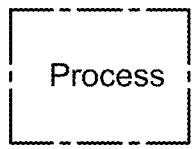 Processing node which must be placed at locale 1

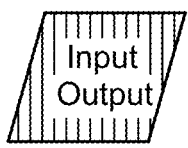 Processing supported on multiple locales and assigned to locale 2

 Input or output which must be placed at locale 2

Mixing node supported on multiple locales and assigned to locale 1

FIG. 31

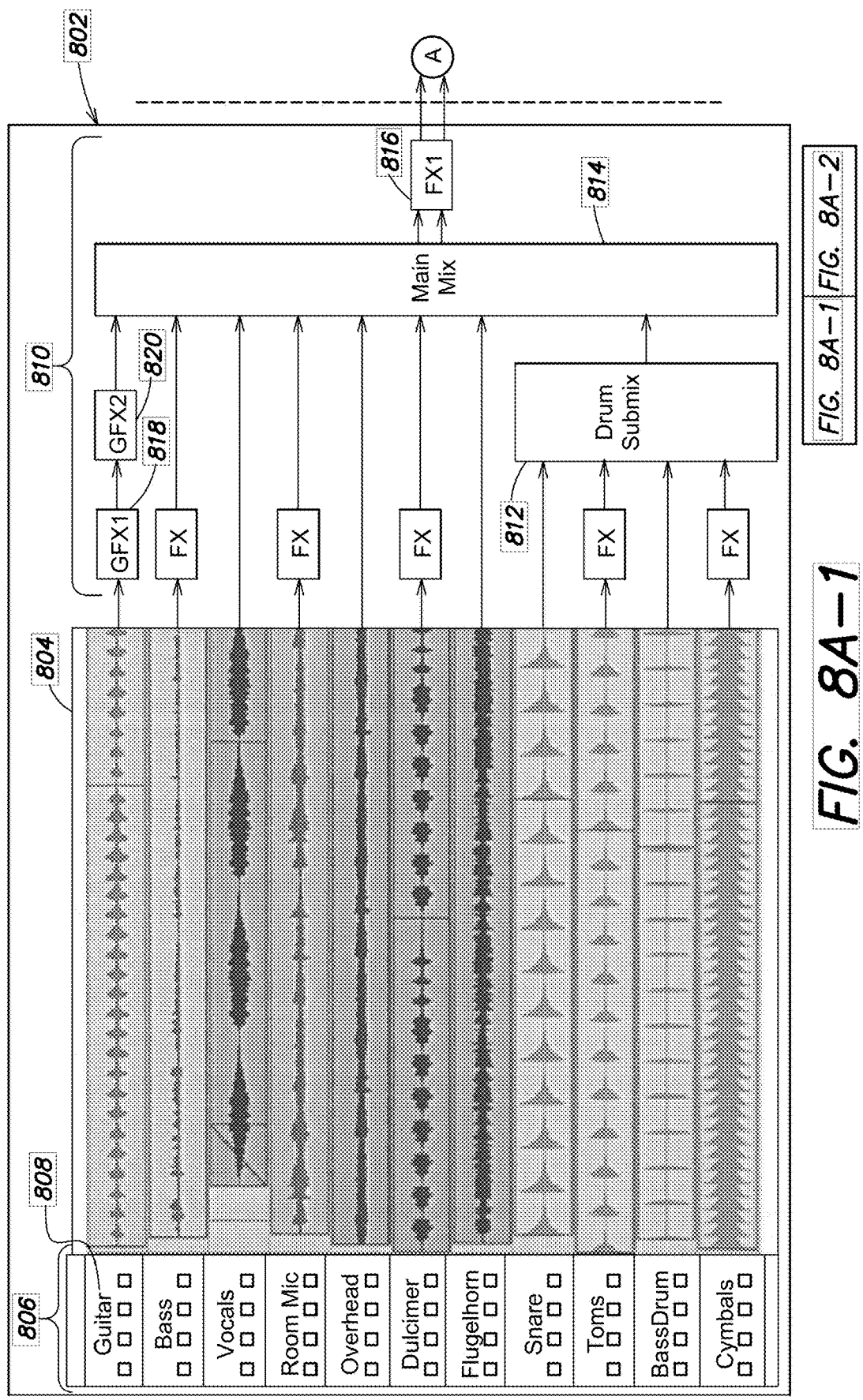

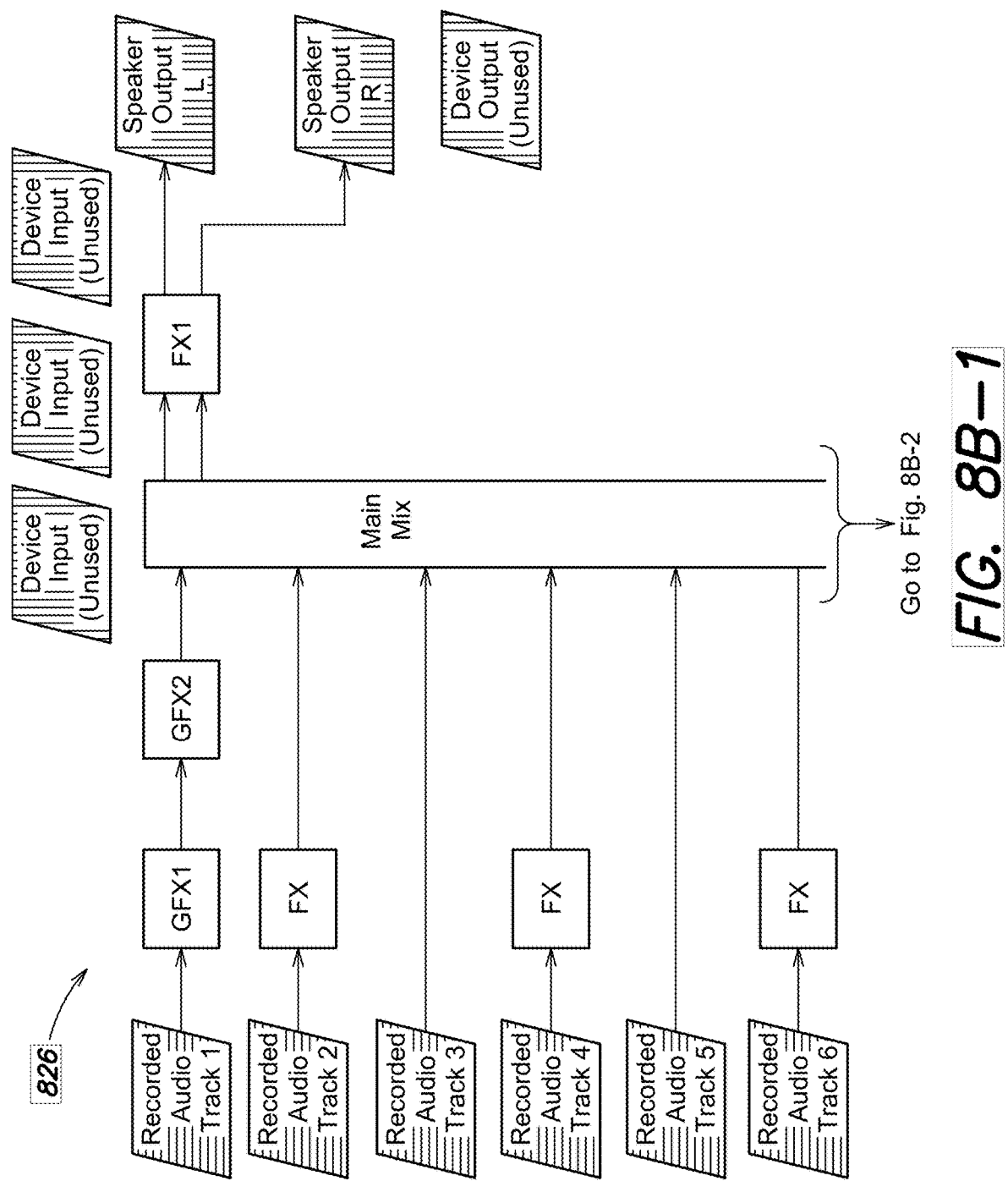

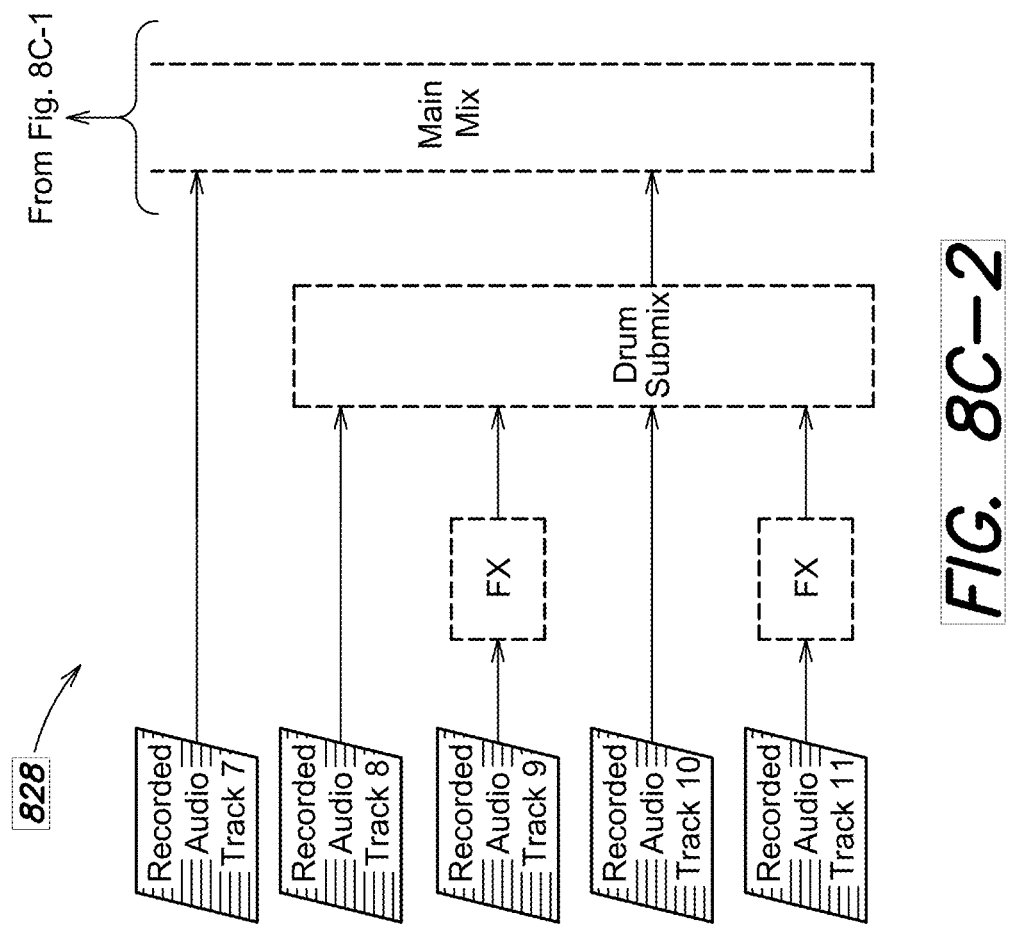

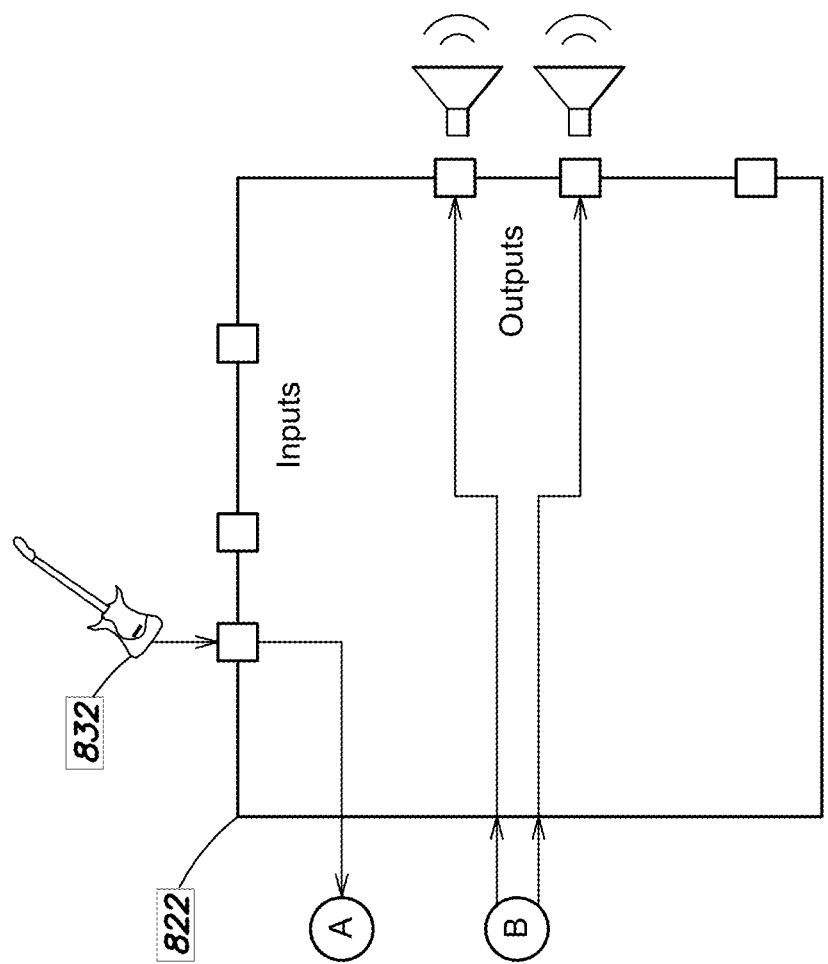

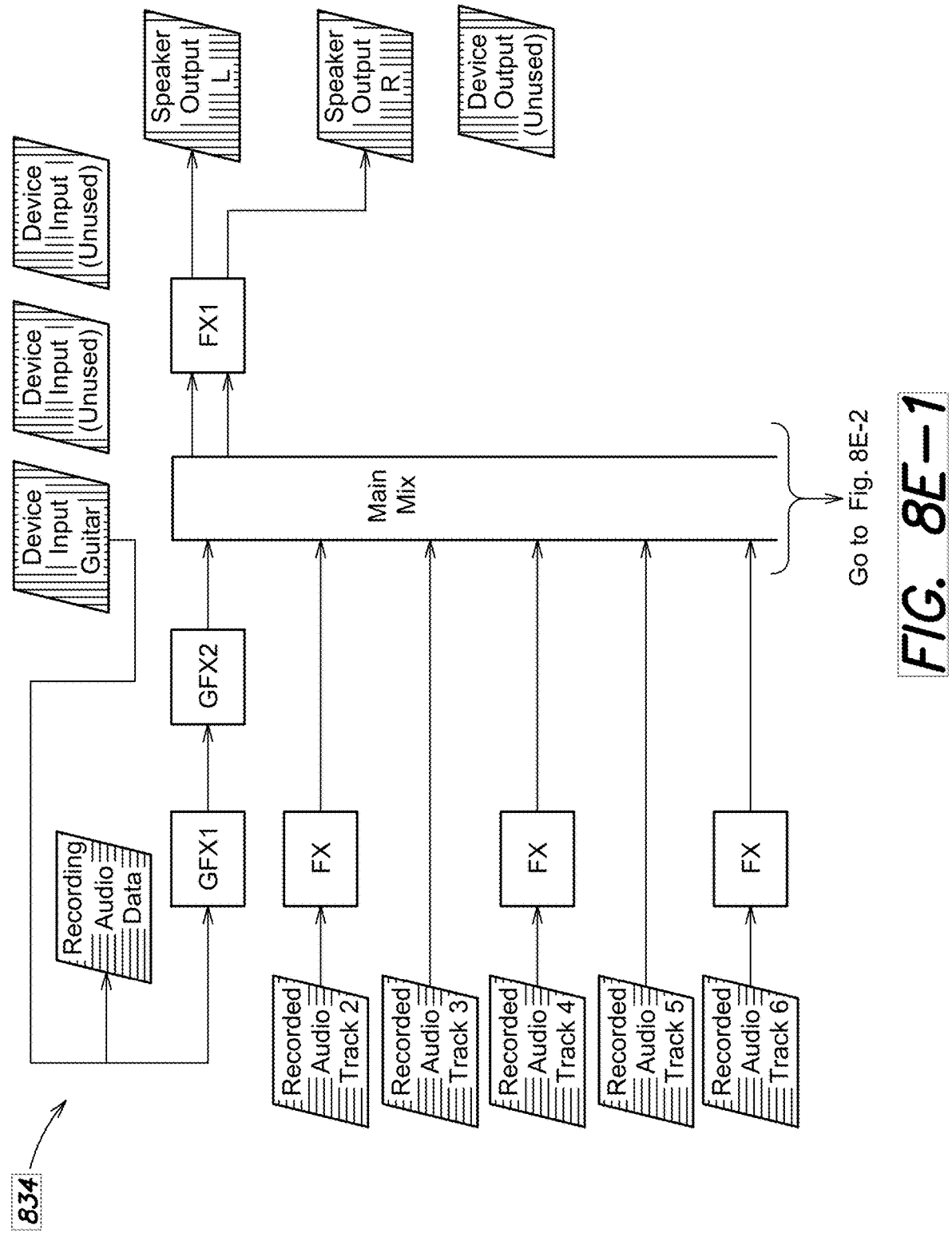

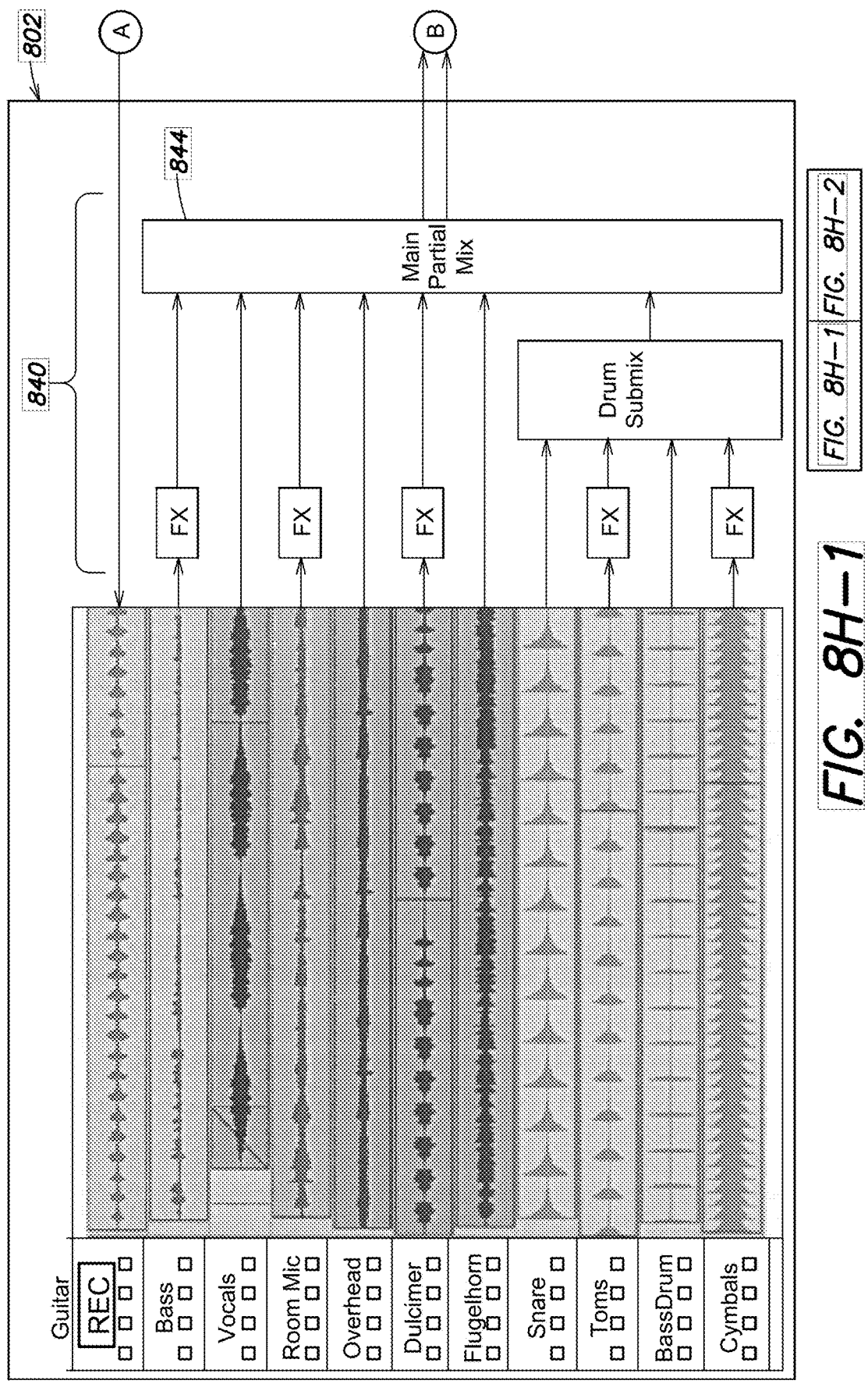

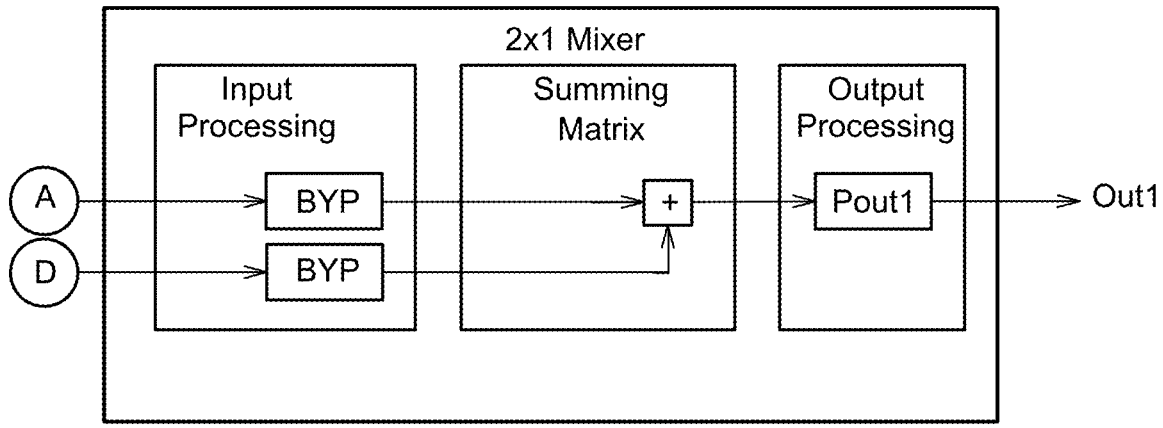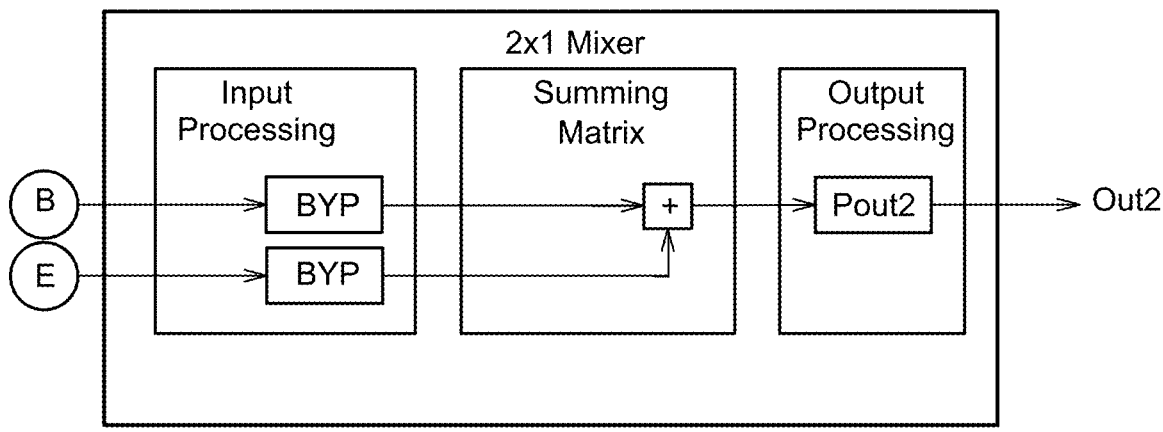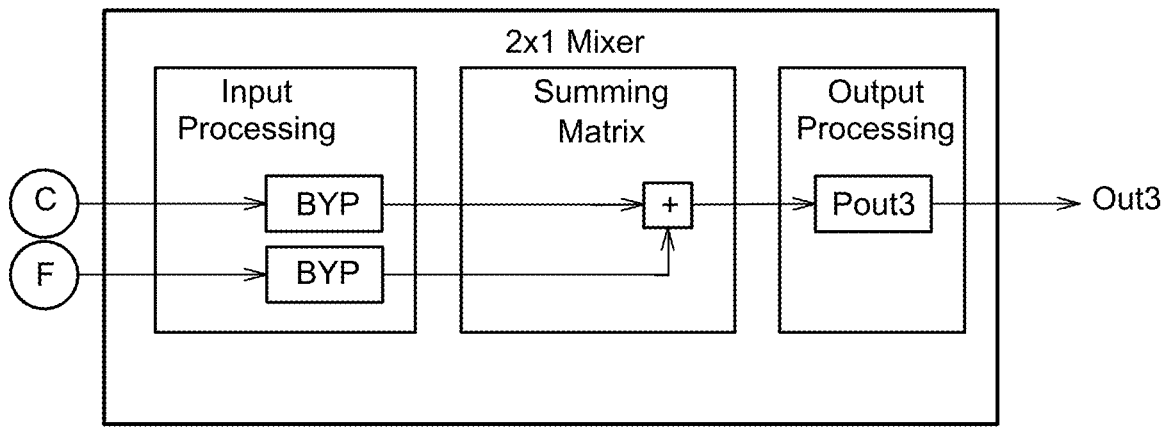
FIG. 9C-2

OPTIMIZING AUDIO SIGNAL NETWORKS USING PARTITIONING AND MIXER PROCESSING GRAPH RECOMPOSITION

BACKGROUND

Musicians and performers in a music recording environment need to hear the audio of their music through monitoring headphones or speakers while they perform it during a recording with very little delay (latency) between when a note is played or sung and when the monitor output arrives at their ears. Latency greater than about 1 ms can negatively distract the performer. In such recording workflows, the performer's audio is often subjected to effects processing and mixed with audio from other live musicians and/or previously recorded audio tracks from a local or remotely located digital audio workstation (DAW) or from other audio processing devices before reaching the monitor output. The ability to deliver processed and mixed audio to the performer in real-time, i.e., low-latency monitoring, poses special challenges in the domain of digital audio processing. This is especially the case when monitoring is performed across a network of devices, when latency may be introduced both by a DAW, as described below, and by the network connections.

In a common system configuration, a general-purpose system hosts a DAW which is connected to one or more dedicated audio processing devices situated with the musical inputs and/or outputs. When such audio processing devices are located remotely from the DAW, slow connections between the devices and the general-purpose computer add latency.

Despite the difficulties of implementing low-latency monitoring across a network of devices, there are significant advantages to including general-purpose computers in the network. These include the ability to run an ecosystem of different software applications that are part of the music production process, and the ability to use the same device for non-music production applications. There is therefore a need for solutions to the low-latency monitoring problem in which at least some of the processing is performed on devices which are separate from the system's physical input and output points, such as on a general-purpose computer running DAW software.

Previous solutions for low-latency monitoring in systems involving a DAW require running the mix processing primarily on purpose-built embedded hardware/software systems attached directly to a general purpose computer hosting the DAW, but this strategy precludes doing significant mix processing on the general-purpose host while monitoring the processed signal with low latency between the live input and presentation output points.

Another consequence of running the mix processing primarily on the DAW host or on purpose-built devices directly attached to the DAW host is the need to transmit all live inputs over high latency connections from locations remote from the DAW to the DAW for processing and mixing. In addition, monitor output signals also need to be transmitted across such connections, for example from the DAW location to the live locations or between live locations. In addition to the extra signal latency incurred, this two-way traffic can be costly in terms of the number of streams between different locations and devices that are required. In many situations, the number of available streams is limited, and the traditional allocation of signal processing may exhaust them rapidly. There is therefore a need for audio signal processing methods that are able to perform the desired audio signal processing with low latency while using a reduced number of connections between different locations.

SUMMARY

An audio signal processing graph is automatically recomposed to optimize certain properties by reassigning and instantiating its nodes among locales of an audio processing network such that the number of inter-locale connections is minimized and latency between inputs, such a performer's live input, and outputs, such as a monitored recording mix, is minimized.

In general, in one aspect, a method of optimizing a property of an audio signal processing graph comprising a plurality of nodes includes: receiving information specifying for each audio input node of the graph, a locale that includes the audio input node; for each audio output node of the graph, a locale that includes the audio output node; and for each processing node of the graph, one or more supported locales for the processing node, wherein each of the one or more supported locales for the processing node includes at least one of a hardware and a software module capable of performing audio processing required by the processing node; for each processing node of the graph for which the received information specifies a plurality of supported locales, automatically determining an optimal supported locale from among the plurality of supported locales for the node; and automatically assigning each of the processing nodes for which the received information specifies a plurality of supported locales to the optimal supported locale for that node, wherein the assignment results in an audio signal processing graph that minimizes at least one of: a number of inter-locale connections required to connect the plurality of nodes of the graph; and a latency between a specified input node and a specified output node.

Various embodiments include one or more of the following features. Determining the optimal supported locale for a given processing node includes: determining a locale of a node that is downstream from the given processing node; and if the locale of the node that is downstream from the given processing node supports the given processing node, determining that the optimal supported locale for the given processing node is the locale of the downstream node. Determining the optimal supported locale for a given processing node includes: determining a locale of a node that is upstream from the given processing node; and if the locale of the node that is upstream from the given processing node supports the given processing node, determining that the optimal supported locale for the given processing node is the locale of the upstream node. A plurality of nodes of the graph of a given type have an associative property; and the optimizing of the graph further comprises using the associative property to re-arrange a sequence of audio signal processing in the graph of nodes of the given type without changing an audio processing behavior of the graph. A plurality of nodes of the graph of a given type have a commutative property; and the optimizing of the graph further comprises using the commutative property to change an order of audio signal processing in the graph of nodes of the given type without changing an audio processing behavior of the graph. A plurality of nodes of the graph of a given type are decomposable into a subgraph of nodes; and the optimizing of the graph further comprises decomposing a node of the given type, for example a mixer node, into sub-nodes without changing an audio processing behavior of the graph. The plurality of nodes of the graph includes a subgraph of nodes that can be recomposed as a single node of a given type, for example a mixer node; and the optimizing of the graph further comprises recomposing the subgraph as a single node of the given type without changing an audio processing behavior of the graph. Receiving information specifying a desired behavioral property for at least one signal path of the graph, and wherein the assignment of the processing nodes achieves the desired behavioral property. The desired behavioral property is a low latency between the specified input node and the specified output node. The assignment results in a number of inter-locale connections required to connect the plurality of nodes of the graph that is less than or equal to a number of inter-locale connections available for instantiation of the audio signal processing graph. A first locale includes at least one audio input node of the graph; a second locale includes a live input node and a live output node of the graph; and the property of the graph that is optimized is a latency between the live input node and the live output node. A first locale includes a plurality of audio input nodes connected to inputs of a mixer node that is supported at a plurality of locales; a second locale includes a live audio input node connected to an input of the mixer node and a live audio output node connected to an output of the mixer; and the automatic assignment of the mixer node includes: decomposing the mixer node into a first mixer stage node and a second mixer stage node; assigning the first mixer stage node stage to the first locale, wherein the plurality of audio inputs nodes in the first locale are connected to inputs of the first mixer stage node; and assigning the second mixer stage node to the second locale, wherein: the live audio input node and the output of the first mixer stage node are connected to inputs of the second mixer stage node; and the live audio output of the second mixer stage is connected to an output of the second mixer stage. A first supported locale includes a computing system hosting a digital audio workstation application and a second supported locale includes an audio processing device. Each of a first supported locale and a second supported locale includes a general-purpose computing system. A first supported locale incudes a general-purpose computing system and one or more additional supported locales include a network of audio processing devices. A plurality of supported locales is implemented by a network of audio processing devices. The automatic determination of optimal supported locales and automatic assignment of processing nodes of the graph to optimal supported locales is performed by a controller software application hosted on a system that also performs audio processing for one or more nodes of the audio signal processing graph. The automatic determination of optimal supported locales and automatic assignment of processing nodes of the graph to optimal supported locales is performed by a controller software application hosted on a system in data communication with one or more a systems that performs audio processing for one or more nodes of the audio signal processing graph.

In general, in another aspect, a computer program product comprises: a non-transitory computer-readable medium with computer program instructions encoded thereon, wherein the computer program instructions, when processed by a computer system instruct the computer system to optimize a property of an audio signal processing graph comprising a plurality of nodes, the optimization comprising: receiving information specifying: for each audio input node of the graph, a locale that includes the audio input node; for each audio output node of the graph, a locale that includes the audio output node; and for each processing node of the graph, one or more supported locales for the processing node, wherein each of the one or more supported locales for the processing node includes at least one of a hardware and a software module capable of performing audio processing required by the processing node; for each processing node of the graph for which the received information specifies a plurality of supported locales, automatically determining an optimal supported locale from among the plurality of supported locales for the node; and automatically assigning each of the processing nodes for which the received information specifies a plurality of supported locales to the optimal supported locale for that node, wherein the assignment results in an audio signal processing graph that minimizes at least one of: a number of inter-locale connections required to connect the plurality of nodes of the graph; and a latency between a specified input node and a specified output node.

In general, in a further aspect, a system comprises: a memory for storing computer-readable instructions; and a processor connected to the memory, wherein the processor, when executing the computer-readable instructions, causes the system to optimize a property of an audio signal processing graph comprising a plurality of nodes, the optimization comprising: receiving information specifying: for each audio input node of the graph, a locale that includes the audio input node; for each audio output node of the graph, a locale that includes the audio output node; and for each processing node of the graph, one or more supported locales for the processing node, wherein each of the one or more supported locales for the processing node includes at least one of a hardware and a software module capable of performing audio processing required by the processing node; for each processing node of the graph for which the received information specifies a plurality of supported locales, automatically determining an optimal supported locale from among the plurality of supported locales for the node; and automatically assigning each of the processing nodes for which the received information specifies a plurality of supported locales to the optimal supported locale for that node, wherein the assignment results in an audio signal processing graph that minimizes at least one of: a number of inter-locale connections required to connect the plurality of nodes of the graph; and a latency between a specified input node and a specified output node.

In general, in yet another aspect, a method of optimizing a property of an audio signal processing graph comprising a plurality of nodes comprises: receiving information specifying: for each audio input node of the graph, a locale that includes the audio input node; for each audio output node of the graph, a locale that includes the audio output node; and for each processing node of the graph, one or more supported locales for the processing node, wherein a locale that is supported for the processing node includes at least one of a hardware and a software module capable of performing audio processing required by the processing node; for each unassigned processing node of the graph for which the received information specifies a processing node that is supported by both a first locale that includes a general-purpose computing system hosting a DAW application and a second locale that includes an audio processing device, automatically determining an optimal one of the first and second locales to which the node is to be assigned in order to optimize the property of the graph; and automatically assigning each of the unassigned processing nodes to their respective optimal nodes, wherein the assignment results in an audio signal processing graph that is optimized for at least one of: a latency between a specified input node and a specified output node; and number of inter-locale connections required to connect the plurality of nodes of the graph.

Various embodiments include one or more of the following features. An unassigned processing node of the graph is a mixer node. Decomposing the mixer node into a first mixer stage node and a second mixer stage node, and automatically assigning the first mixer stage node to the first locale and the second mixer stage node to the second locale.

BRIEF DESCRIPTION OF THE DRAWINGS

FIG. 3I is a key to the signal graphs shown in the Figures.

DETAILED DESCRIPTION

Figure 1:
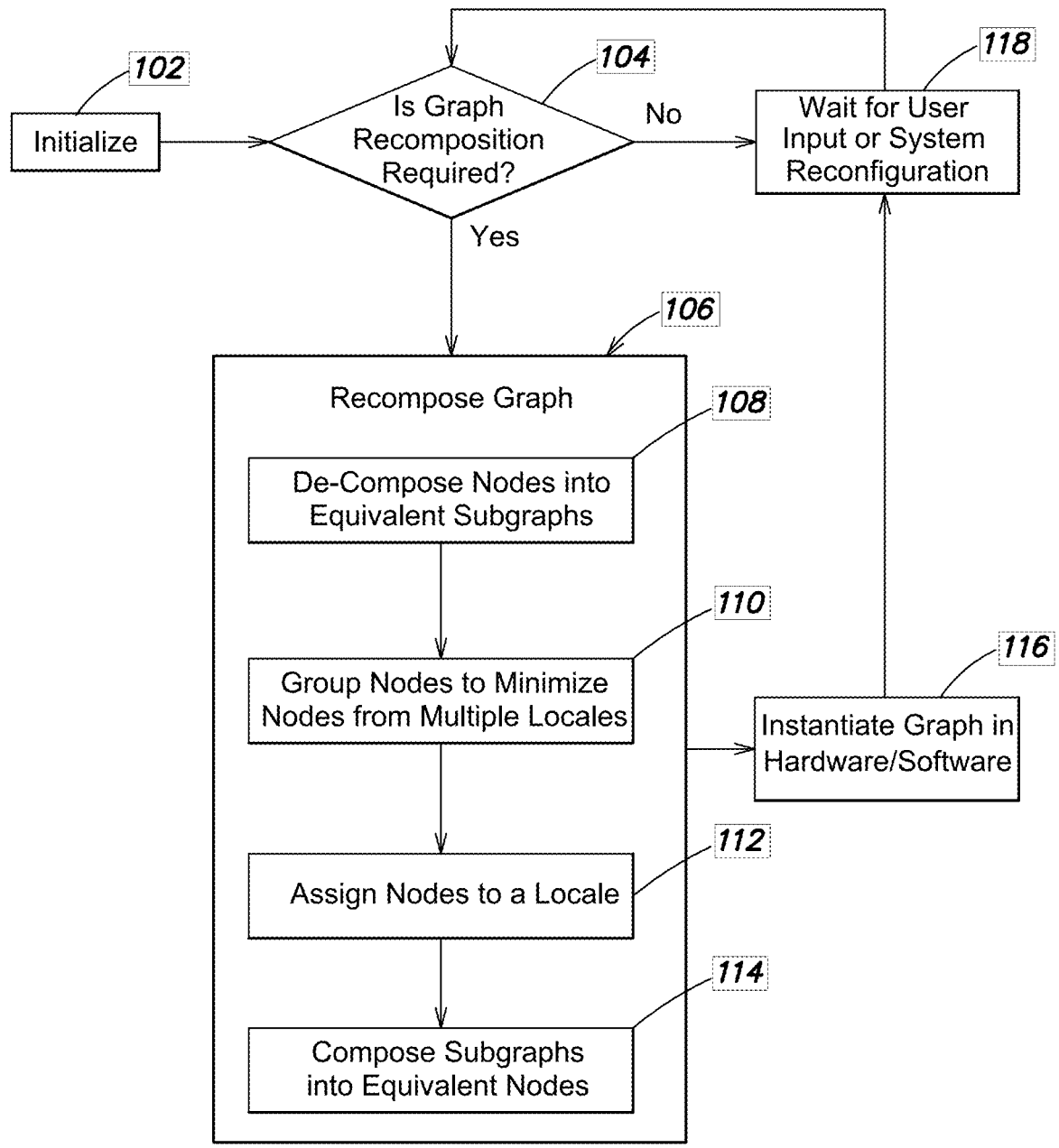
FIG. 1 is a high-level flow diagram of the steps performed by a controller module that automatically recomposes an audio signal processing graph for a distributed network of computer systems and audio processing devices.

The methods and systems described herein enable low-latency monitoring of an audio mix at a performer's location for a system containing a network of audio processing devices, processing, playback, and/or recording devices subject to control by a software application, such as a DAW, running on one or more machines connected to or included in this network. The methods involve reducing the number of connections between different locales. As used herein, a locale is a system capable of processing and connecting the nodes that reflect all or part of an audio signal graph. Locales may contain inputs to the digital audio signal graph and/or outputs from the digital audio signal graph. Connections within a locale are "cheap" by one or more measures, while they are "expensive" between locales by those same measures. The rules for determining connection cost depend on the desired behavior of the system with respect to one or more of connection latency, availability of connections, and bandwidth of connections. The boundaries of a locale are determined by connections which are expensive, such as those which introduce a large amount of latency or which consume a limiting system resource. For example, if the desired behavior calls for processing a given signal path across multiple nodes with the lowest possible latency then connections which result in high latency and connections which may be exhausted are assigned a high cost and form the boundaries of the system's locales. In the described implementations, it is assumed that locales are static while the described graph optimization methods are applied. As used herein, an input refers to a source node of a signal graph, and an output refers to a sink node. Inputs and outputs may be live, such as a microphone input signal, or non-live, such as play-back of pre-recorded data. The audio signal processing graphs discussed herein include live (real-time) inputs and outputs and are therefore examples of real-time audio signal processing graphs.

One common desired behavior of the overall audio processing system is to minimize latency between live inputs and outputs without exhausting the connection resources of the system. Therefore, locales in this system are determined by the amount of latency introduced by connections between nodes and whether these connections consume limited resources on the system. Another desired behavior is to allow a complex signal processing graph to fit onto a networked audio processing system that would otherwise not be able to accommodate the graph without using the methods for minimizing inter-locale connections described herein or changing the graph behavior and as a result the audio processing results, for example by bypassing or removing certain processing stages.

Typically, a device in a particular location comprises a single locale since within a single physical device latency is usually low and the number of connections is not a limiting factor in the system. By contrast, connections between physical devices often introduce much larger latencies or the numbers of such connections may be constrained to an extent that they bound the system's behavior. In some cases, however, a single locale may extend across multiple devices or locations as long as connections are cheap and plentiful within this system. An example of such a multi-location locale is a special-purpose audio processing device with a distant peripheral input or output connected to the device with a high bandwidth connection. Conversely, a single device at a single location may contain multiple locales if connections between groups of nodes in these locales are expensive or limited. An example of expensive connections within a single device may occur in an audio processing device composed of multiple circuit boards with interconnected digital signal processor (DSP) chip "clusters" on each board where connections between chips on a single board are cheap and unlimited, while interconnects between the boards in the device have limited bandwidth. Multiple locales may also be found in software running on a single computer in which different interconnected processes run different parts of a signal graph where connections within a single process are effectively unlimited and cheap, while connections between processes are expensive and sending audio between processes adds latency. This results in the separation of each process into its own locale.

In an example use case, the described methods minimize latency of live audio delivered to an audience in a performance environment with a distributed network of audio processing and processing devices. An audio signal network is established when a user specifies audio routing and effects processing. Each time a user makes a change, a new graph is generated and instantiated on the available hardware, software, and connection resources. The methods overcome the unacceptably high latencies referred to above that may arise if the signal network which generates the mix is executed within a DAW or by other software hosted on a computer. They also minimize the number of inter-locale connections required. This is achieved by automatically recomposing the signal processing graph to allocate graph nodes to resources. In some embodiments, a desired behavior of the audio processing network is specified by a DAW user, performer, mix engineer, or other type of user. An example of a desired behavior is to achieve low latency between a live input generated by a performer and a mixed and processed monitor output for the performer. The user expresses the desired behavior using the DAW user interface and the system recomposes the signal processing network across the system's locales, which in this example implies extending the signal processing network across multiple devices to create an equivalent signal processing graph that is aligned to the desired behavior without exhausting available inter-locale connections.

The desired behavior of the audio processing network may be inferred automatically, in which case it is not necessary for users to express their behavioral preferences. For example, by tracing active live inputs and live outputs, a system may infer that the user wants the lowest possible latency between those inputs and outputs, or to consume the smallest number of connections, or to achieve some other goal depending on the characteristics of the system and the ways it will be used. In certain situations, a user may seek to fit a mix into the modules of a networked processing system that cannot accommodate it unless the overall signal processing graph is optimized. This may arise, for example, when ad-hoc assignment of processing nodes of the signal graph to the modules of the system causes the inter-locale connections to be exhausted before all nodes are assigned. In this case, the system may automatically infer that the desired goal is to recompose the signal graph for the available modules to allow it to fit within the constraints of available connections.

Figure 2A:
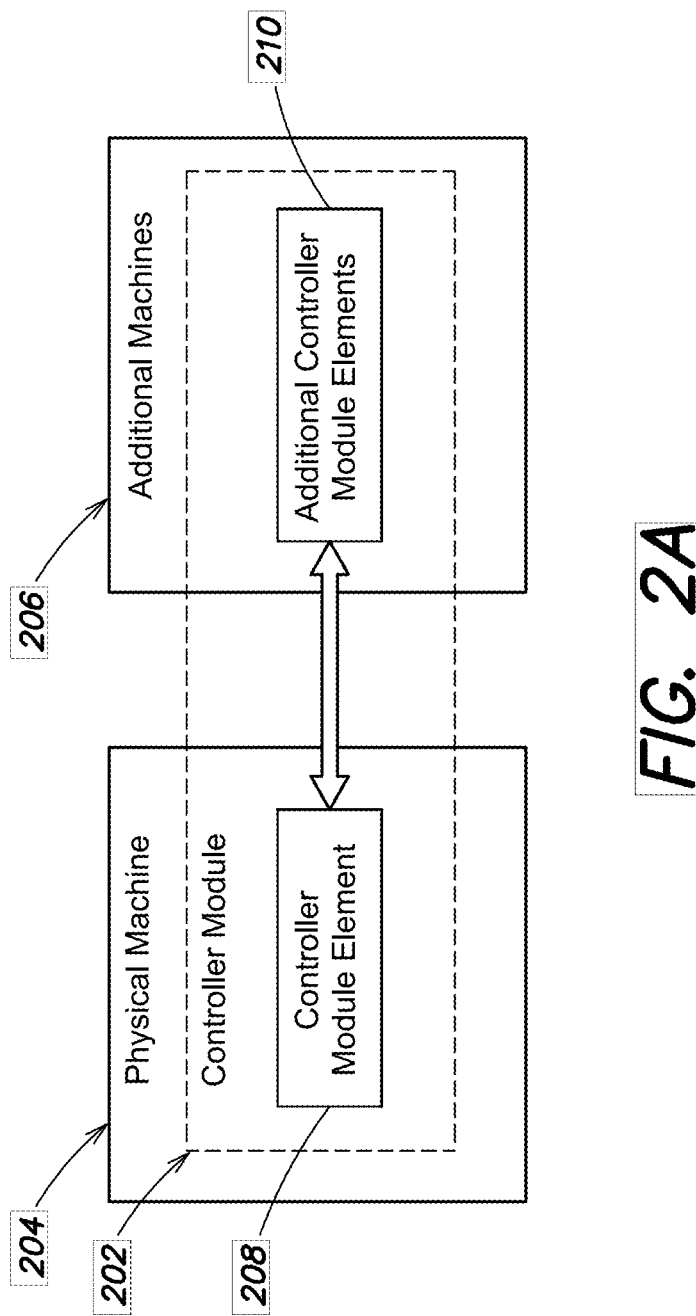
FIGS. 2A-2F provide diagrammatic illustrations of the controller module of FIG. 1 and its interactions with a user and the network of systems and devices available to perform the required audio signal processing.
Figure 2B:
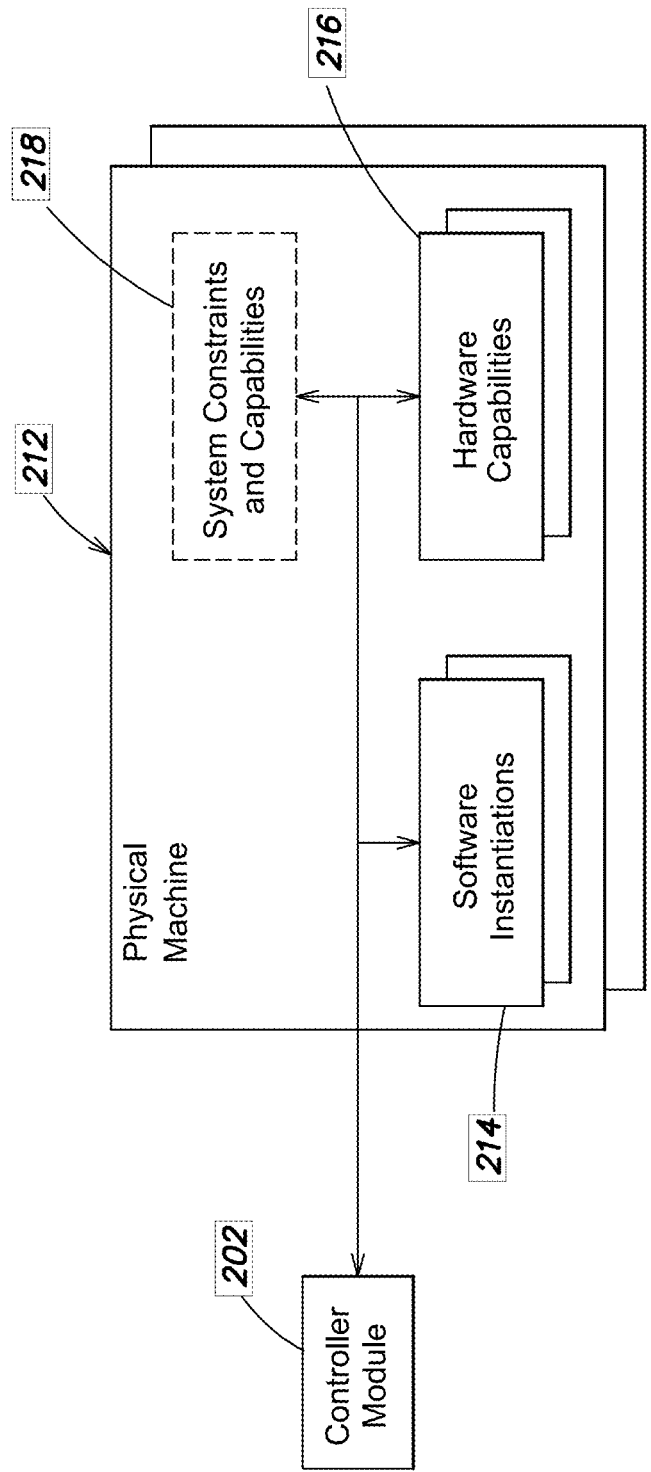
Figure 2C:
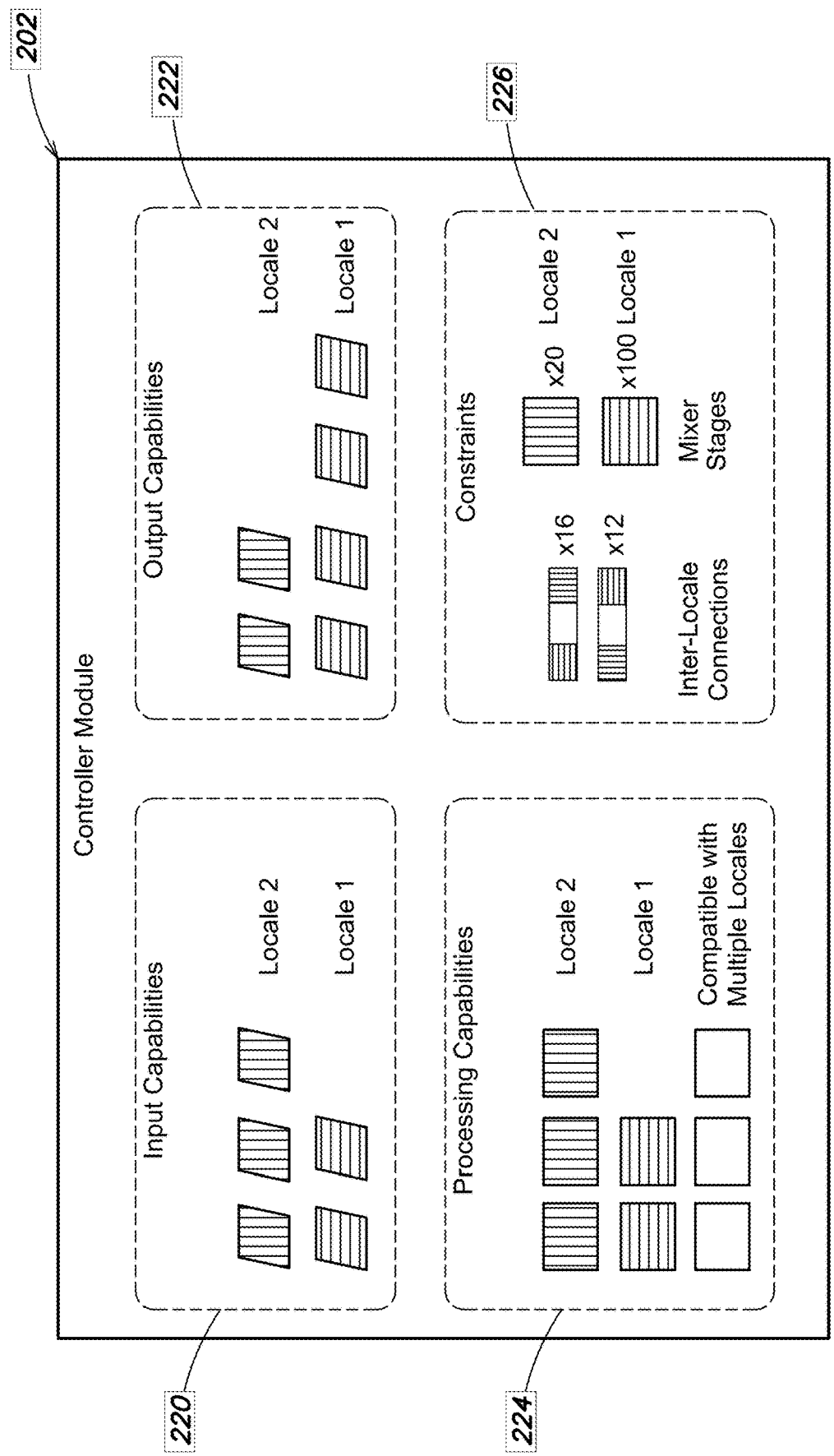

FIG. 1 is a high-level flow diagram of the steps performed by a controller module that automatically recomposes an audio signal processing graph for a distributed network of audio processing and processing devices. The controller module may be instantiated across one or more physical machines. These may include a system hosting a DAW, and/or a system which participates in the signal processing graph, or a separate system that neither hosts a DAW nor is involved in the audio processing. FIG. 2A illustrates the case in which controller module 202 is instantiated over multiple systems 204, 206, which host module elements 208 and 210 respectively. In initialization step 102, the controller gathers information about the current configuration of the network, including the capabilities of each part of the system as it pertains to allocating and executing the parts of an audio signal graph. FIG. 2B is a diagrammatic illustration of this step. Controller 202 communicates with one or more physical machines 212 that comprise the distributed network of audio input/output and processing devices. These machines may or may not also host elements of the controller module. The types of system configuration information obtained by the controller include the number and type of possible software module instantiations 214, including software plug-in modules, and hardware capabilities 216 available to the network. It also gathers information about system constraints and capabilities 218. The resulting information available to the controller module is illustrated in FIG. 2C. It includes: the number of inputs 220 and outputs 222 in each of one or more locales; the system processing capabilities 224 available in each locale and those that are compatible with, i.e. can be instantiated on, two or more locales; and constraints 226 which apply to each of the locales including the number and size of mixer stages and additional system constraints such as the number of available inter-locale connections (bridge connections).

Figure 2D:
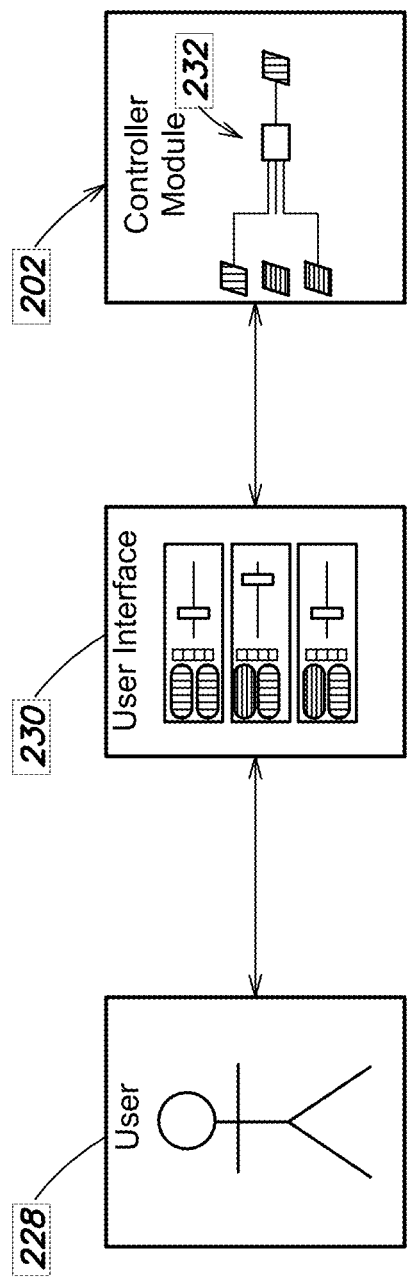
Figure 2E:
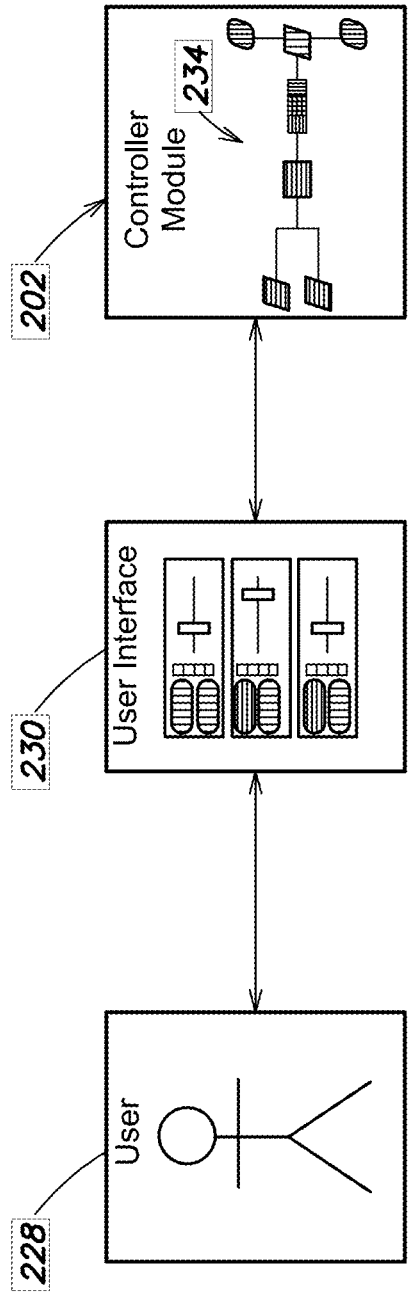
Figure 2F:
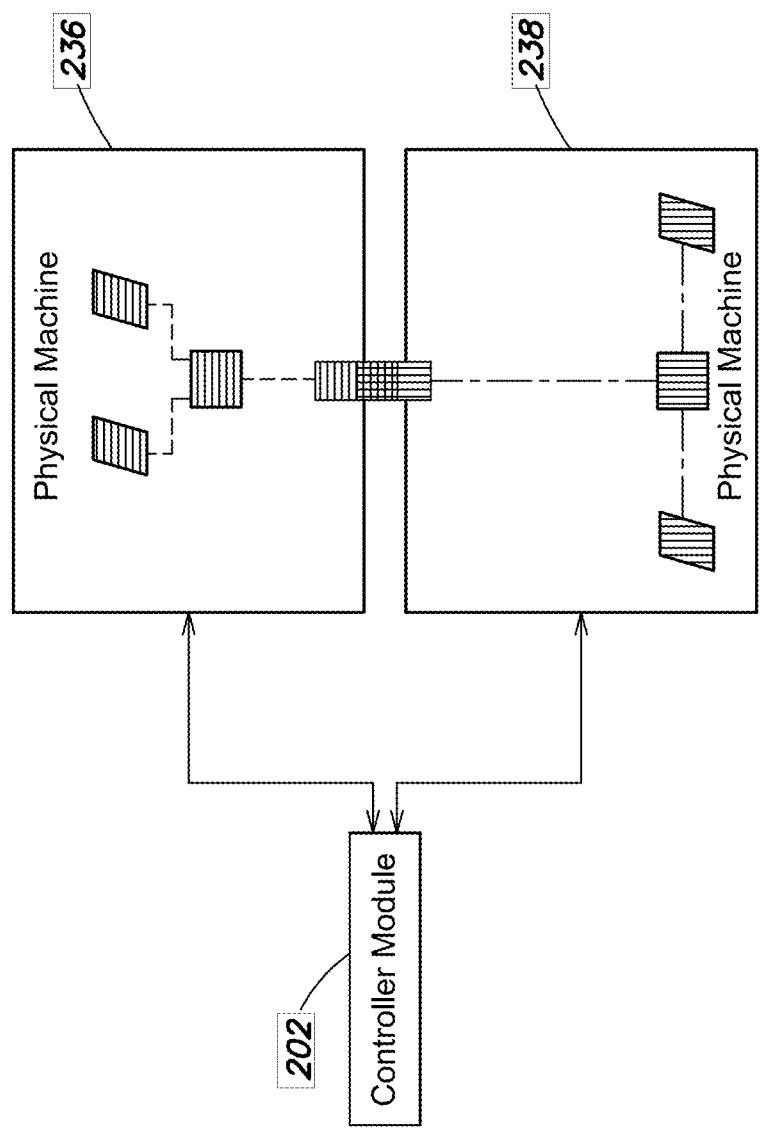

The controller determines whether an audio signal graph recomposition is required (FIG. 1, 104). The need for this is triggered when: the system is first started and has not yet applied an initial configuration; a user makes a request for some new behavior of the system; or a user physically reconfigures the system by adding or removing physical systems or changing the physical connections between systems. FIG. 2D diagrammatically illustrates a case when user 228 interacts with controller module 202 via software or hardware user interface 230. The controller maintains internal representation 232 that is updated to reflect the user's current requirements. Having determined that an audio signal graph recomposition is required, the controller performs graph configuration step 106 (FIG. 1) to generate an optimized graph that meets the user's requirements subject to the system constraints. At a high level this includes: (i) de-composing nodes into equivalent graphs where possible (108); (ii) grouping nodes to minimize nodes with inputs from multiple locales (110); (iii) assigning each node to a locale (112); and (iv) composing sub-graphs into equivalent nodes where possible (114). Optimized equivalent graph 234 is indicated diagrammatically within the controller module in FIG. 2E. The controller then instantiates the optimized signal graph in the system hardware, software, and available connections (FIG. 1, 116). This may be performed iteratively or as the optimized graph is developed, or as a separate step after the optimization process has been completed. Graph recomposition (106) and instantiation in hardware/software (116) may be merged into a single step in a system which instantiates all graph changes directly while the graph is being optimized. FIG. 2F is a diagrammatic illustration of the graph instantiation step, with controller module 202 communicating with physical machines 236 and 238 that belong to the distributed network of audio input/output and processing devices that is being optimized. As indicated diagrammatically, the inputs and processing of locale 1 are instantiated on machine 236, and the processing and outputs of locale 2 are instantiated on machine 238 with an inter-locale bridge connecting the two locales.

Having instantiated the optimized graph within the available physical systems and possible software instantiations, the controller waits for further user input or system reconfiguration (FIG. 1, 118) and if a change requiring graph recomposition is detected (FIG. 1, 104), the graph configuration step is repeated for the new system configuration, and the updated graph is instantiated.

Figure 3A:
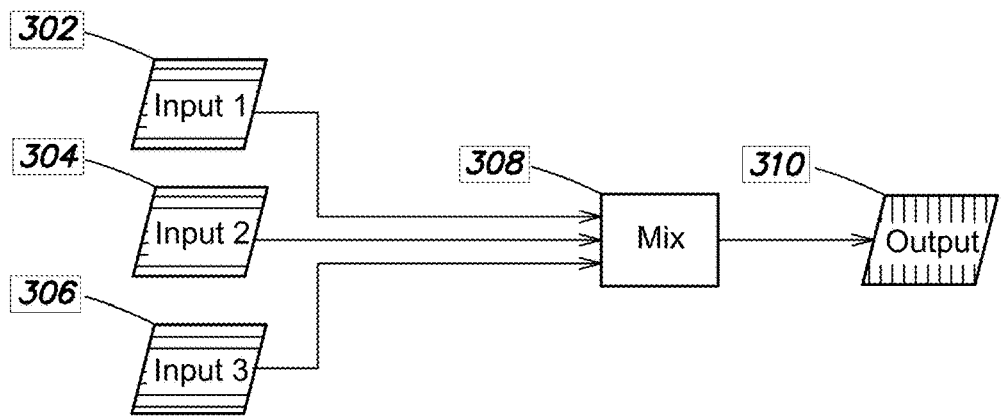
FIGS. 3A-3D illustrate signal graph recomposition for a graph with three inputs in a first locale and an output in a second locale.
Figure 3B:
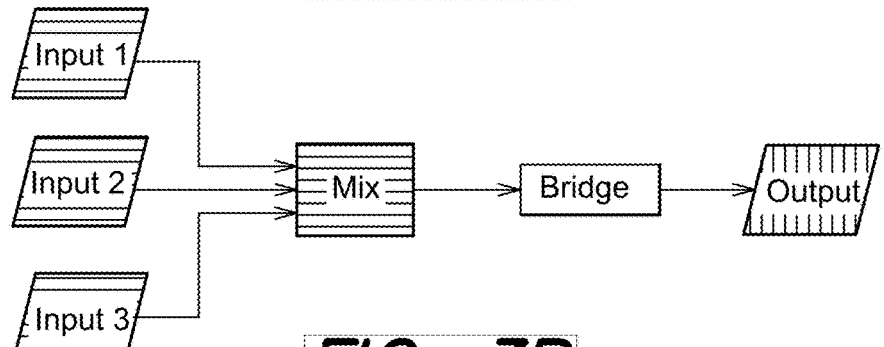
Figure 3C:
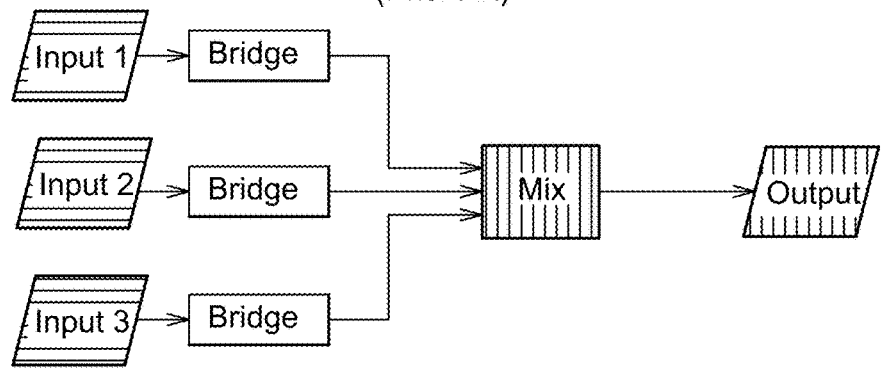
Figure 3D:
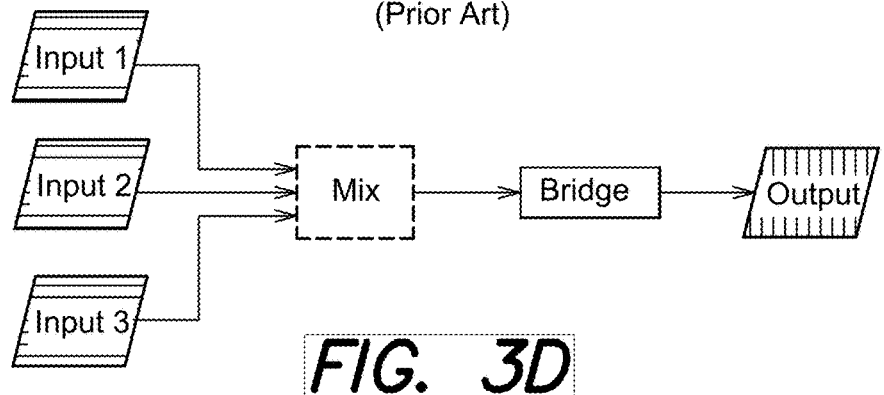

FIGS. 3A-3E illustrate the recomposition of signal graphs to reduce the number of inter-locale connections for two scenarios with inputs in a first locale and an output in a second locale, with one of the inputs being switched by a user from the first locale (e.g., disk playback) in the first scenario, to a second locale (e.g., a microphone input) in the second scenario. A key to the illustrated graphs is shown in FIG. 3I. Objects that are only supported on a particular locale are shaded: horizontal shading for locale 1 and vertical shading for locale 2. Objects that are supported on multiple locales are unshaded with an outline that indicates their assigned locale: dashed outlines for locale 1 and dashed-dot outlines for locale 2. Connections in locale 1 are illustrated with dashed lines, and those in locale 2 with dashed-dot lines. In the first scenario, the audio routing requires a mixer with three inputs in locale 1 and one output in locale 2. The routing is shown in the graph of FIG. 3A, with three inputs 302, 304, and 306 in locale 1, output 310 in locale 2, and mixer 308 in an as yet unassigned locale. In a common configuration, the available resources comprise a general-purpose computer in locale 1 connected to an audio processing peripheral which does not perform any onboard processing. In this case, the mixing must be performed on the general-purpose computer in locale 1, which is thus the only locale that is supported for the mix node, as illustrated in FIG. 3B. In another common configuration, an audio processing device co-located with the output supports mixing and also requires that it perform all the mixing operations. Here, the mixing must be performed in locale 2, as shown in FIG. 3C. However, in configurations in which mixer 308 may be instantiated in either locale 1 or locale 2, the described methods automatically compose a signal graph in which the mixing is allocated to locale 1, as shown in FIG. 3D, as this allocation consumes only a single inter-locale connection rather than three.

Figure 3E:
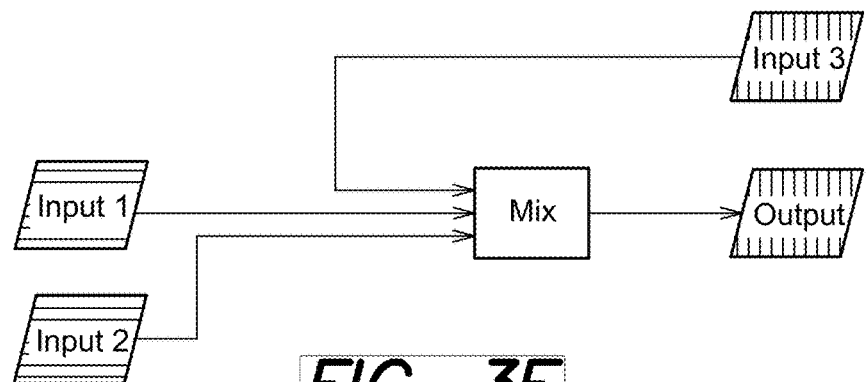
FIGS. 3E-3H illustrate signal graph recomposition for the graph of FIG. 3A in which one of the inputs is moved from the first locale to the second locale.
Figure 3F:
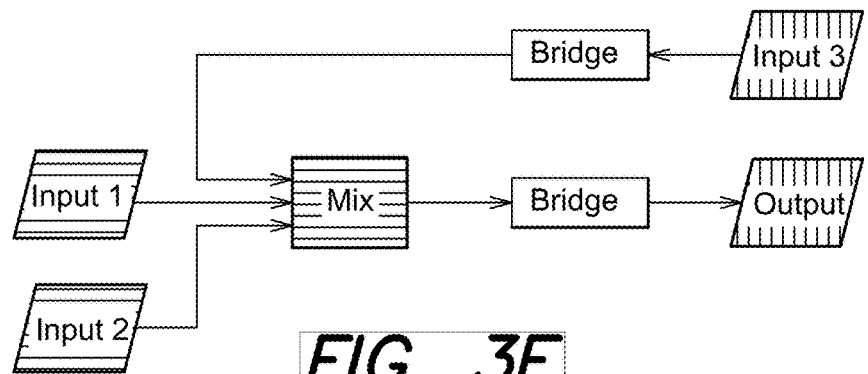
Figure 3G:
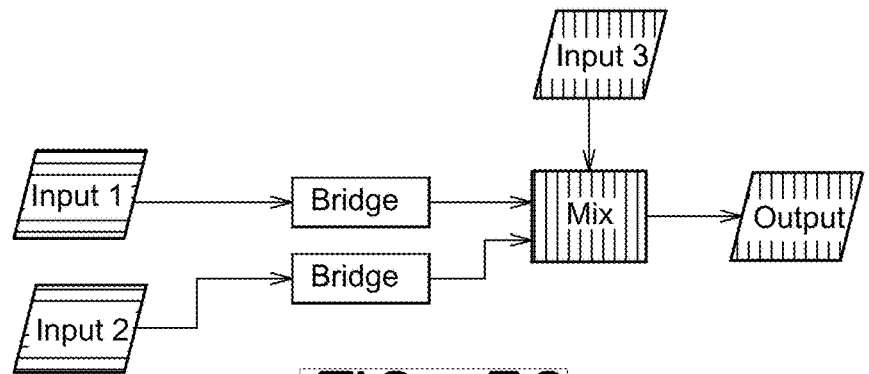
Figure 3H:
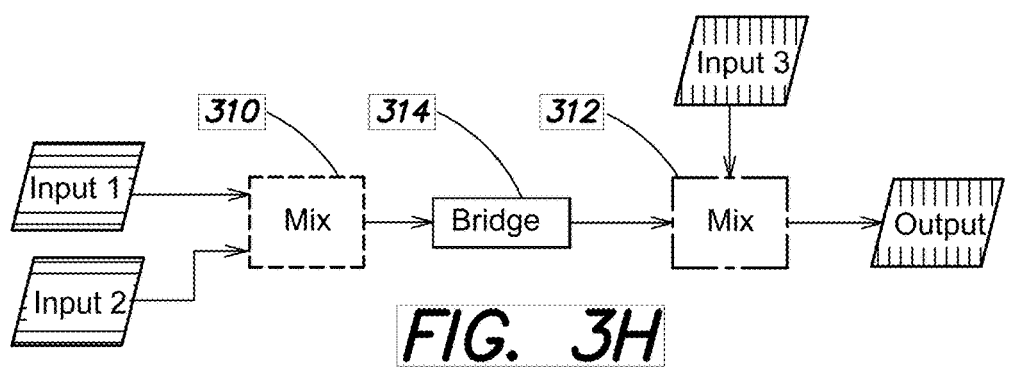

In the second scenario, shown in FIG. 3E, one of the inputs is changed from locale 1 to locale 2. In current systems the mixing still occurs either entirely in locale 1 for the case when the audio processing peripheral does not support processing as illustrated in FIG. 3F, or entirely in locale 2, for cases where the peripheral does support mixing as shown in FIG. 3G. In the former case, input 3 in locale 2 has to travel between locales to reach the mixer, and again as part of the mix to reach the output. In the latter case, an inter-locale connection is required for each of inputs 1 and 2 to connect them to the mixer. When mixing is supported in both locales, the equivalent graph solution obtained using the methods described herein is shown in FIG. 3H, in which mixer 308 (FIG. 3A) is decomposed into two stages—mixer 310 assigned to locale 1 and mixer 312 assigned to locale 2. This optimized graph achieves audio processing equivalent to that in the prior solutions, but with a low-latency path between the input and output at locale 2 and consuming only single inter-locale connection 314.

We now describe a method of partitioning an audio signal processing graph, and then illustrate its application to additional scenarios in which a signal graph representing audio processing requirements specified by a user is recomposed to satisfy desired behavioral properties while minimizing the number of inter-locale connections. The algorithm is executed on one or more systems that act as a controller for the distributed audio processing network, as illustrated in FIGS. 2A-2F.

For each possible processing node type, one or both of the following characteristics are identified: (i) whether the processing for this node type must occur in a particular locale or if it is possible to execute equivalent processing in more than one locale and (ii) whether instances of the node type may be decomposed by the system into a sequence of sub-nodes with equivalent results. Mixer nodes are decomposable, and this property is exploited in the examples presented below. The summing stage in a mixer may be decomposed into a series of summing sub-nodes, which constitutes a sub-graph for which all nodes are both associative and commutative. In the case where a mixer contains input and/or output processing stages for each channel, these may also be decomposed. A dynamics processor consisting of a level detection stage controlling a gain stage is another example of a processing node which may be decomposed, provided that the controller is given enough information to decompose the dynamics processor into the subgraph of nodes that provide the equivalent processing, enabling it to decompose and instantiate the node as an equivalent series of sub-nodes. Yet another example is a multi-channel effects processor for which the data processed for some or all of the channels does not affect the data processing on the other channels, and which may therefore be decomposed and instantiated as a parallel set of single-channel or multi-channel processors.

The controller system identifies sub-graphs which are associative, i.e., for which (A>>B)>>C is equivalent to A>>(B>>C) within the processing graph, including any sequences of decomposed sub-nodes. It also identifies sub-graphs which are commutative, i.e., A>>B is equivalent to B>>A. The controller system then performs the following three steps. (i) Group the nodes, possibly including sub-nodes within any decomposed sub-graphs, to minimize the total number of connections which are made to nodes in the graph which include connections with more than one locale. with inputs from more than one locale. This step relies on the associative and commutative properties of summing nodes. (ii) Assign to a particular locale each node in the graph that is compatible with more than one locale, possibly including sub-nodes within any decomposed subgraphs such as summing nodes within mixer subgraphs. This step relies on locale equivalence of the nodes which are being assigned, i.e., that the nodes may be supported in multiple locales, and perform in the same manner in each. For a mixer or a processing node, compatibility with a locale means that a system exists at the locale that can support the processing required by the node. For some such nodes, the locale may uniquely support the node, while for others there may be other locales that are also able to support the node. This information is required by the controller in order to perform the assignment step. Input and output nodes are commonly associated with physical hardware in a particular locale, an in such cases they are only compatible with that locale. Usually, all nodes which are instantiated on a given hardware system share the same locale. (iii) Separate the sub-graphs of nodes such that the sub-nodes within the sub-graph which are assigned to the same locale may be recomposed and therefore instantiated. For example, mixers are separated into new mixer nodes such that the sub-nodes within each new mixer node are all assigned to the same locale. This relies on the associative property of mixer nodes and mixer subgraphs, including the ability to connect one mixer's output to another mixer's input without the addition of audio processing between a summing sub-node in the first mixer and a summing sub-node in the second mixer. If the second mixer includes a mandatory input gain stage, or if the first mixer includes a mandatory output gain stage, then this gain stage may be set to unity.

The controller system instantiates the sub-graphs into the available locales and connects them into an overall processing graph with the minimum number of inter-locale connections so that characteristics are optimized for the specified behavioral preferences and the available hardware at each of the locales. Apart from the graph's processing latency characteristics, the combined audio processing behavior of the sub-graphs remains the same as that of the original graph, although imperceptible differences may arise from the different physical processing systems, e.g. from different floating-point math or dithering algorithms employed on these systems.

Each of the multiple locales may have different resources available for audio processing, including one or more general-purpose computers, embedded devices with special purpose processing capabilities, and remote servers. Audio processing may also be hosted in locations other than those represented in the audio signal processing graph, or in the cloud. Devices that are physically similar but with distinct internal or external properties are treated independently if these distinct properties result in meaningfully different processing characteristics or meaningfully different results of assigning a processing node to one such device versus another. For example, two equivalent audio processing devices are different from each other if they are physically close to performers in two different locales.

The signal recomposition algorithm described above is now illustrated by applying it to the scenarios illustrated in FIGS. 4-7.

Figure 4A:
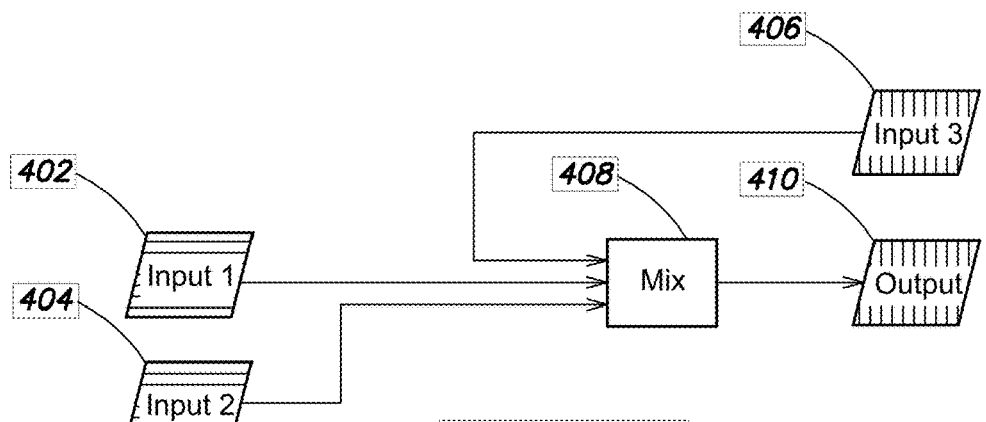
FIGS. 4A-4F illustrate the recomposition of an audio signal graph that involves decomposing a mixer node into two mixer stages that are assigned to different locales.
Figure 4B:
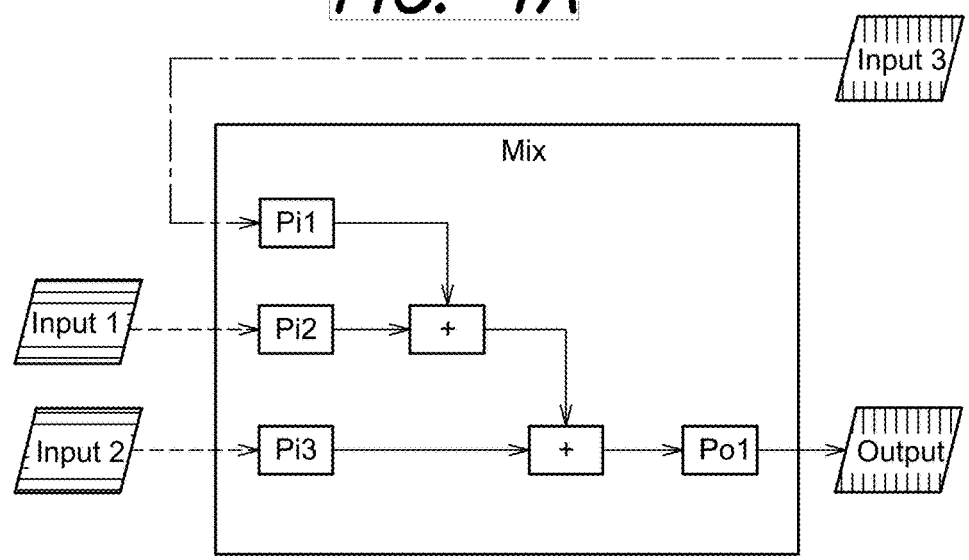

The scenario and graph recomposition shown in FIGS. 4A-4F is the same as that of FIGS. 3D-3G, but in FIGS. 4B-4F the internal decomposition of the mixer into two sub-mixers is illustrated. FIG. 4A is a diagram of the signal graph for the second scenario discussed above (FIG. 3E), showing inputs 402 and 404 in a first locale and input 406 in a second locale connected to mix stage 408, which has single output 410 in the second locale. In FIG. 4B, mixer 408 is decomposed to show equivalent sub-graph 412.

Figure 4C:
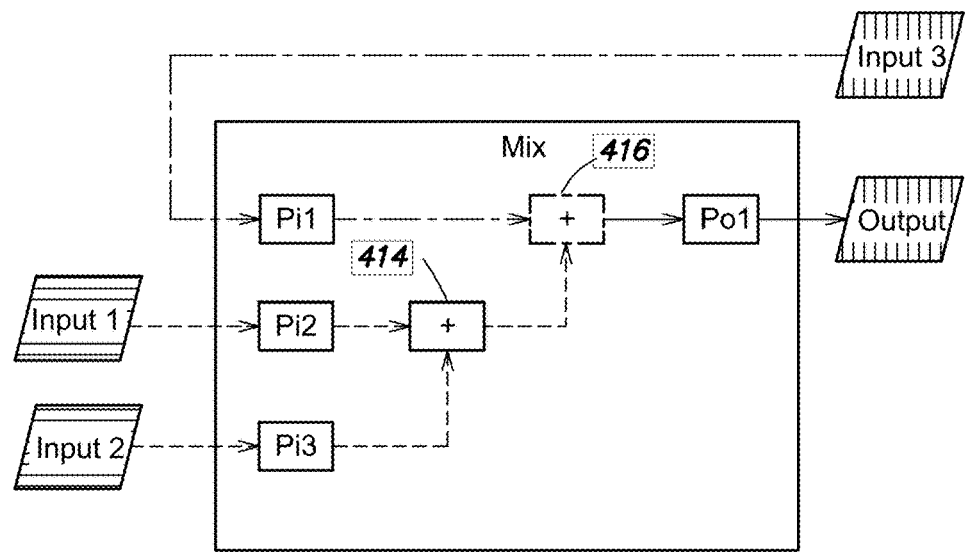

In the next step, shown in FIG. 4C, the associative and commutative properties of summing nodes are used to minimize the number of nodes which combine connections from multiple upstream locales. In the illustrated scenario, the nodes are grouped by the nearest upstream locale, such that node 414, with inputs only from the first locale, is performed before node 416, which has inputs from both locale 1 and locale 2. Following this recomposition, sum node 416 is the only node in the graph which combines connections from multiple upstream locales.

When there is a node with inputs from more than one locale, and if that node is compatible with more than one of the input locales, a first method is to assign the node to one of these locales based on the nearest downstream locale. This has the effect of minimizing the number of inter-locale connections which are executed serially when processing the graph. A second method is to assign the node to a locale based on the majority locale among both its inputs (nearest upstream locales) and outputs (nearest downstream locales). This has the effect of minimizing the total number of inter-locale connections but might increase the number of connections which must be executed in series. When minimizing behaviors such as processing latency which accrue as processing stages are applied in sequence, the first method is preferred. When minimizing behaviors for which serial/parallel execution is irrelevant, the optimization may attempt to minimize the total number of inter-locale connections in the graph, and the second method is preferred. In all these examples both methods yield equivalent results because the majority locale is also the nearest downstream locale. Applying either of these methods, summing nodes 416 is assigned to the second locale.

Figure 4D:
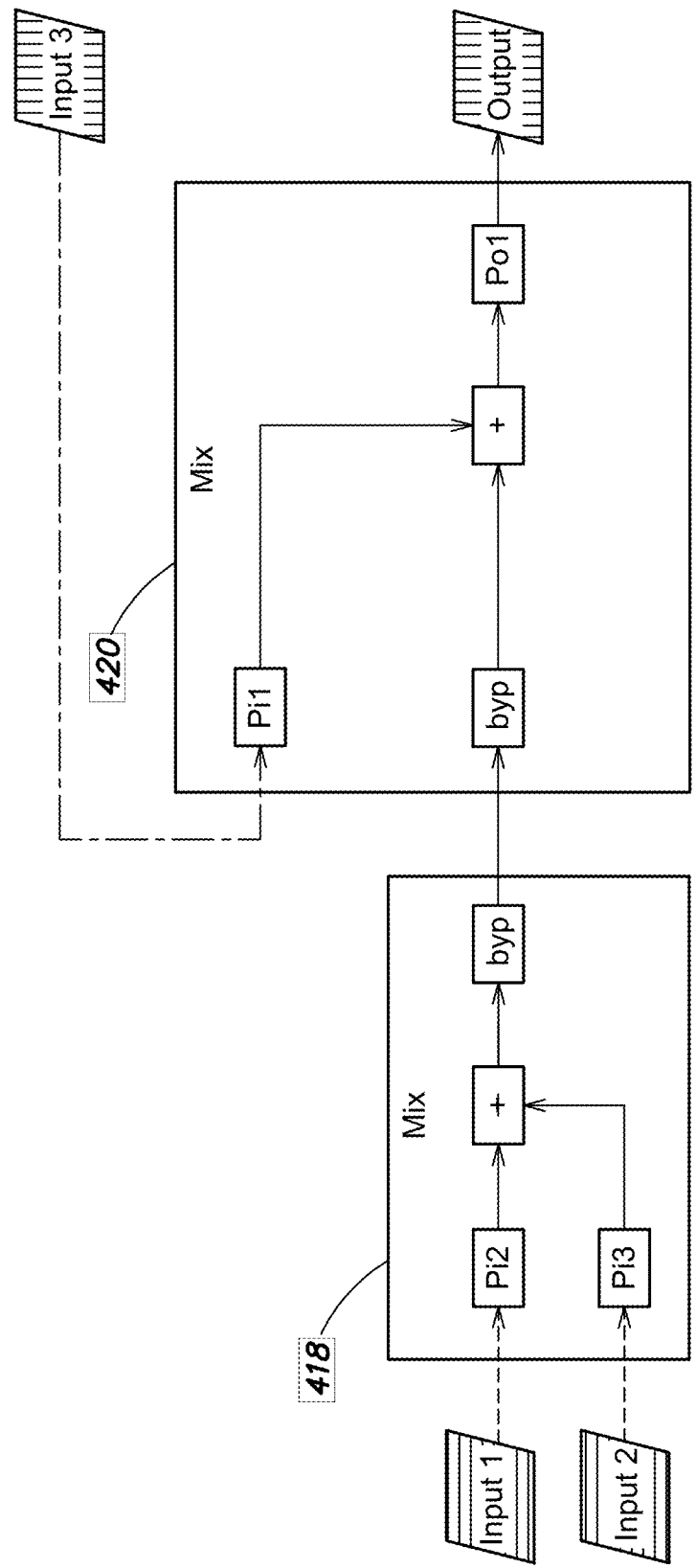
Figure 4E:
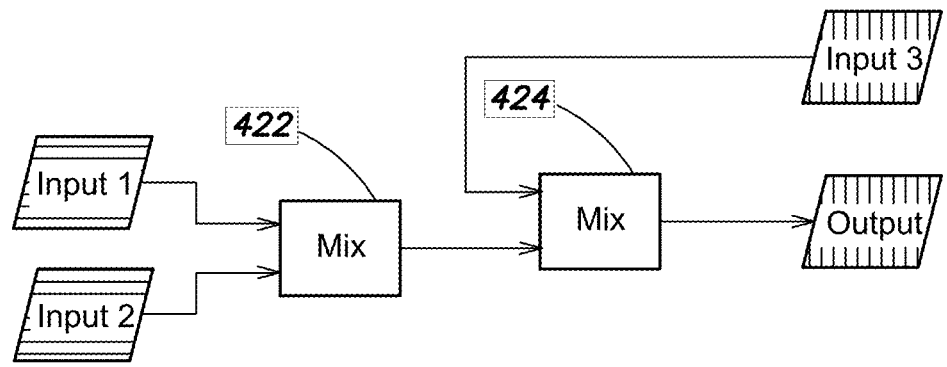
Figure 4F:
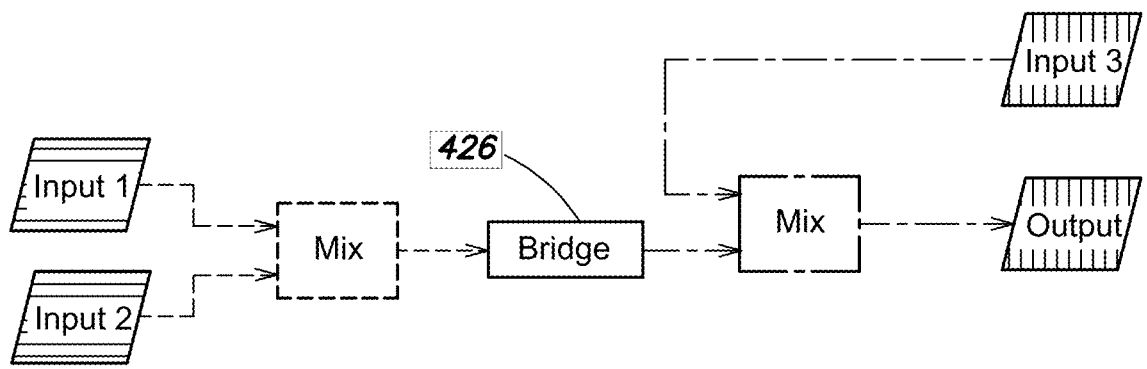

In the next step, the associative property of summing nodes as well as the ability to bypass or pass-through the mixer input and output processing nodes are used to separate the mixer into multiple processing stages 418 and 420 as shown in FIG. 4D. In some cases, a mixer may not have an input or an output processing node, which is equivalent to bypassing such stages or passing a signal through them without change, for example by applying unity gain in a gain stage. FIG. 4E shows the equivalent graph to that of FIG. 4D with the subgraphs of mixer stages 418 and 420 represented as single nodes 422 and 424 respectively.

In the final step, the locale-equivalence of mixer processing is used to assign each mixer node to the appropriate locale using the methods described above, with the result shown in FIG. 4F in which mix stages 422 and 424 are assigned to locales 1 and 2 respectively. The recomposed graph requires only one inter-locale connection 426, replacing an original graph that requires two inter-locale connections whether mix stage 408 is assigned to locale 1 (FIG. 3F) or to locale 2 (FIG. 3G). Furthermore, the signal path from input 3 to the output takes place entirely in the second locale. In a system where Input 3 406 and Output 410 signals are live, this facilitates low latency monitoring.

Figure 5A:
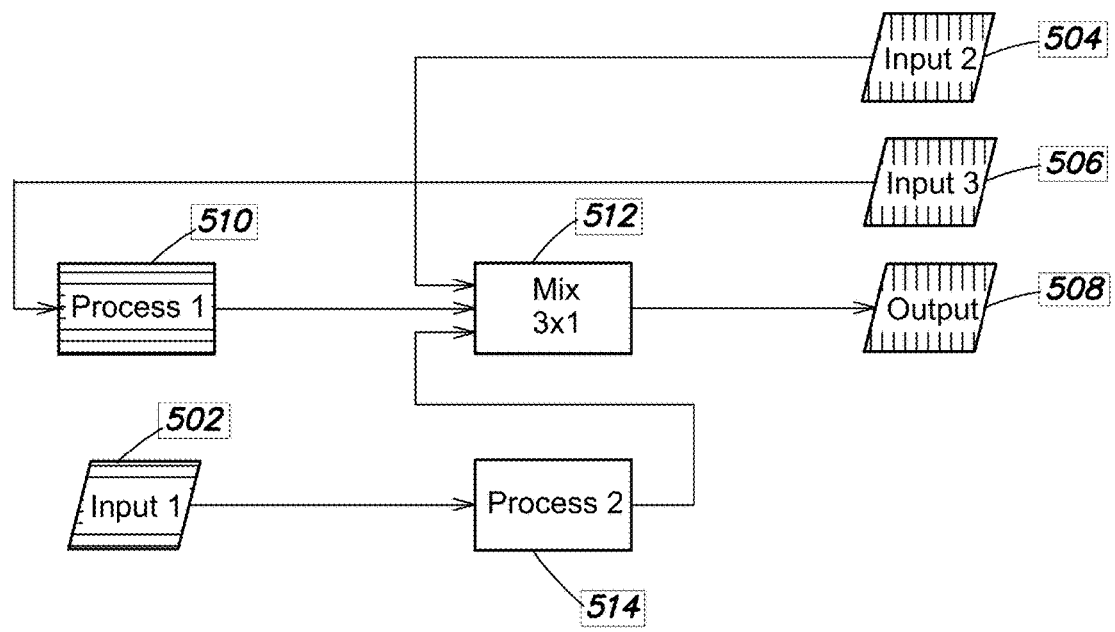
FIGS. 5A-5F illustrate an audio signal graph recomposition that relies on the ability to decompose a mixer node into a subgraph that includes summing nodes, and on the associative and commutive properties of the nodes in order to partition the mixing among the locales.
Figure 5B:
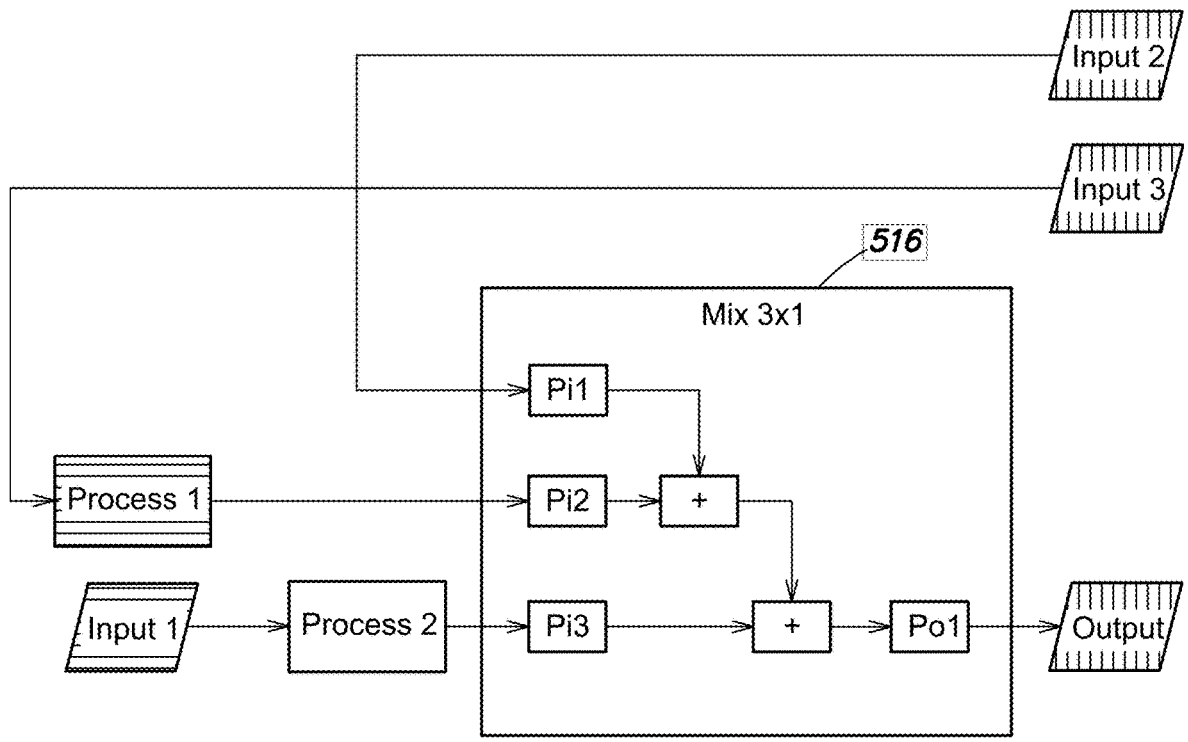
Figure 5C:
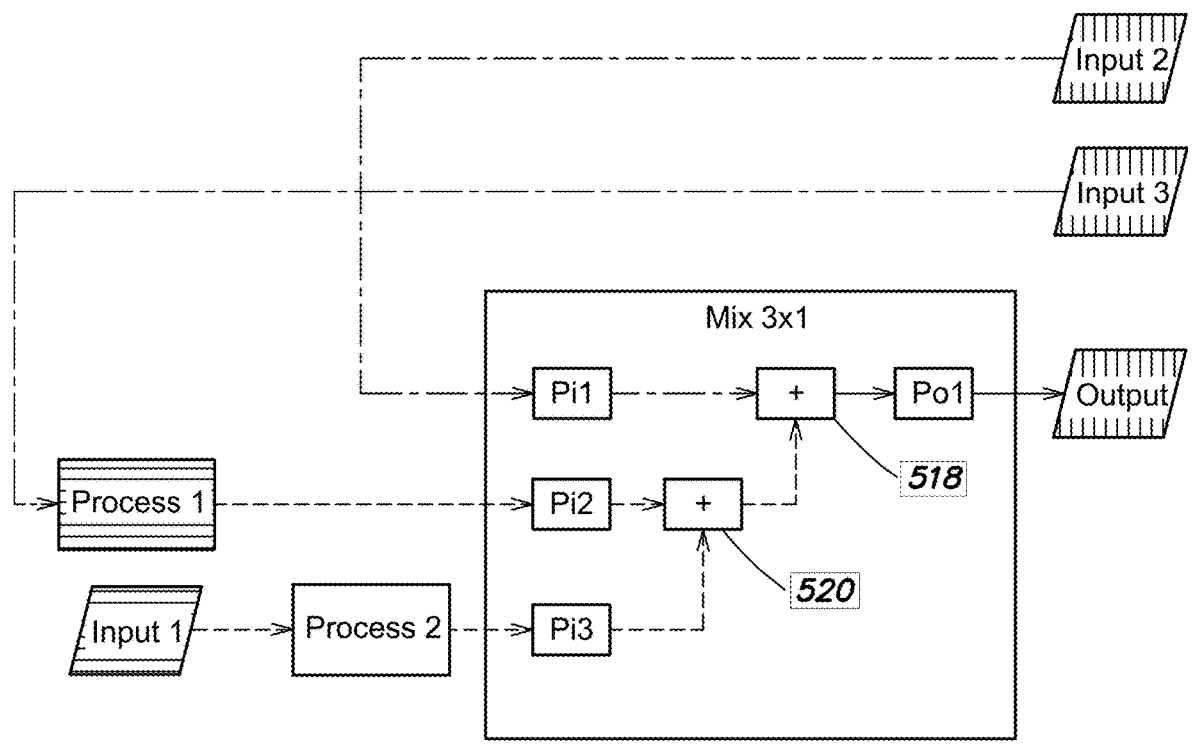

In the scenario illustrated in FIG. 5A, input 1 502 in locale 1, and inputs 2 (504) and 3 (506) in locale 2 are mixed into single output 508 at locale 2. Input 3 506 is processed at process 1 node 510 that must be instantiated in locale 1 upstream from the mixer. Mix node 512 and process 2 node 514 may be instantiated in either locale 1 or 2. FIG. 5B shows the graph of FIG. 5A with the mixer stage decomposed into its equivalent subgraph 516. In the following steps, the graph is recomposed to reduce the number of inter-locale connections. Using the associative and commutative properties of summing nodes, the number of nodes which combine connections from multiple upstream locales is minimized, with the result that node 518 becomes the only node which combines connections from multiple upstream locales. The nodes are grouped by the nearest upstream locale. Here, the first locale is the nearest fixed upstream locale for summing node 520.

Figure 5D:
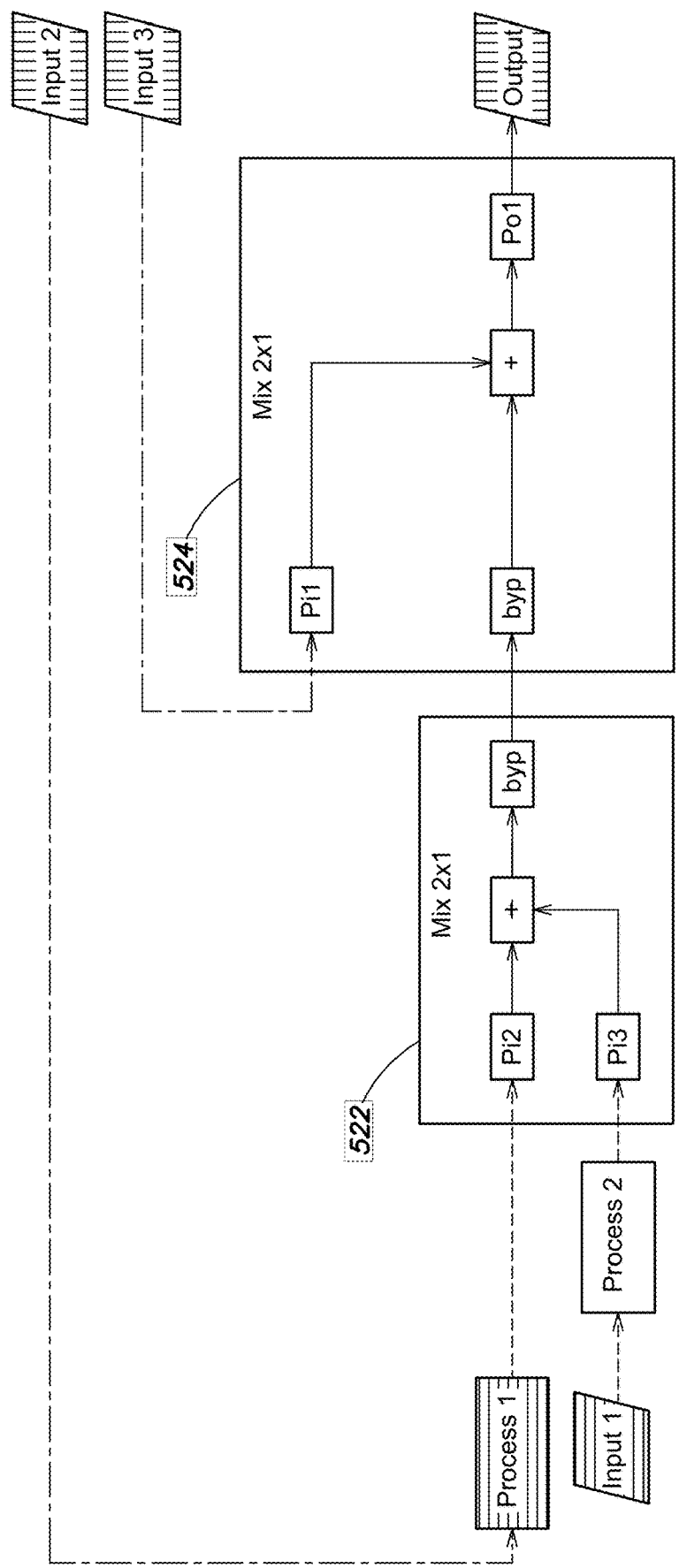
Figure 5E:
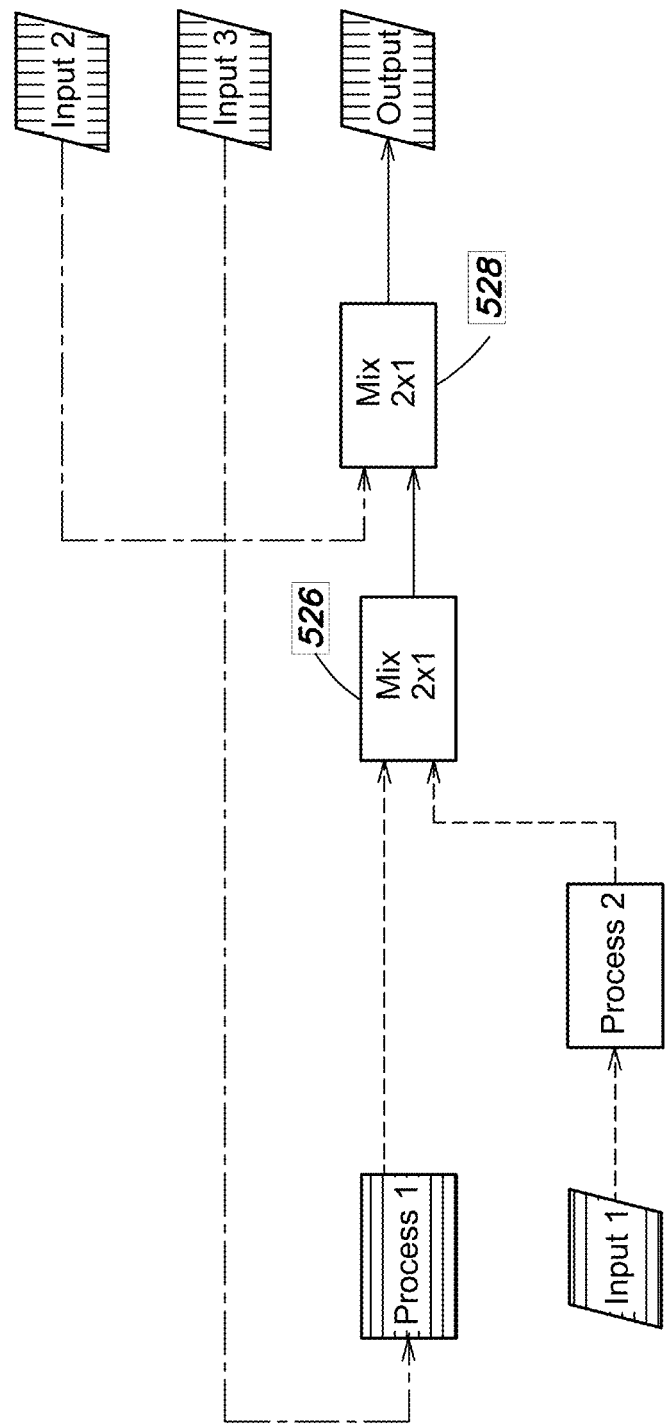
Figure 5F:
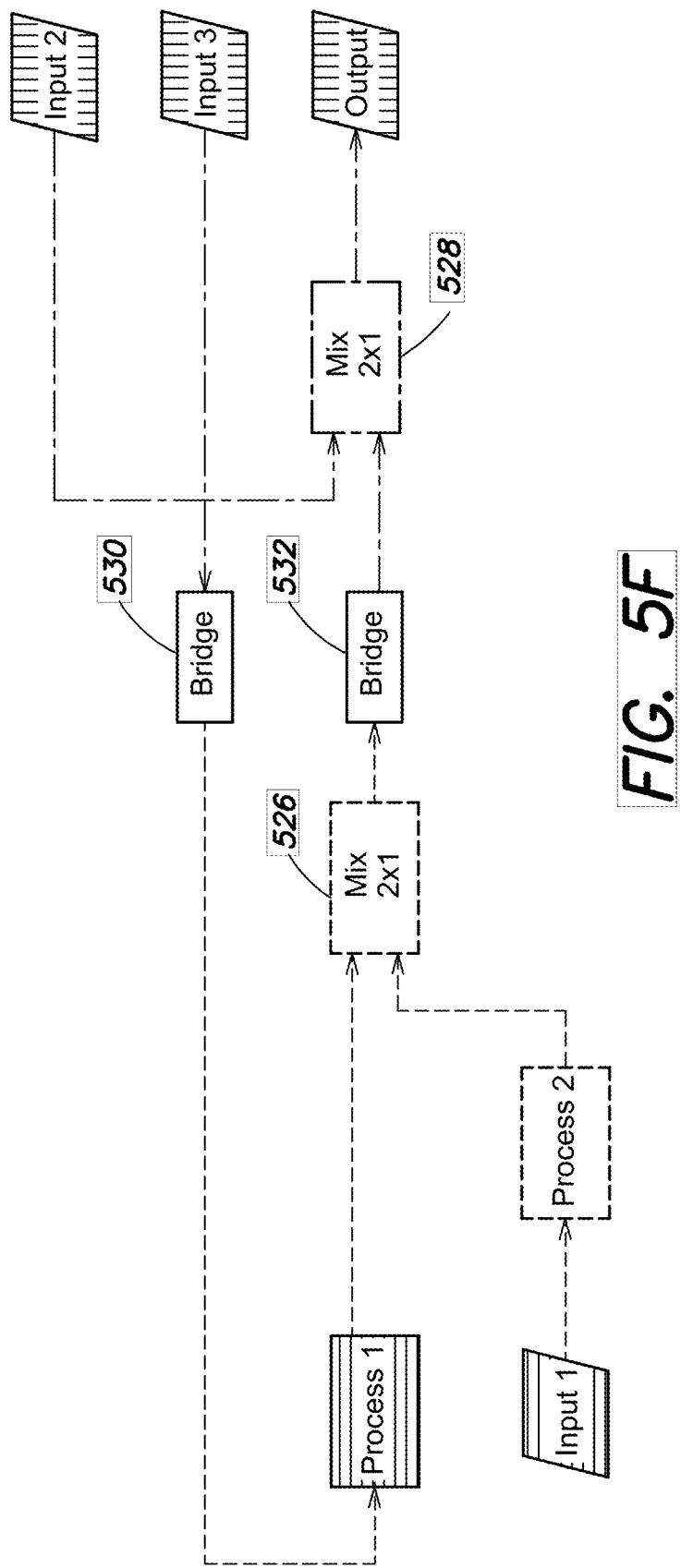

For nodes which are compatible with multiple locales, the system does not use the nearest upstream locale and instead traverses the graph until either a fixed locale is reached, or an input node is reached which is compatible with multiple locales. For example, for Pi3, the graph is traversed upstream through Process 2 to Input 1, and is therefore assigned to locale 1, the locale of Input 1. In FIG. 5D, the associative property of summing nodes combined with the ability to bypass or pass-through the mixer input and output processing nodes is used to divide the mixer into multiple processing stages 522 and 524. FIG. 5E shows the recomposed graph of FIG. 5D with the subgraphs of mixer stages 522 and 524 represented as single nodes 526 and 528 respectively. Finally, the locale equivalence of mixer processing is used to assign each mixer node to the appropriate domain, as shown in FIG. 5F. In this recomposed graph, the number of inter-locale connections is reduced to connection 530 between input 3 and process 1, and connection 532 between first mix stage 526 assigned to locale 1 and second mix stage 528 assigned to locale 2, representing the minimum number that is consistent with the required processing and locale constraints.

Figure 6A:
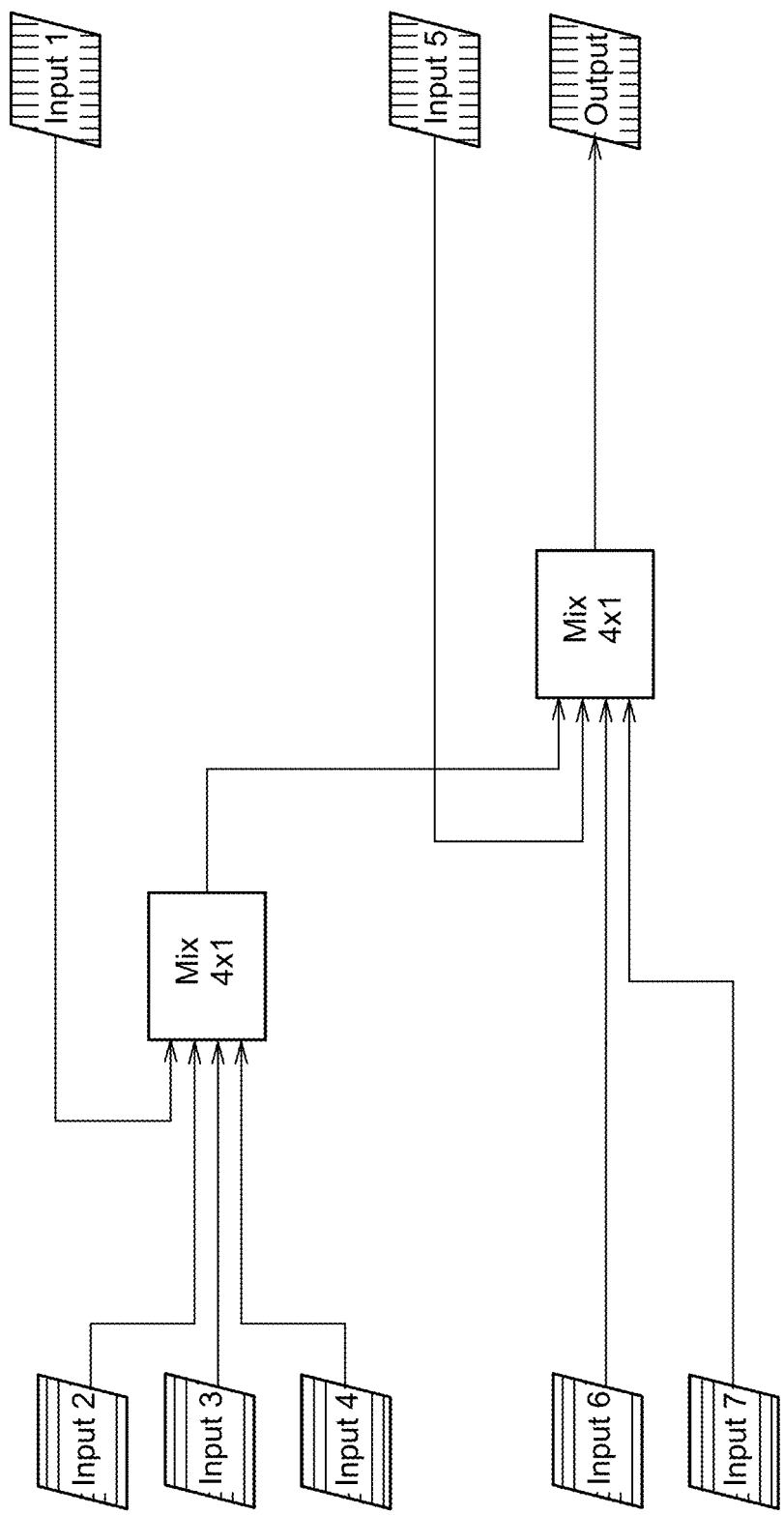
FIGS. 6A-6E illustrate the optimization of a signal graph with a chain of submixes.
Figure 6B:
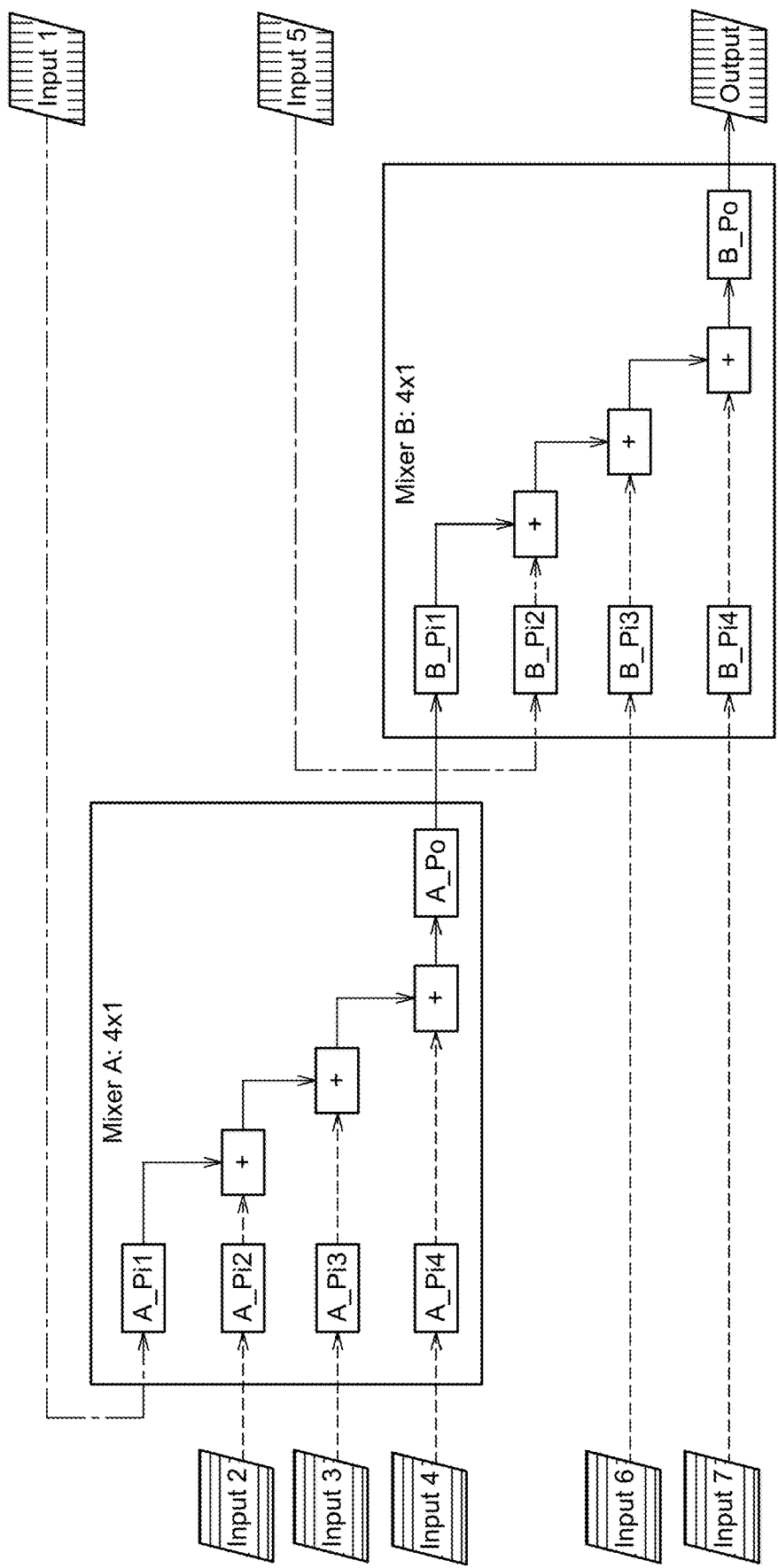
Figure 6C:
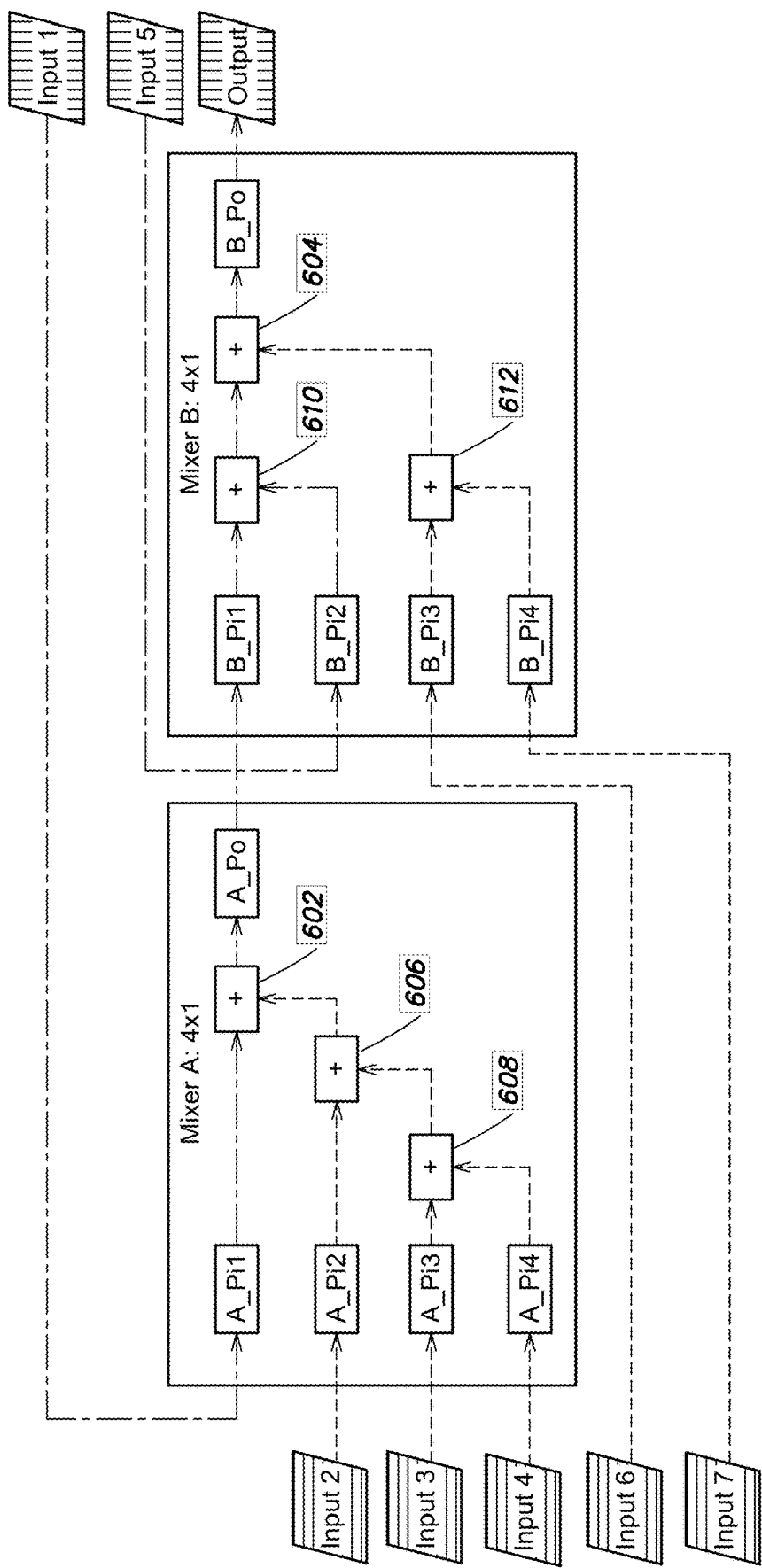
Figures 1, 6D:
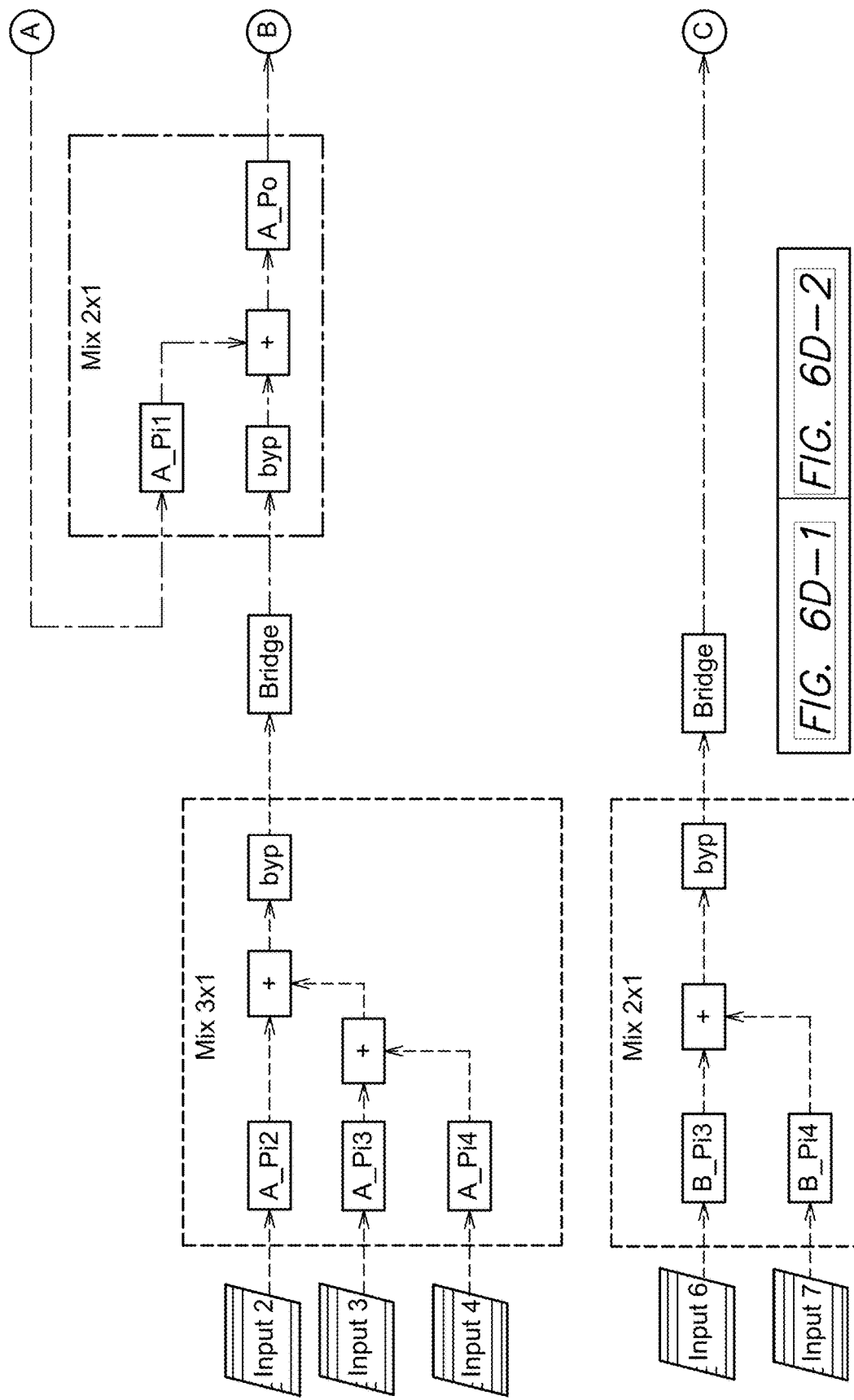
Figures 2, 6D:
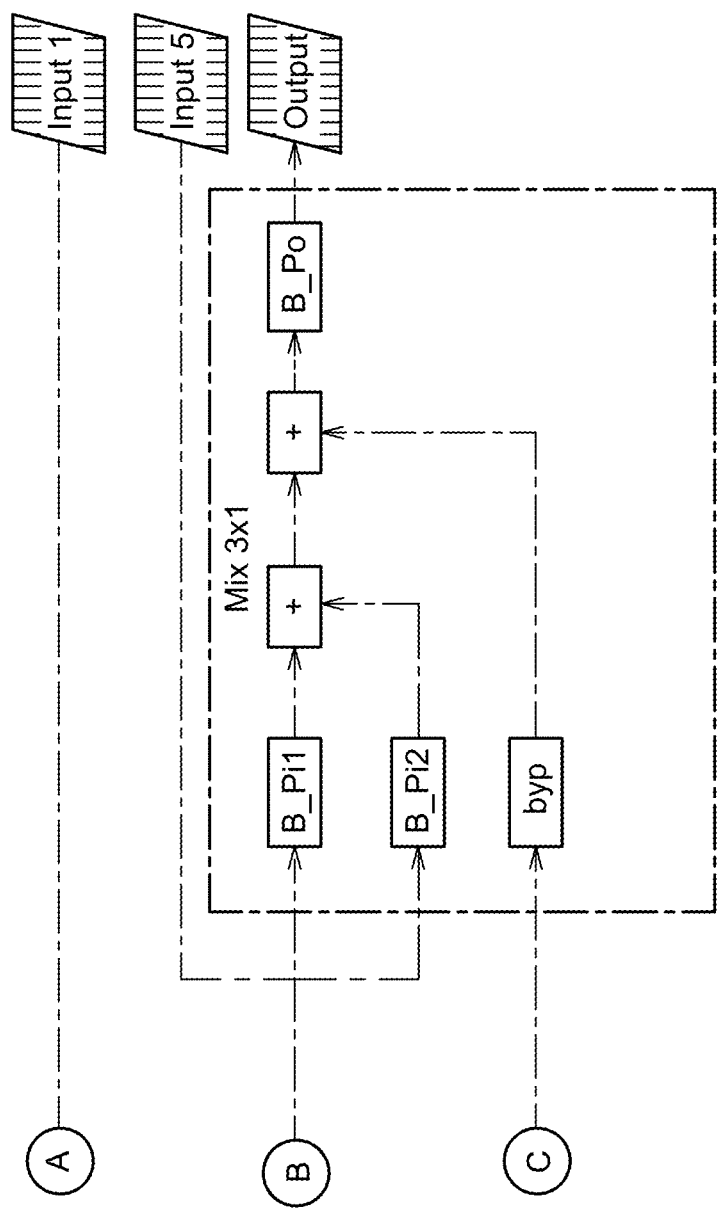
Figure 6E:
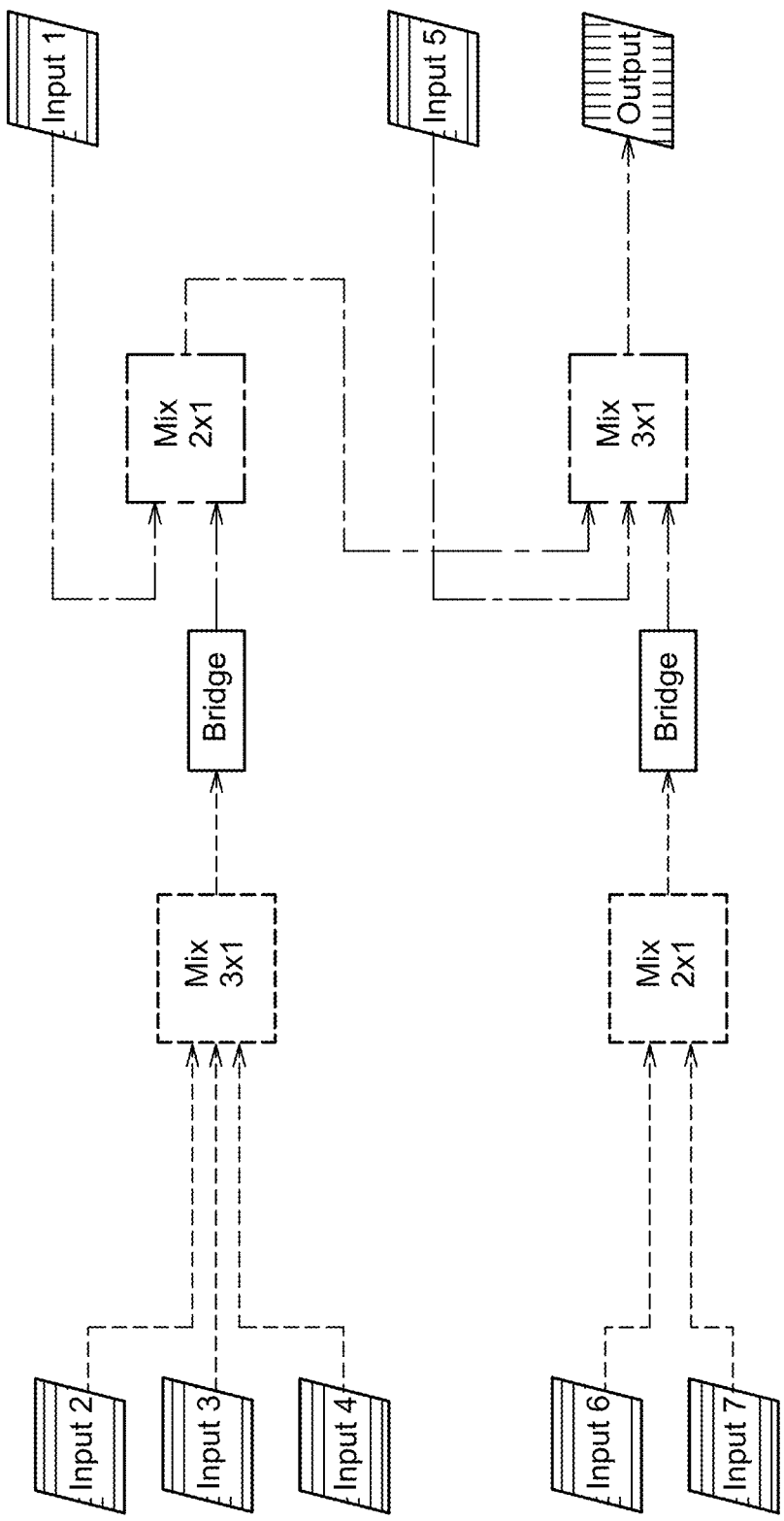

The next example shows the optimization of a signal graph with a chain of submixes. Such a scenario is illustrated in FIG. 6A in which: a first submix has three inputs in a first locale and one input in a second locale; and a second submix has four inputs comprising the output of the first submix, an input in the second locale, and two inputs in the first locale, and has an output in the second locale. In FIG. 6B the graph of FIG. 6A is shown with the mixer nodes decomposed to show their equivalent subgraphs. In the recomposed graph of FIG. 6C, the associative and commutative property of summing nodes has been used to group them by the nearest upstream locale, thus minimizing the number of nodes which combine connections from multiple upstream locales. Thus, in mixer A, numbering the mixer inputs from 1 (top) to 4 (bottom), mixer inputs 2, 3, and 4 connected to input nodes 2, 3, and 4 respectively share the same nearest upstream locale (i.e., locale 1), and are grouped. Similarly, for mixer B: mixer inputs 1 and 2 connected to input nodes 1 and 5 respectively share the same upstream locale (i.e., locale 2) so they are grouped; and mixer inputs 3 and 4 (connected to input nodes 6 and 7) share the same upstream locale (i.e., locale 1) and are accordingly grouped. The corresponding reordering of the summing sequence results in the graph of FIG. 6C, for which only summing nodes 602 and 604 combine connections from different locales, while remaining summing nodes 606, 608, 610, and 612 each only receive inputs from a single locale. Next, the associative property of sub-graph nodes and the ability to bypass or remove the mixer input and output processing stages are used to divide the mixer into multiple processing stages, as shown in FIG. 6D, and the locale equivalence of mixer processing is used to assign each mixer node to the appropriate domain. In FIG. 6E, the representation of each mixer subgraph is collapsed into a single mixer node. The recomposed graph requires only two inter-locale connections, as compared to a minimum of three inter-locale connections in the unoptimized graph.

Figure 7A:
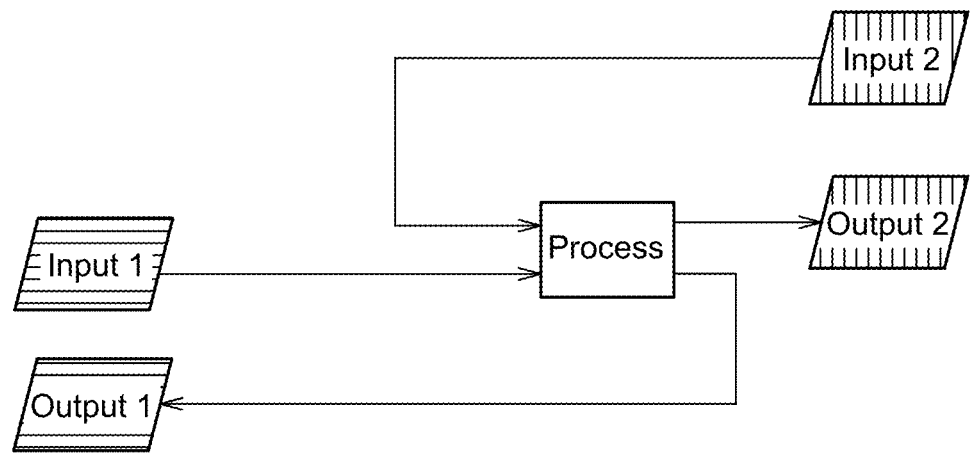
FIGS. 7A and 7B illustrate a case in which audio signal graph optimization decomposes a processing node into multiple stages that are not connected to each other.
Figure 7B:
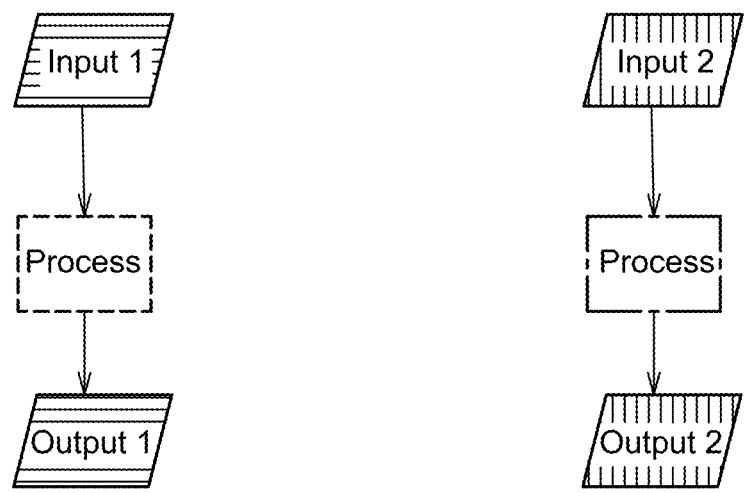

In some scenarios, such as the simple case illustrated in FIGS. 7A and 7B, the signal graph optimization may decompose a processing node, such as a mixer node or a multi-channel effect processor with independent processing applied to each channel, into multiple stages which are not connected to each other. The figures illustrate the specific case where the processing node is a mixer node.

The scenarios represented in the four examples described above consider a system with two locales. Systems with more than two locales may include processing nodes which are supported at one or more of the locales, but not at all locales. The principles and methods described herein may be applied to configurations with an arbitrary number of locales, each with an arbitrary set of inputs and outputs (live or non-live) and audio processing devices.

In addition, the scenarios represented in the four examples described above consider processing graphs containing mixer nodes which may be decomposed and re-composed. The system may include other and distinct types of nodes which may be de-composed into sub-nodes or composed from particular sub-graphs of nodes. The principles and methods described herein may be applied to any such nodes and may result in an optimized graph with a different composition of processing node types than in the original graph or in an unoptimized instance of the graph."

A system running the audio processing graph optimization according to the methods described herein may be implemented within the machines which also apply the audio processing for the nodes associated with one of the locales represented in the graph, or may be implemented in another system in data communication with one or more systems that perform the audio processing. For audio networks in which audio signals are recorded, a general-purpose computer hosting a DAW that provides an interface through which the user defines the audio processing and signal routing and network constraints may in addition perform the role of system controller. For purely live performance settings, the network may include only inputs, outputs, and processing nodes. The signal processing network and controller may be implemented in a cluster of cloud computing resources.

For simplicity, the scenarios discussed above show mixer stages with a single output, but the described methods may be applied to mixers with an arbitrary number of inputs, outputs, and with arbitrary and independent input and output processing applied to each of the mixer's summing stage input and output signals. The independence of a mixer's input and output processing nodes, as mentioned above, enables a mixer with N inputs and M outputs (N×M) to be decomposed into an arbitrary number of mixer stages, the sum of whose numbers of inputs is N and each of which have M outputs. These techniques may be applied recursively to further decompose and re-compose the mixer or any other processing node with these characteristics until an optimal arrangement of nodes is accomplished. Examples of decomposed mixer combinations equivalent to an N×M mixer include M N×1 mixers, a pair of one N×(M−1) and one N×1 mixer, and (M/2) N×2 mixers. When decomposing a mixer into sub-mixer stages, any of the processing stages may be a pass-through, equivalent to a direct wire through the stage, or any other way of setting the gain coefficient to unity or otherwise passing the signal without change for a node between a mixer input and a mixer output.

Figure 9A:
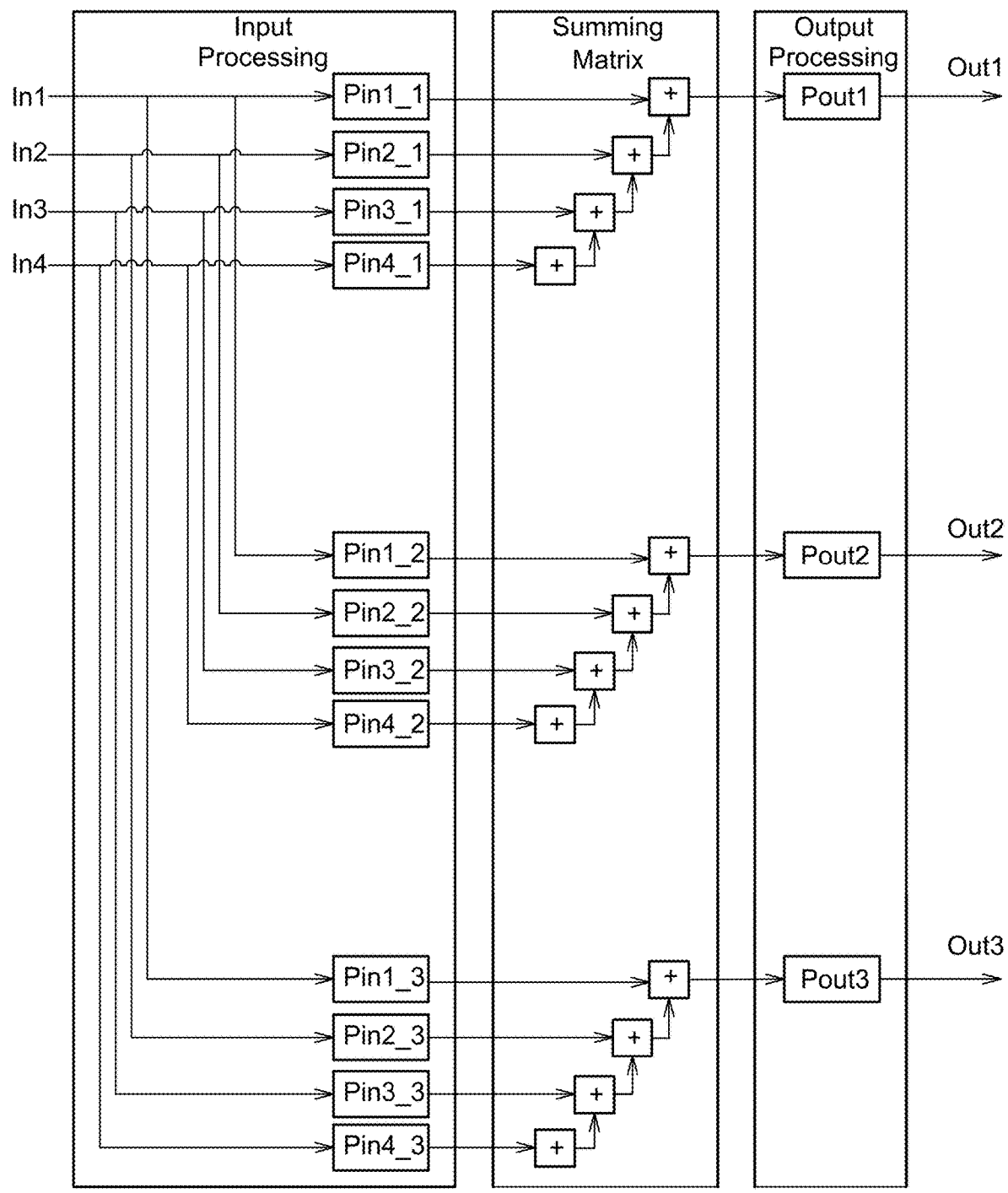
FIGS. 9A-9E show four possible recompositions of a mixer with four inputs and three outputs.
Figure 9B:
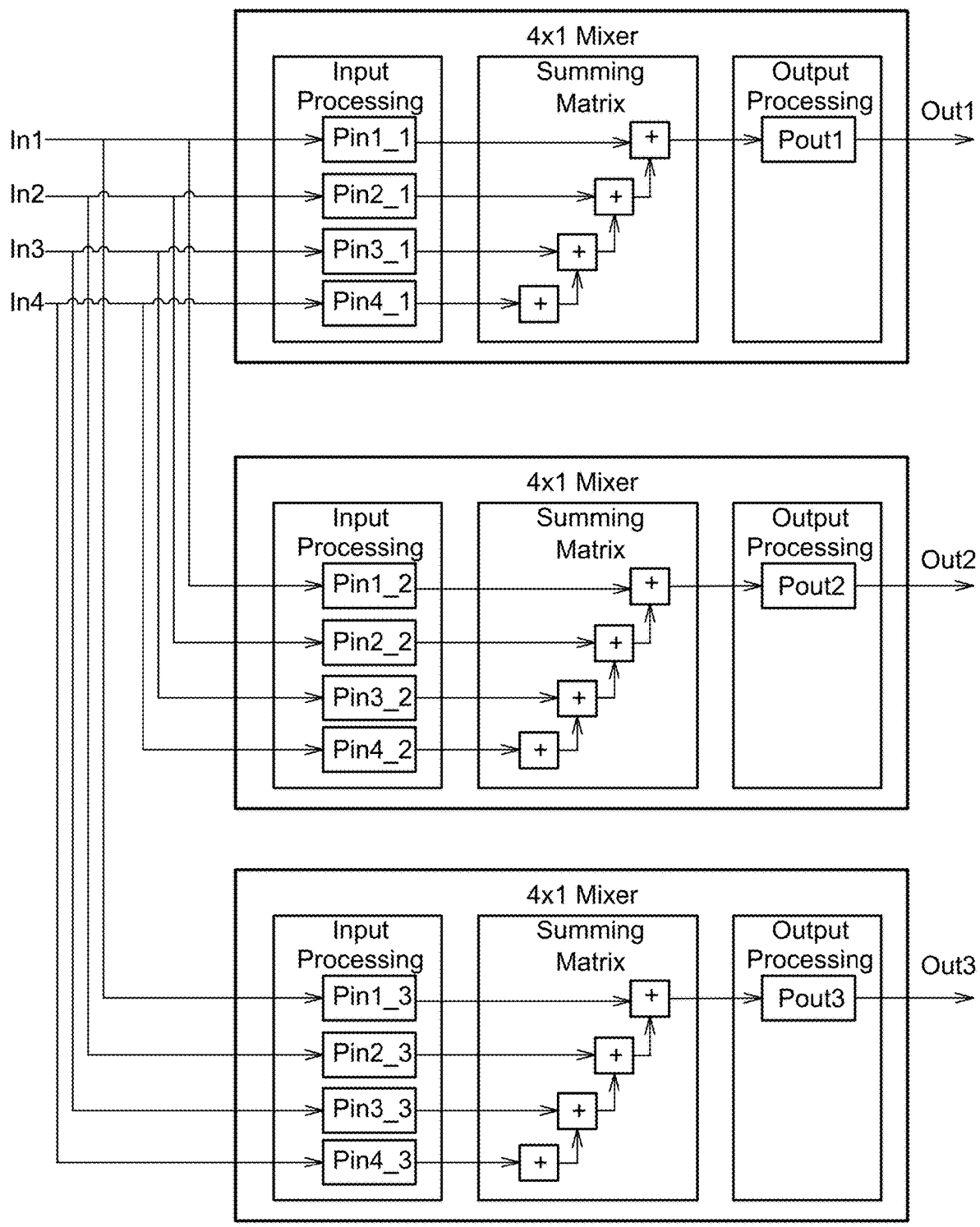
Figure 9C:
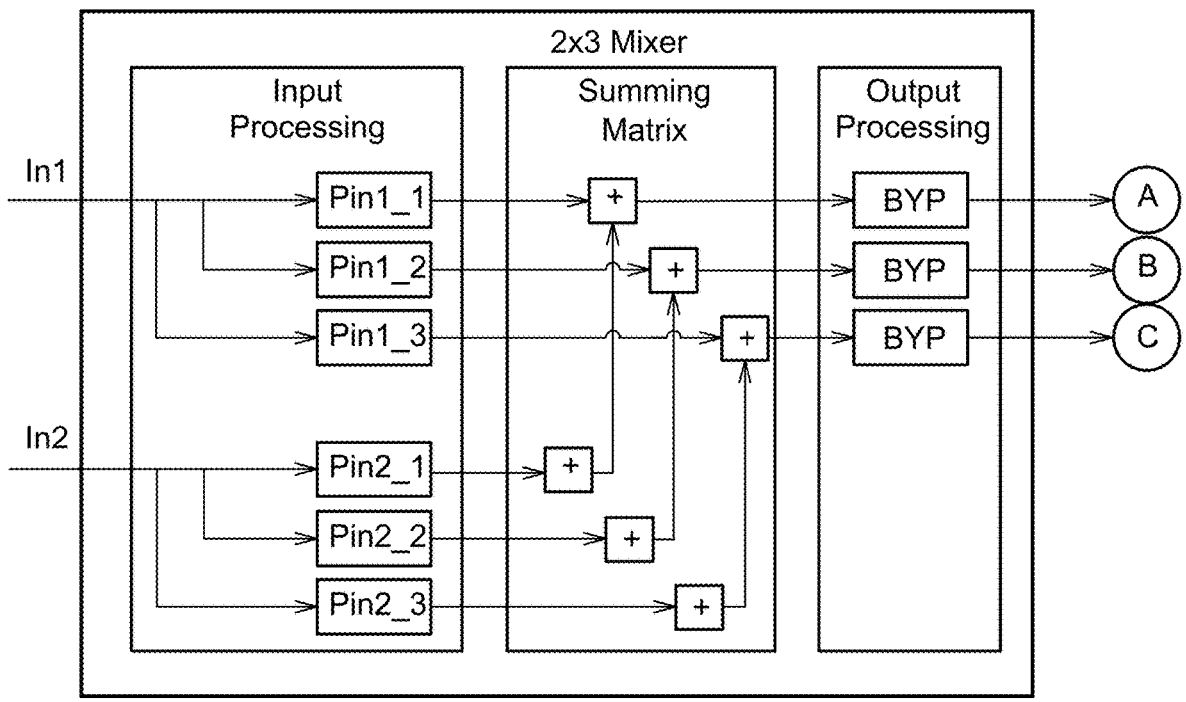
Figure 1:
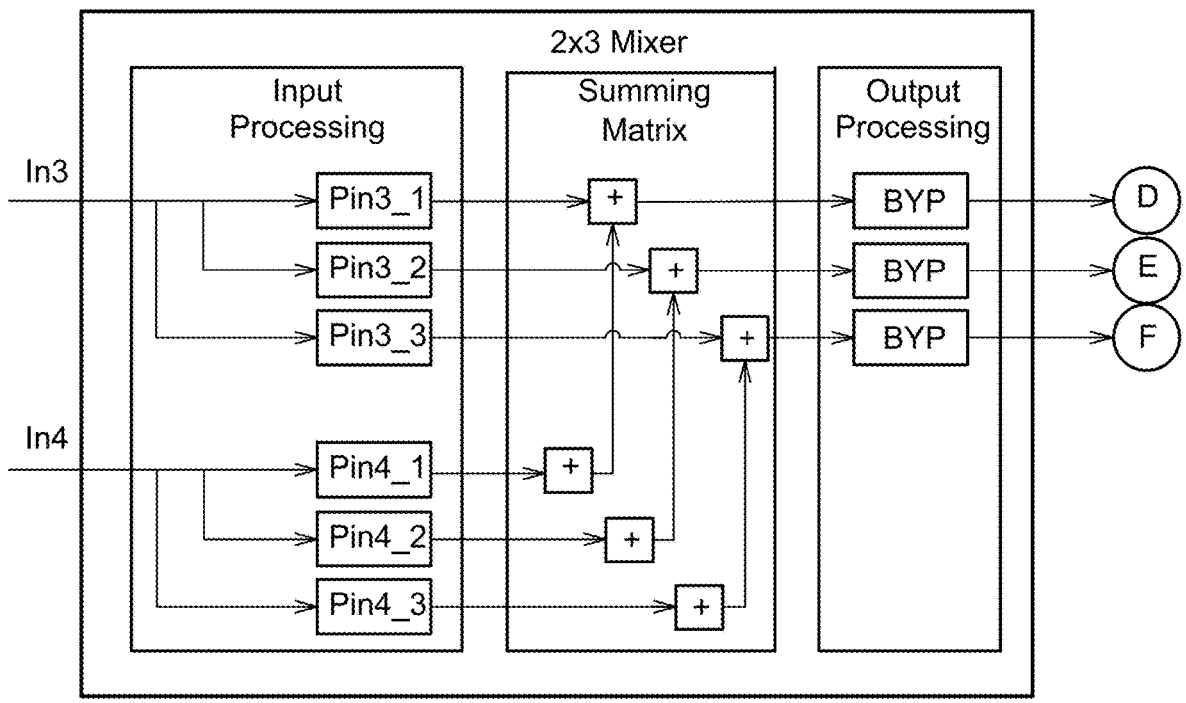
Figures 1, 9D:
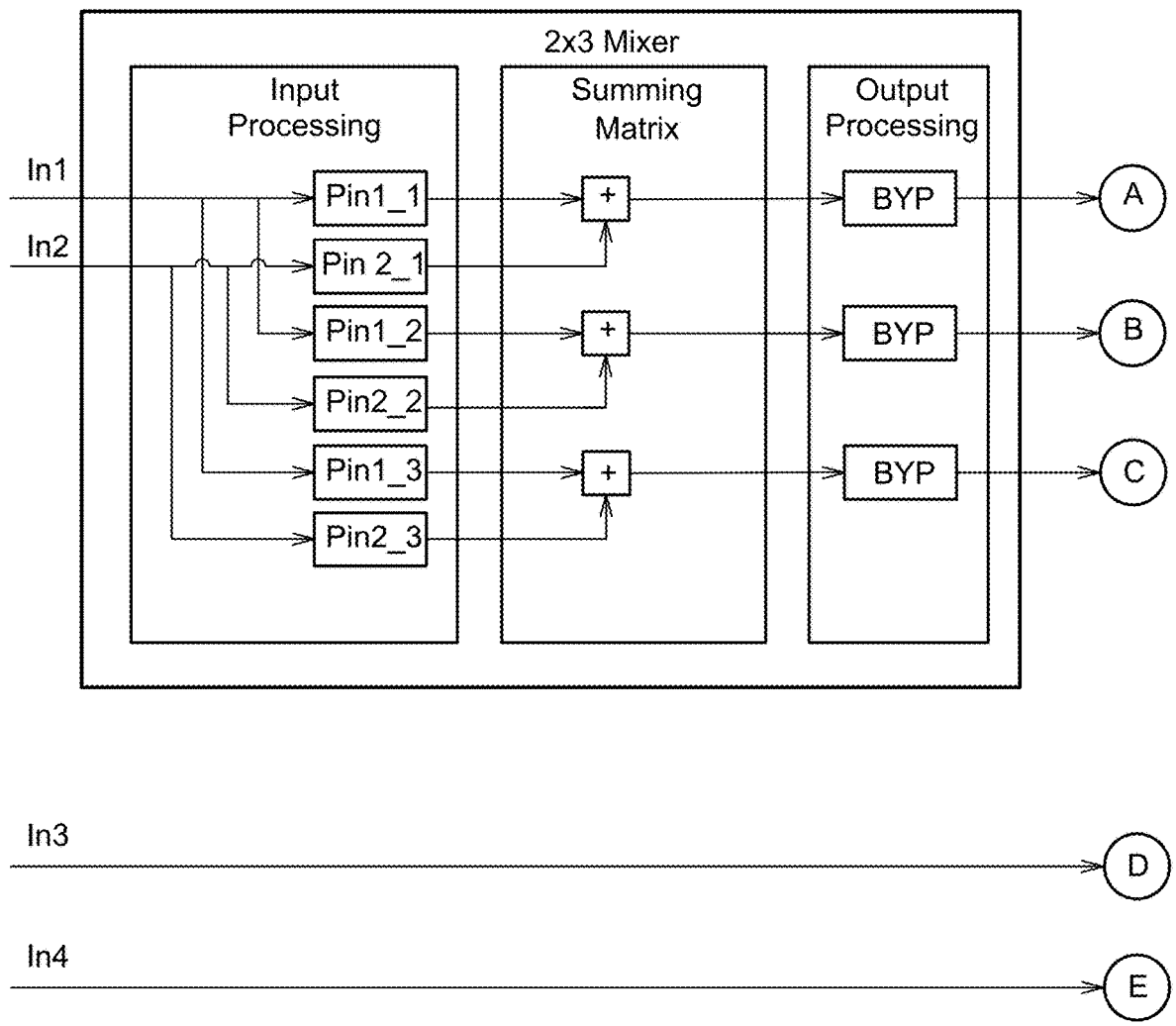
Figures 2, 9D:
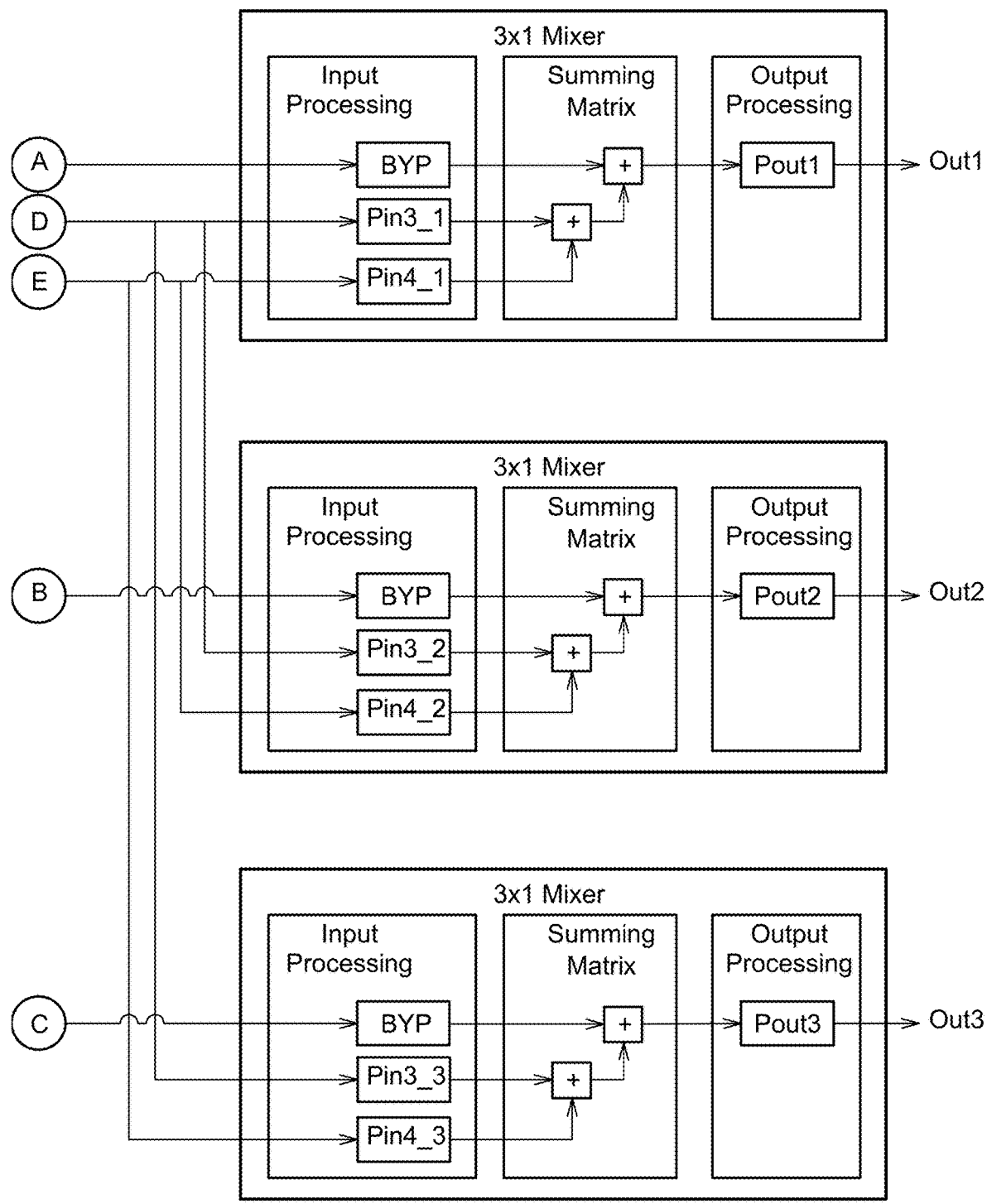
Figures 1, 9E:
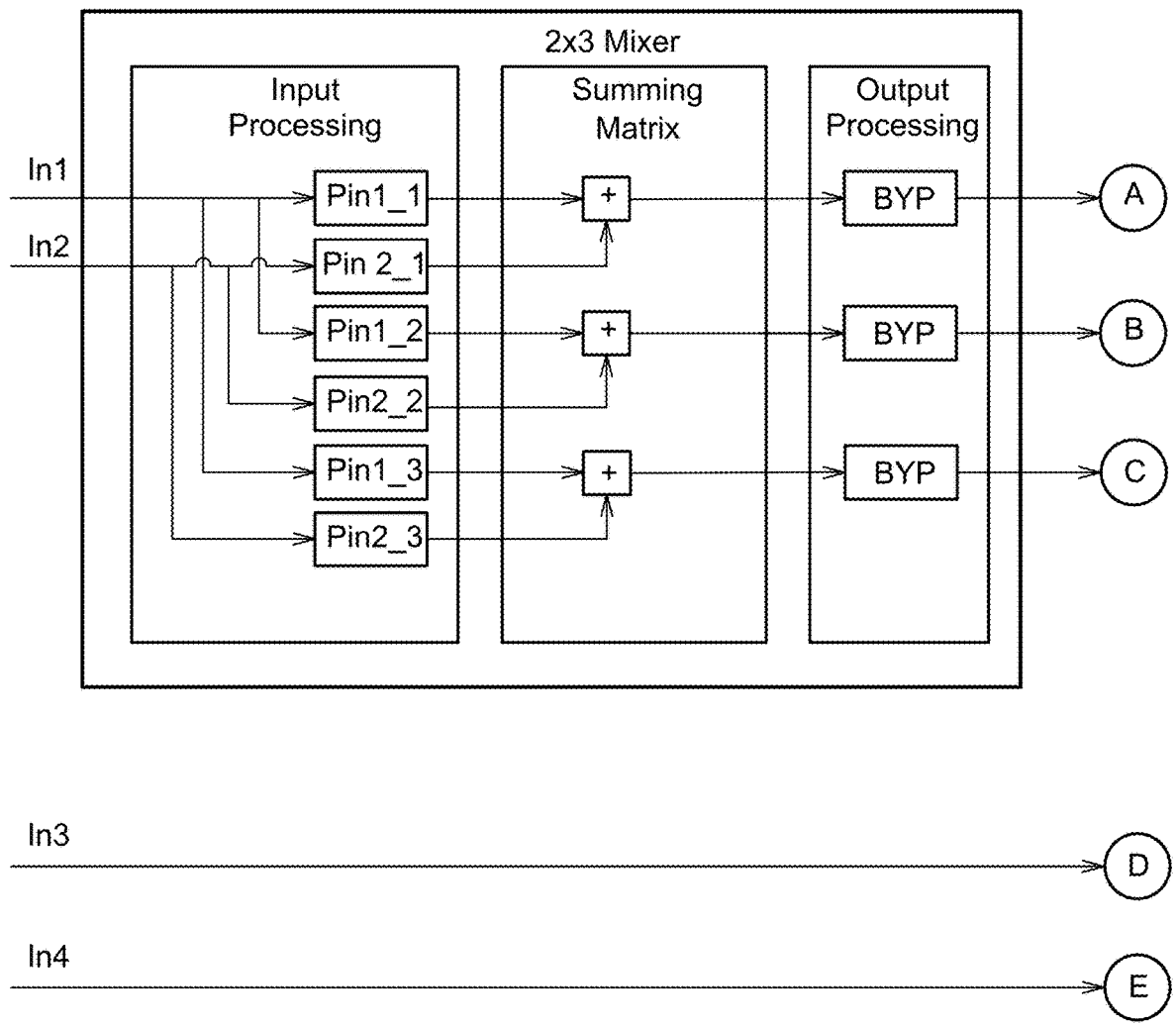
Figures 2, 9E:
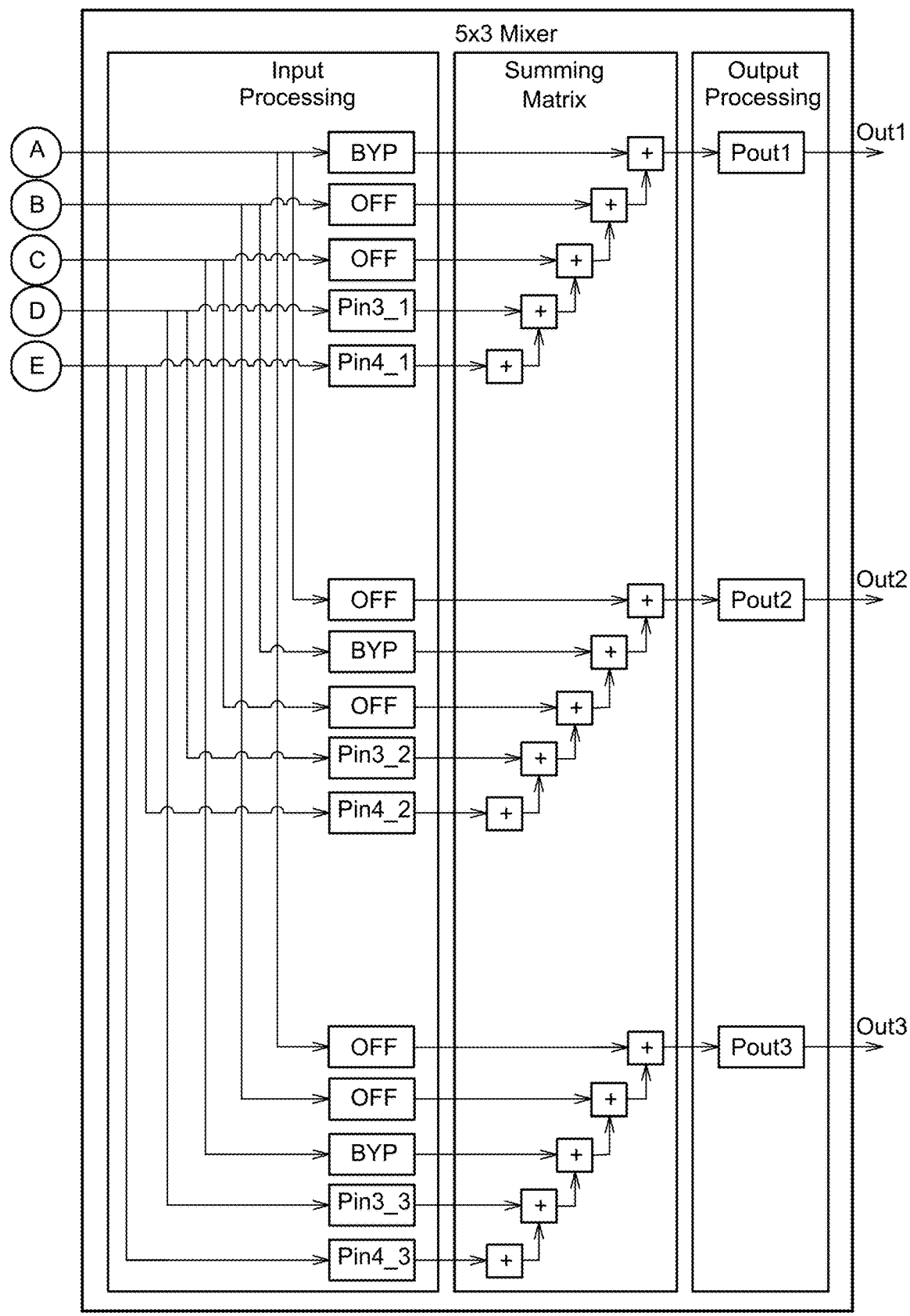

We now describe an example of equivalent graph recomposition for a multi-output mixer, specifically four different equivalent re-compositions of a mixer with four inputs and three outputs (4×3) which can be achieved using the techniques described herein. FIG. 9A shows the initial graph for a 4×3 mixer. In the first recomposition shown in FIG. 9B, the graph is recomposed as three 4×1 mixers by using the independence of mixer sub-nodes. In the second recomposition shown in FIG. 9C, the 4×3 mixer is recomposed as two 2×3 mixers and three 2×1 mixers in parallel. This recomposition relies upon the independence of sub-nodes, the associative and commutative properties of summing sub-nodes, and on the ability to bypass input and output processing nodes. Instead of bypassing, other methods may be used to ensure that the signal in the first mixer prior to its output processing stage for a channel is equivalent to the signal in the second mixer following its input processing stage for a channel, such as applying inverse operations in the connected first mixer output and second mixer input stages for a channel. In the third recomposition shown in FIG. 9D, the 4×3 mixer is recomposed as one 2×3 mixer and three 3×1 mixers sequentially. As for the recomposition for FIG. 9C, this recomposition relies upon the independence of sub-nodes, the associative and commutative properties of summing sub-nodes, and on the ability to bypass input and output processing nodes. Yet more recomposition techniques are possible if the input or output processing for a channel can be configured to eliminate or zero out the signal for that channel. In the fourth recomposition shown in FIG. 9E, the 4×3 mixer is recomposed as one 2×3 mixer and one 5×3 mixer sequentially. In addition to the properties relied upon for the recompositions of FIGS. 9C and 9D, this relies the ability to turn off a signal at the point of an input or output processing node. Using the ability to eliminate a signal at an input or output point of a mixer, each mixer may be grown and configured arbitrarily to ensure that a specific combination of the mixer's input signals is summed together by the mixer to produce the signal at a particular output. The same techniques may be applied to mixers which have the ability to omit certain inputs from the summing stage. This allows a system to take full advantage of the associative and commutative properties of the nodes without being constrained by the topology of the summing matrix within the recomposed mixer stages.

The techniques described herein may be used for mixers with other internal topological capabilities and constraints such as the ability to select which channels are summed, or in which order the summing must occur. More generally, the methods apply to processing nodes including non-mixers about which the controller has sufficient information and capabilities to compose an instance of such a node from a graph of sub-nodes subject to the capabilities and constraints of the processing node being composed.

Figures 2, 8A:
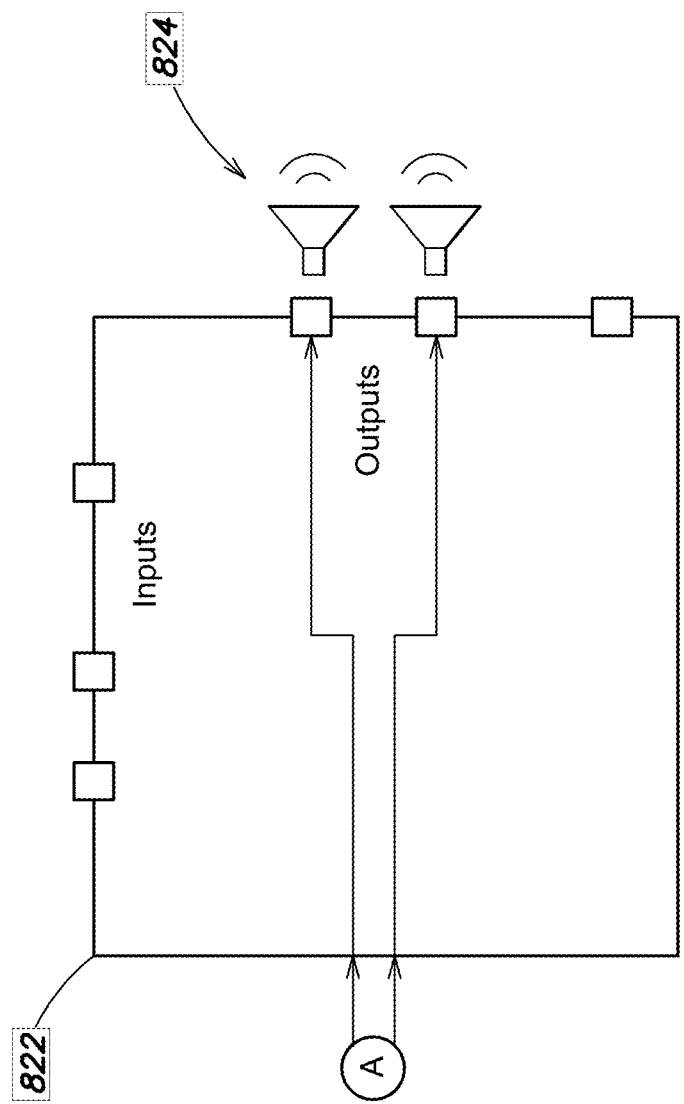
FIGS. 8A-8I illustrate an application of audio signal graph recomposition to a typical use case in which a DAW running on a general-purpose computer in a first locale is connected to a remote audio processing device.

In a typical use case, a DAW running on a general-purpose computer in a first locale is connected to a remote device at a second locale with input/output and audio signal processing capabilities. For example, the remote device may be a Pro Tools®|HDX device, an audio processing and input/output device available from Avid® Technology, Inc., of Burlington, Mass., with a connection to Pro Tools, a DAW also from Avid Technology, Inc. In this scenario, there are multiple non-live inputs at the first locale, and a live input and live output at the second locale. FIG. 8A illustrates playback of pre-recorded data across eleven sources with various mixing and processing applied. Workstation 802 hosts the DAW application, which is illustrated by DAW user interface 804 containing multiple tracks listed by name in column 806, with guitar track 808 at the top. The processing that is performed on the various tracks prior to output is indicated by signal processing graph 810, which includes effect processing indicated by the boxes labeled FX, drum sub-mix 812, main mix 814, and effect FX1 816. Two effects applied to the guitar track are indicated by GFX1 818 and GFX2 820. The effects may be implemented by software provided by the DAW, or by software plug-in modules, both of which execute natively on the general-purpose CPU of the host system. The fully mixed signal is output by workstation 802 and streamed to audio processing device 822.

Audio processing device (also referred to as an audio interface) 822 may include digital signal processing hardware (DSP) implemented by a custom DSP chip or on a FPGA. The signal processing may also be performed on a general-purpose CPU such as an ARM or Intel® processor. This CPU may also be tasked with other duties which are not related to audio processing. For example, an audio interface which contains only a single ARM chip may perform all of the responsibilities of the system including audio processing, network services, front panel control, and so on. In the example shown in FIG. 8A all the effects processing and mixing is performed on workstation 802, and thus the audio signal received by the audio interface is passed through with no further processing to outputs 824 comprising one or more of loudspeakers and headphones. While the large buffer size used for audio processing by the workstation CPU introduces significant latency, this is not usually apparent in playback mode since there is no live input which is being delayed before being presented to the user.

Figures 2, 8B:
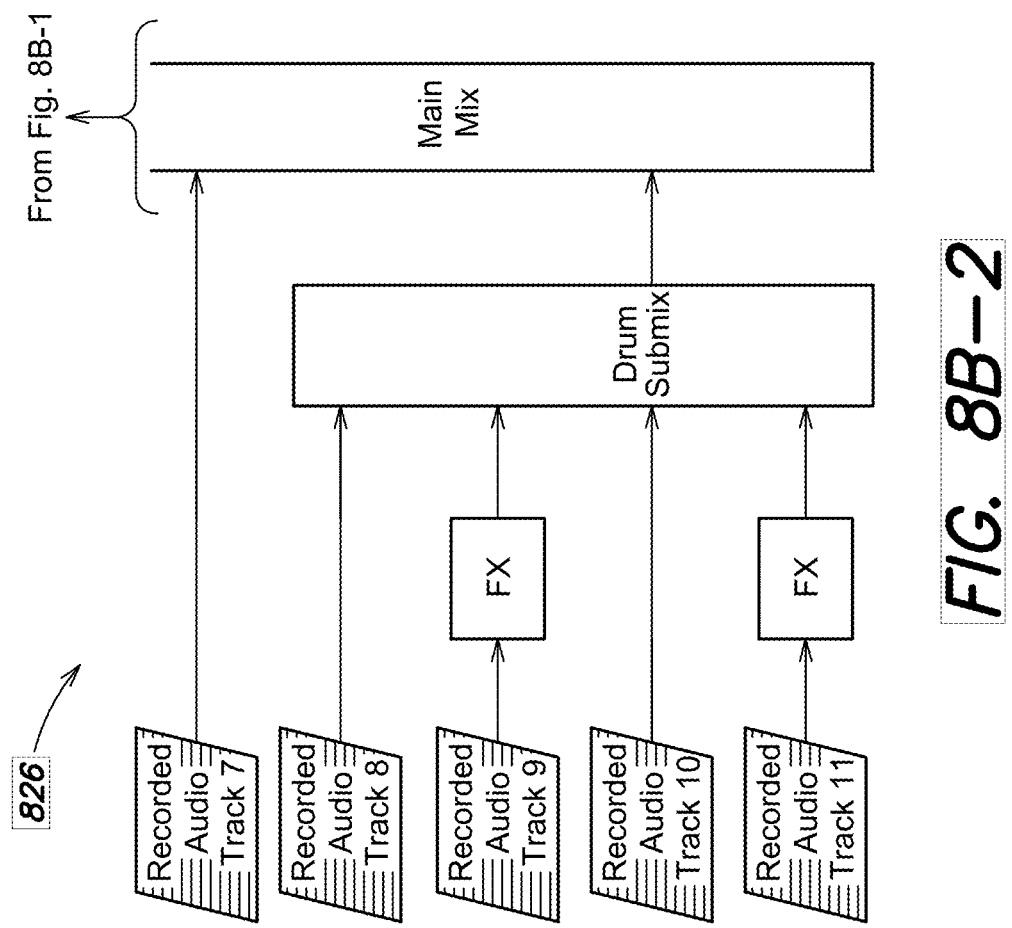
Figures 1, 8C:
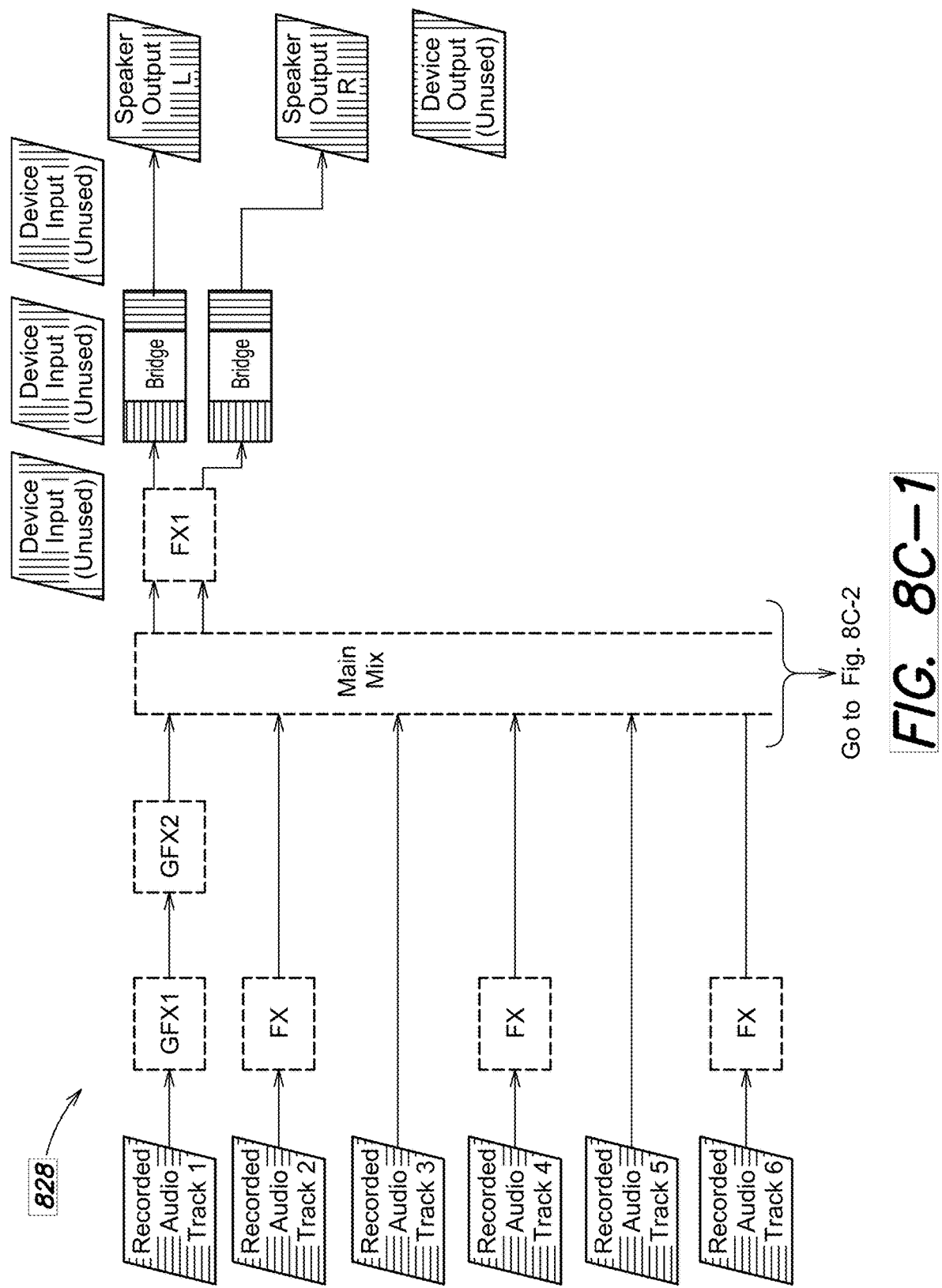

FIG. 8B shows audio signal processing graph 826 corresponding to the system in playback mode as shown in FIG. 8A, with 11 pre-recorded inputs in locale 1 and two outputs at locale 2. FIG. 8C shows optimized graph 828, with the effect processing and mixing assigned to locale 1, and the main mix output streamed over inter-locale connections to the outputs at locale 2. In this particular use case, since this solution assigns all the processing to the DAW at locale 1, the result matches the default graph established when a user configures routing and processing using a DAW connected to a remote audio processing device.

Figures 1, 8D:
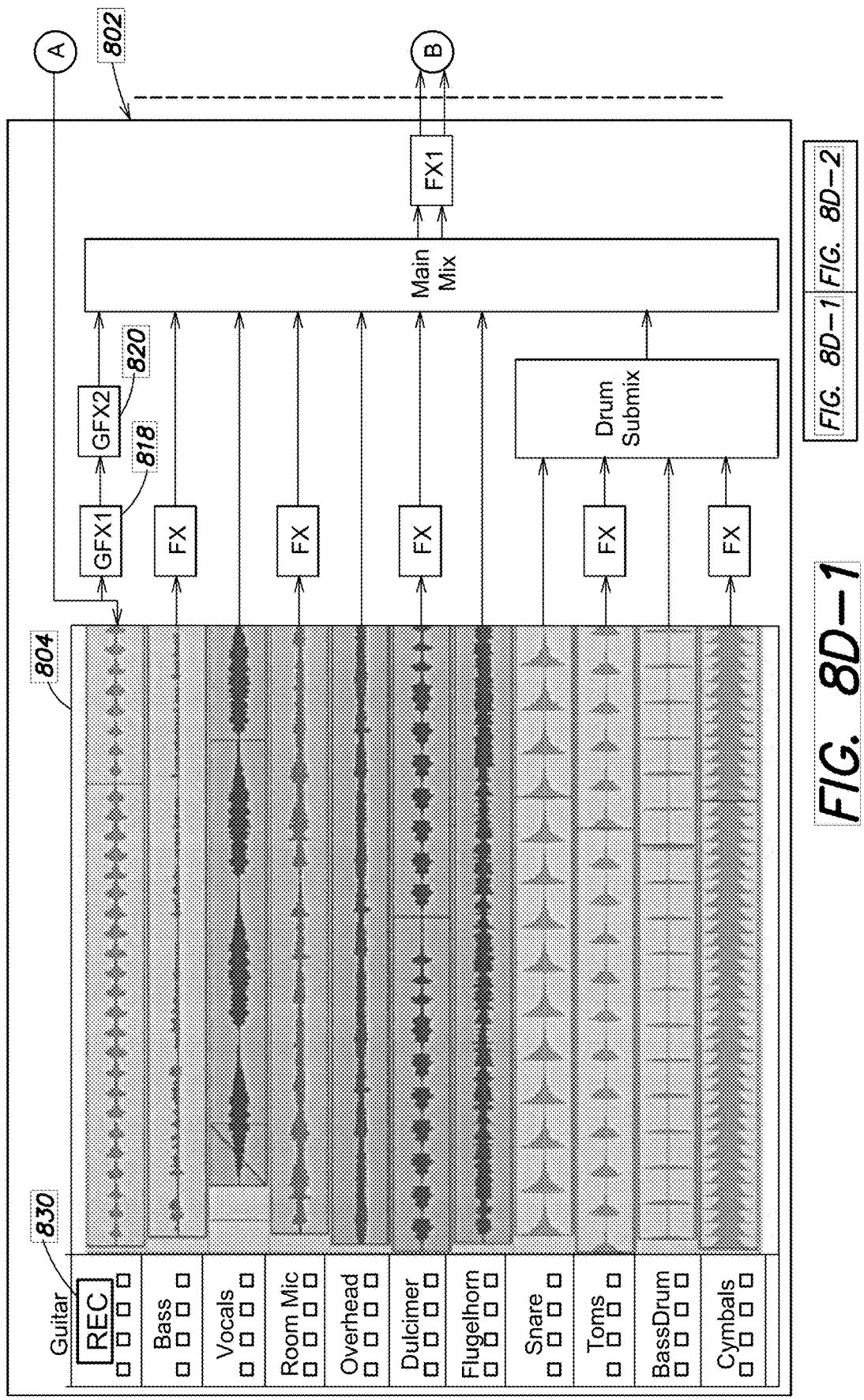

When recording and input monitoring is activated, the situation changes. FIG. 8D shows the record/monitor mode with the signal processing graph unchanged, i.e., with all the signal processing taking place on plug-ins native to the DAW. The user selection of "record" for the guitar track is shown in the DAW user interface by indication 830. Live guitar input 832 is sent from audio processing device 822 in the locale proximal to the performer (i.e., the second locale) to workstation 802 hosting the DAW in the first locale, where it is recorded and also processed by native guitar effect plug-in modules GFX1 818 and GFX2 820, mixed with the pre-recorded tracks, and streamed back to locale 2 for output. Compared with the playback scenario of FIG. 8A-8C, the live input signal replaces the data which was previously played back on recorded audio track 1. The live guitar input makes a round trip from the second locale to the first locale and back again before being output as a processed, mixed monitor signal, resulting in undesirably high latency. A performer is sensitive to very small latencies, often as low as a millisecond, between the actual performance of a note and the receipt of a monitor signal of the note synchronized with pre-recorded tracks being streamed from the DAW. Before optimizing the signal graph, a user may specify that a low latency pathway is desired between the guitar input and the speaker output.

Figures 2, 8E:
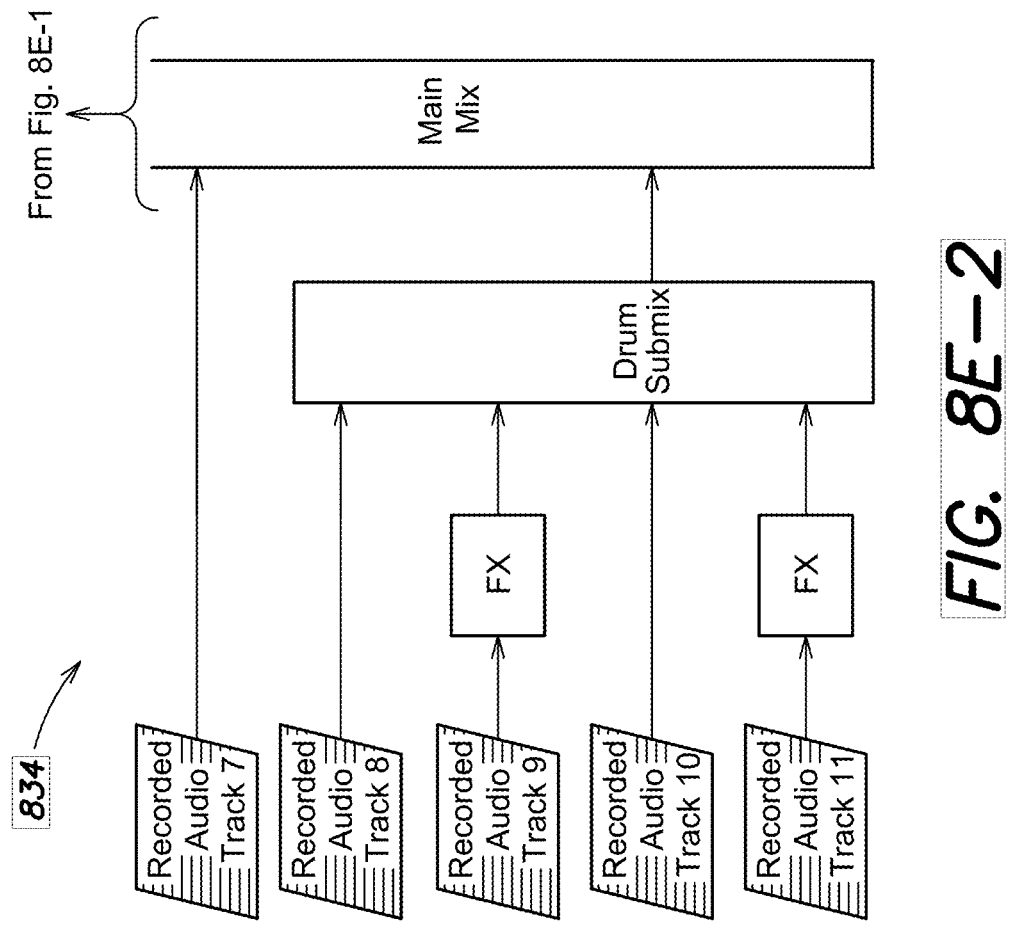
Figures 1, 8F:
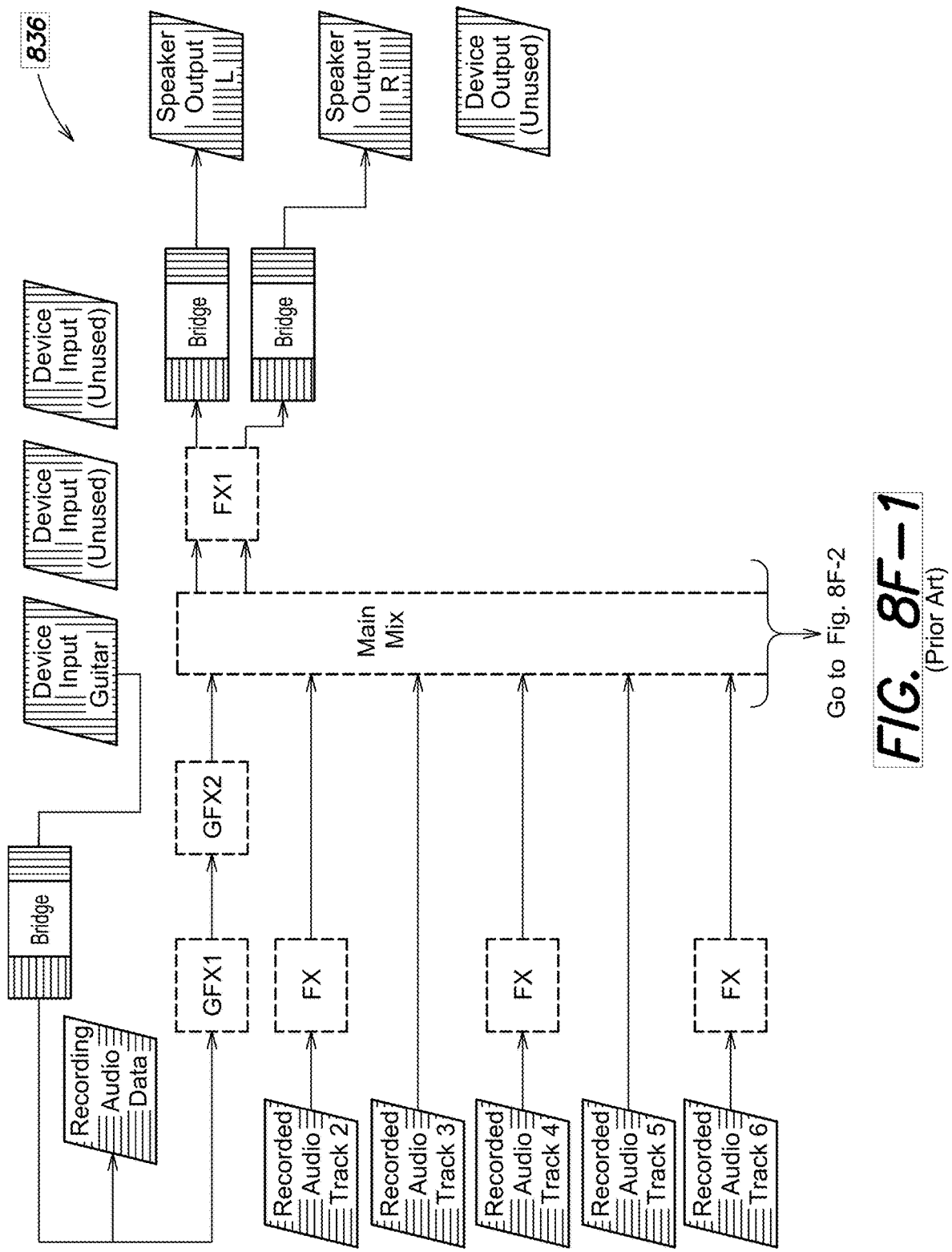
Figures 2, 8F:
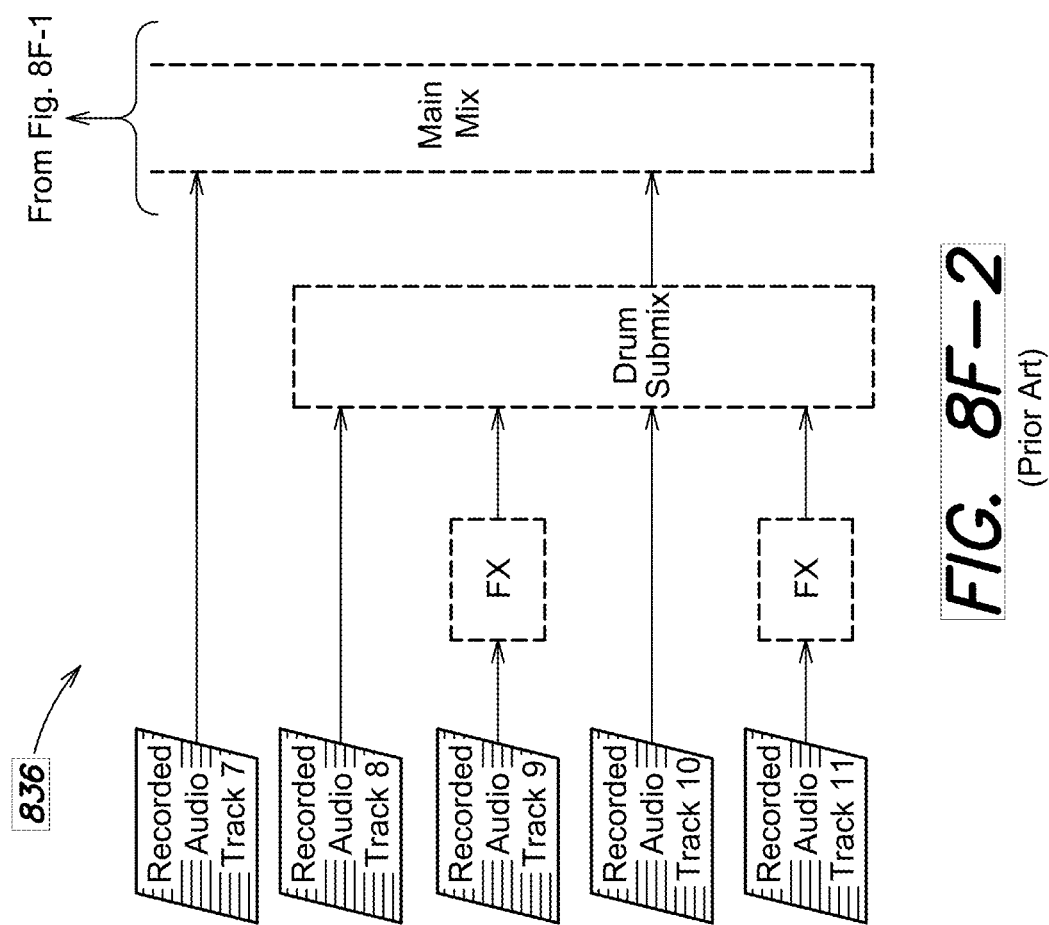

FIG. 8E shows signal graph 834 corresponding to the record scenario of FIG. 8D. In systems equipped with a DAW but no dedicated audio processing device, the signal graph nodes would be allocated to the network resources as shown in signal graph 836 of FIG. 8F. All the audio processing is performed in the DAW, and guitar input signal makes a round trip from locale 2 to locale 1 and back again before being output at locale 2. Three inter-locale connections are required, one to transport the guitar input signal to the DAW, and two to stream the two outputs from the DAW to the speakers. In this graph, the round-trip from the guitar input to the general-purpose computer and back to the speaker output has a high latency.

Figures 1, 8G:
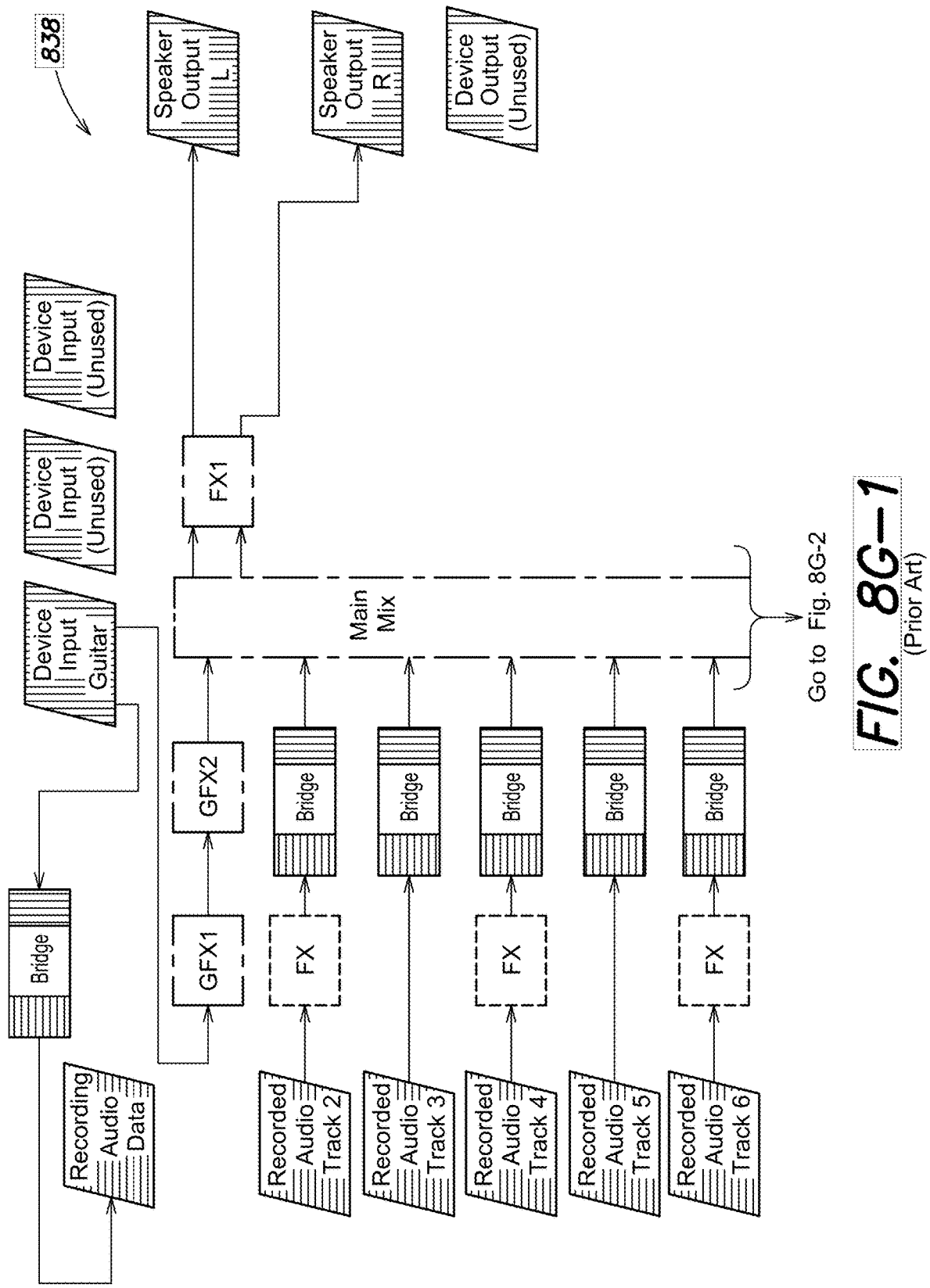
Figures 2, 8G:
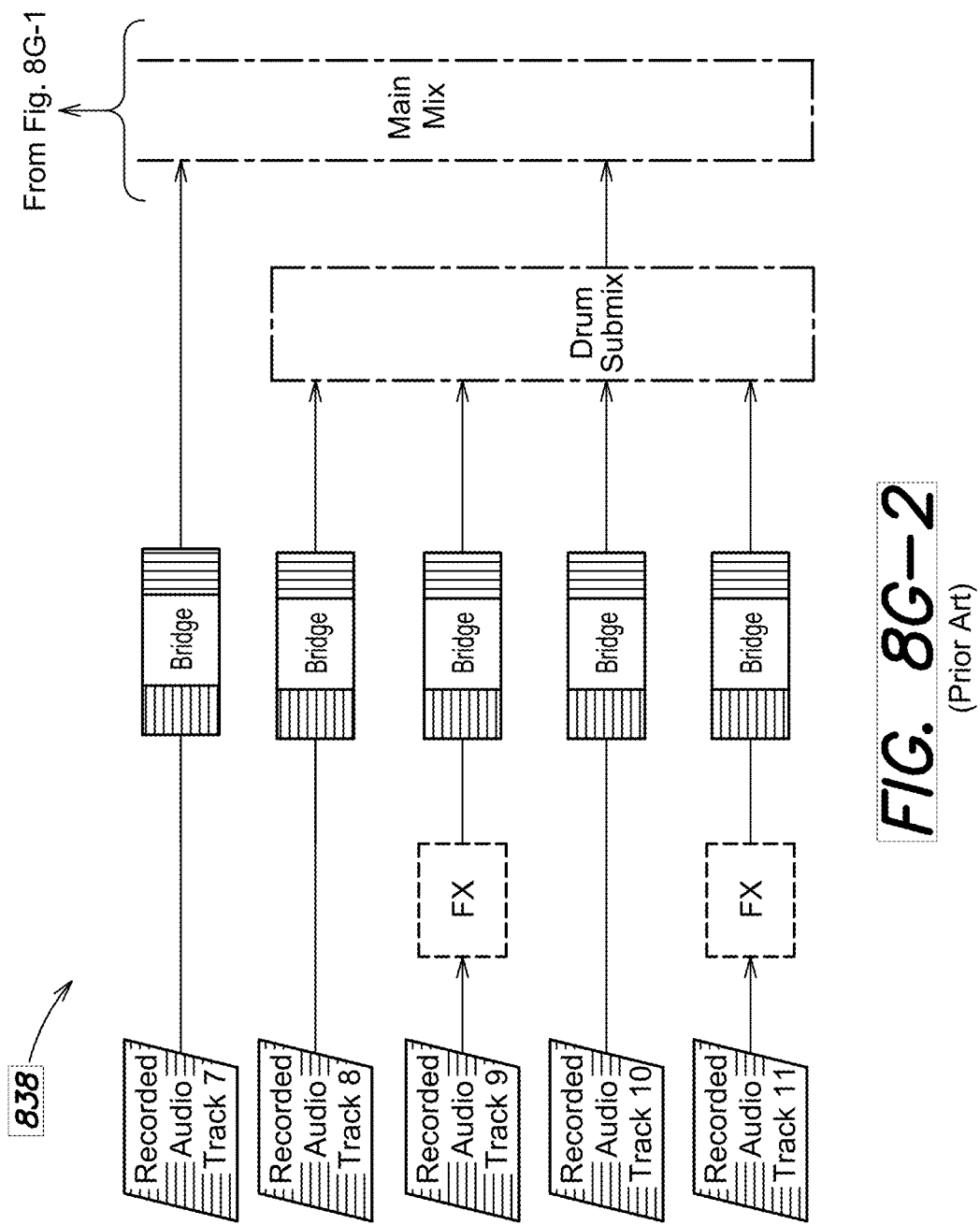

In systems equipped with a dedicated audio processing device, such as a Pro Tools|HDX device, the graph nodes must be allocated as shown in FIG. 8G since such systems require all the mixing to be performed on the dedicated device. Alternatively, if the user specifically requests it, all the effects processing functions may be allocated to the system hosting the DAW, in which case the graph reverts to that of FIG. 8F. FIG. 8G shows graph 838 corresponding to the user's choice to perform the audio effects processing on the DAW, i.e., locale 1, with the mixing (and effects processing downstream of the mixing) performed as required on the dedicated device in locale 2. In this instantiation of the graph, 11 inter-locale connections are required, but the latency issue is addressed since the signal path from the guitar input to the speakers is confined to locale 2, thus involving no hops between locales. In some current systems, the user is also able to make the sub-optimal choice of allocating the downstream processing to the host computer, resulting in an unnecessary round-trip.

Figures 2, 8H:
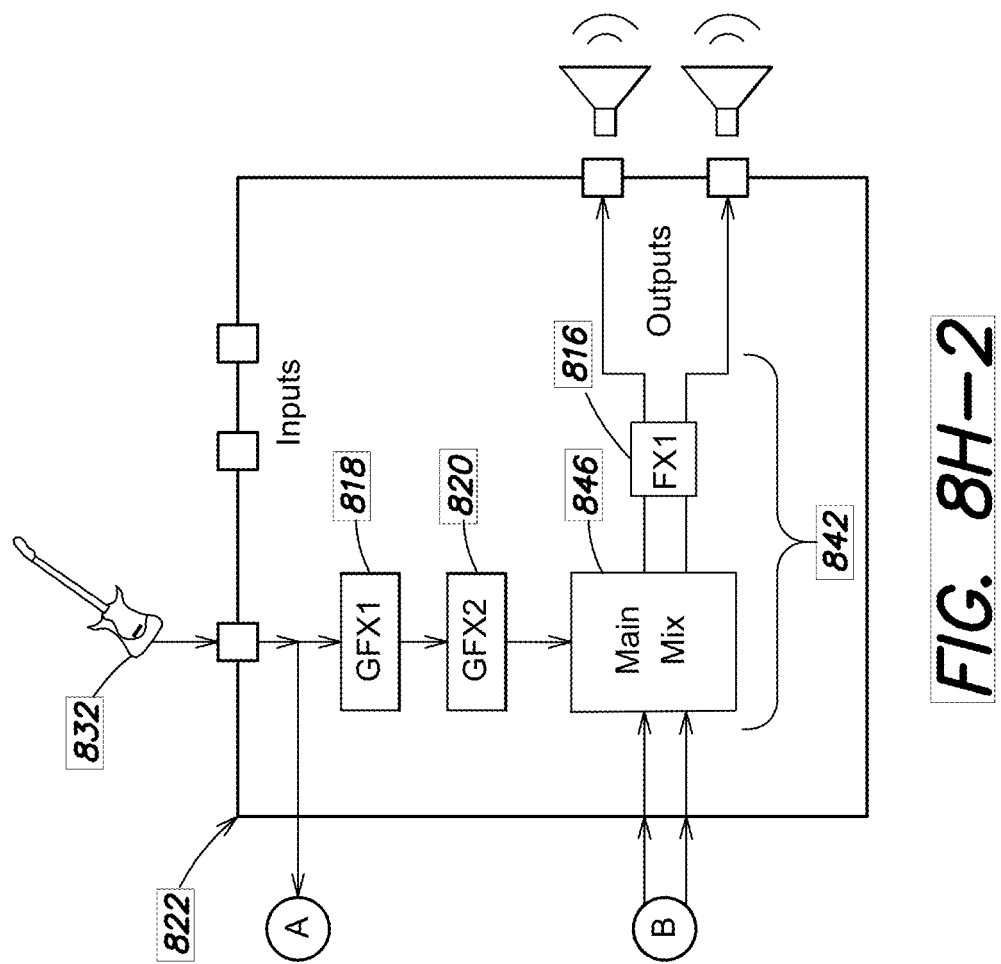

Using the optimization methods described herein, the audio signal graph is automatically recomposed as shown in FIG. 8H. In the recomposed graph, the live input signal processing is moved to the location of the performer where the guitar effects processing is performed by audio processing device 822 and signal graph 810 (FIG. 8A) is automatically partitioned between signal graph 840 within workstation 802 and signal graph 842 within audio interface 822. Specifically, the monitor signal path which includes guitar effects GFX1 818 and GFX2 820 is moved to audio interface 822. Since main mix 814 as well as effect FX1 816 are applied to the entire mix, these processing steps are also moved from the workstation to the audio interface so as to preserve the overall equivalence of subgraphs 840 and 842 with original signal graph 810. As with the guitar effect plug-ins, these modules may also be implemented as software plug-ins adapted for execution on a DSP. The automatic decomposition of main mixer 814 into main partial submix 844 assigned to the DAW and main mix 836 846 assigned to the live performer location, as well as the reassignment of the guitar effects processing and the FX1 processing rely on the methods described herein, which in turn relies on the associative and commutive property of graph nodes, and the mixer graph decomposition property, as discussed above.

Figures 1, 8I:
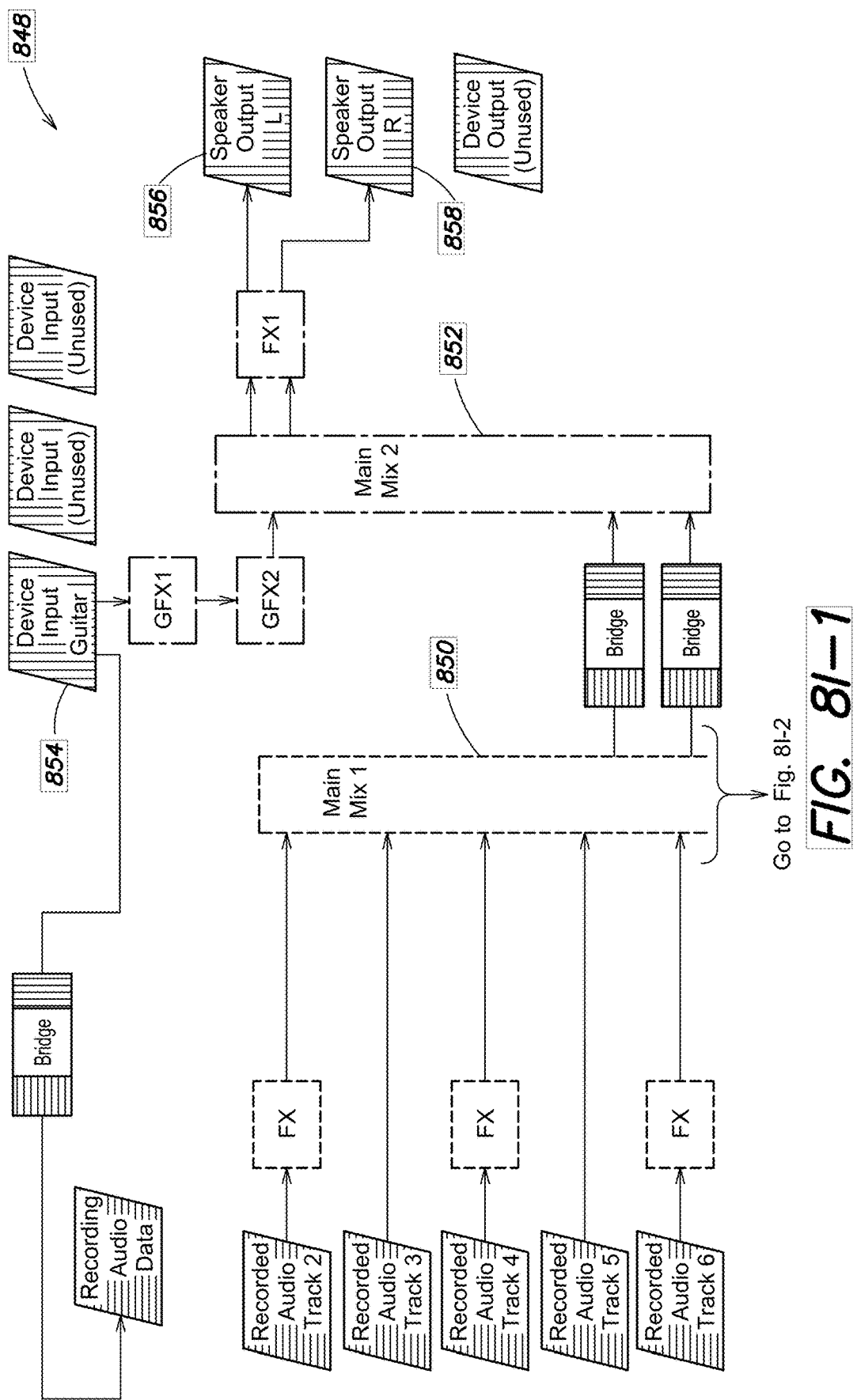
Figures 2, 8I:
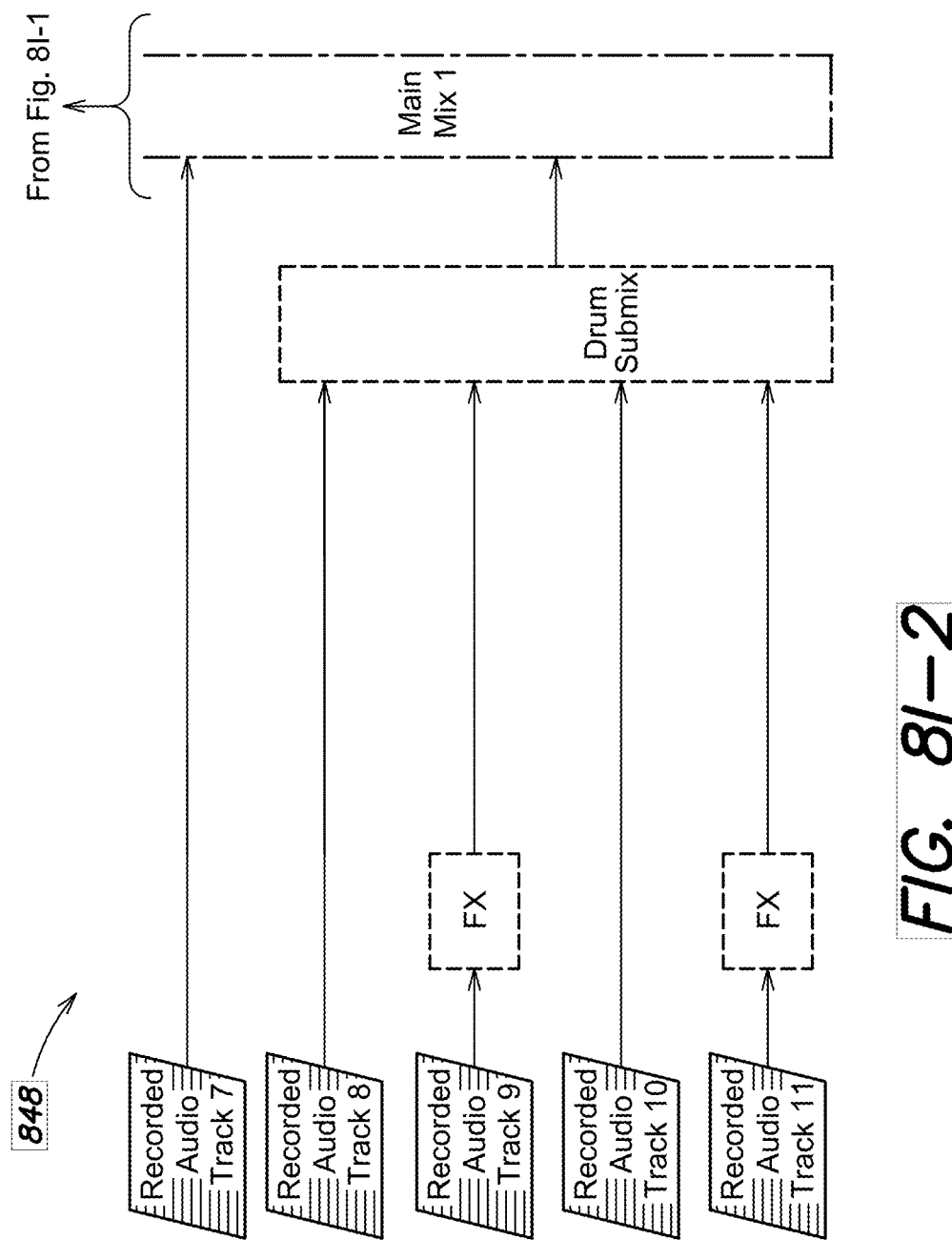

Signal graph 848 corresponding to the optimized configuration of FIG. 8H is shown in FIG. 8I. The automatic optimization allows the mixing stages to be spread across locales, as illustrated in the figure with main mix 1 850 assigned to locale 1, and main mix 2 852 assigned to locale 2. The number of inter-locale connections (bridges) is reduced from 11 in the solution of FIG. 8G to 3, while maintaining the low latency signal path between device input 854 connected to the guitar and device outputs 856 and 858.

A system employing the described optimization methods technique may be switched back and forth between the playback and live input monitoring scenarios described in this example with optimal configurations generated automatically for each scenario without requiring the user to manually reconfigure the system.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, video projection systems and other video output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen and tablet, touchscreen, camera, communication device, and data input devices. Inputs may include digital music instruments or acoustic instruments connected to computing systems via analog to digital converters. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of optimizing a property of an audio signal processing graph comprising a plurality of nodes, the method comprising:
   receiving information specifying:
      for each audio input node of the graph, a locale that includes the audio input node;
      for each audio output node of the graph, a locale that includes the audio output node; and
      for each processing node of the graph, one or more supported locales for the processing node, wherein each of the one or more supported locales for the processing node includes at least one of a hardware and a software module capable of performing audio processing required by the processing node;
   for each processing node of the graph for which the received information specifies a plurality of supported locales, automatically determining an optimal supported locale from among the plurality of supported locales for the node; and
   automatically recomposing the audio signal processing graph to assign each of the processing nodes for which the received information specifies a plurality of supported locales to the optimal supported locale for that node, wherein the assignment results in an audio signal processing graph that minimizes at least one of:
      a number of inter-locale connections required to connect the plurality of nodes of the graph; and a latency between a specified input node and a specified output node.

2. The method of claim 1, wherein determining the optimal supported locale for a given processing node includes:
   determining a locale of a node that is downstream from the given processing node; and
   if the locale of the node that is downstream from the given processing node supports the given processing node, determining that the optimal supported locale for the given processing node is the locale of the downstream node.

3. The method of claim 1, wherein determining the optimal supported locale for a given processing node includes:
   determining a locale of a node that is upstream from the given processing node; and
   if the locale of the node that is upstream from the given processing node supports the given processing node, determining that the optimal supported locale for the given processing node is the locale of the upstream node.

4. The method of claim 1, wherein:
   a plurality of nodes of the graph of a given type have an associative property; and
   the optimizing of the graph further comprises using the associative property to re-arrange a sequence of audio signal processing in the graph of nodes of the given type without changing an audio processing behavior of the graph.

5. The method of claim 1, wherein:
   a plurality of nodes of the graph of a given type have a commutative property; and
   the optimizing of the graph further comprises using the commutative property to change an order of audio signal processing in the graph of nodes of the given type without changing an audio processing behavior of the graph.

6. The method of claim 1, wherein:
   a plurality of nodes of the graph of a given type are decomposable into a subgraph of nodes; and
   the optimizing of the graph further comprises decomposing a node of the given type into sub-nodes without changing an audio processing behavior of the graph.

7. The method of claim 6, wherein the given type of node is a mixer node.

8. The method of claim 1, wherein the plurality of nodes of the graph includes a subgraph of nodes that can be recomposed as a single node of a given type; and
   the optimizing of the graph further comprises recomposing the subgraph as a single node of the given type without changing an audio processing behavior of the graph.

9. The method of claim 8, wherein the given type of node is a mixer node.

10. The method of claim 1, further comprising receiving information specifying a desired behavioral property for at least one signal path of the graph, and wherein the assignment of the processing nodes achieves the desired behavioral property.

11. The method of claim 10, wherein the desired behavioral property is a low latency between the specified input node and the specified output node.

12. The method of claim 1, wherein the assignment results in a number of inter-locale connections required to connect the plurality of nodes of the graph that is less than or equal to a number of inter-locale connections available for instantiation of the audio signal processing graph.

13. The method of claim 1 wherein:
   a first locale includes at least one audio input node of the graph;
   a second locale includes a live input node and a live output node of the graph; and
   the property of the graph that is optimized is a latency between the live input node and the live output node.

14. The method of claim 1, wherein:
   a first locale includes a plurality of audio input nodes connected to inputs of a mixer node that is supported at a plurality of locales;
   a second locale includes a live audio input node connected to an input of the mixer node and a live audio output node connected to an output of the mixer; and
   the automatic assignment of the mixer node includes:
      decomposing the mixer node into a first mixer stage node and a second mixer stage node;
      assigning the first mixer stage node stage to the first locale, wherein the plurality of audio inputs nodes in the first locale are connected to inputs of the first mixer stage node; and
      assigning the second mixer stage node to the second locale, wherein:
         the live audio input node and the output of the first mixer stage node are connected to inputs of the second mixer stage node; and
         the live audio output of the second mixer stage is connected to an output of the second mixer stage.

15. The method of claim 1, wherein a first supported locale includes a computing system hosting a digital audio workstation application and a second supported locale includes an audio processing device.

16. The method of claim 1, wherein each of a first supported locale and a second supported locale includes a general-purpose computing system.

17. The method of claim 1, wherein a first supported locale incudes a general-purpose computing system and one or more additional supported locales include a network of audio processing devices.

18. The method of claim 1, wherein a plurality of supported locales is implemented by a network of audio processing devices.

19. The method of claim 1, wherein the automatic determination of optimal supported locales and automatic assignment of processing nodes of the graph to optimal supported locales is performed by a controller software application hosted on a system that also performs audio processing for one or more nodes of the audio signal processing graph.

20. The method of claim 1, wherein the automatic determination of optimal supported locales and automatic assignment of processing nodes of the graph to optimal supported locales is performed by a controller software application hosted on a system in data communication with one or more a systems that performs audio processing for one or more nodes of the audio signal processing graph.

21. A computer program product comprising:
   a non-transitory computer-readable medium with computer program instructions encoded thereon, wherein the computer program instructions, when processed by a computer system instruct the computer system to optimize a property of an audio signal processing graph comprising a plurality of nodes, the optimization comprising:

receiving information specifying:
- for each audio input node of the graph, a locale that includes the audio input node;
- for each audio output node of the graph, a locale that includes the audio output node; and
- for each processing node of the graph, one or more supported locales for the processing node, wherein each of the one or more supported locales for the processing node includes at least one of a hardware and a software module capable of performing audio processing required by the processing node;

for each processing node of the graph for which the received information specifies a plurality of supported locales, automatically determining an optimal supported locale from among the plurality of supported locales for the node; and automatically recomposing the audio signal processing graph to assign each of the processing nodes for which the received information specifies a plurality of supported locales to the optimal supported locale for that node, wherein the assignment results in an audio signal processing graph that minimizes at least one of:
- a number of inter-locale connections required to connect the plurality of nodes of the graph; and
- a latency between a specified input node and a specified output node.

22. A system comprising:

a memory for storing computer-readable instructions; and a processor connected to the memory, wherein the processor, when executing the computer-readable instructions, causes the system to optimize a property of an audio signal processing graph comprising a plurality of nodes, the optimization comprising:

receiving information specifying:
- for each audio input node of the graph, a locale that includes the audio input node;
- for each audio output node of the graph, a locale that includes the audio output node; and
- for each processing node of the graph, one or more supported locales for the processing node, wherein each of the one or more supported locales for the processing node includes at least one of a hardware and a software module capable of performing audio processing required by the processing node;

for each processing node of the graph for which the received information specifies a plurality of supported locales, automatically determining an optimal supported locale from among the plurality of supported locales for the node; and automatically recomposing the audio signal processing graph to assign each of the processing nodes for which the received information specifies a plurality of supported locales to the optimal supported locale for that node, wherein the assignment results in an audio signal processing graph that minimizes at least one of:
- a number of inter-locale connections required to connect the plurality of nodes of the graph; and
- a latency between a specified input node and a specified output node.

23. A method of optimizing a property of an audio signal processing graph comprising a plurality of nodes, the method comprising:

receiving information specifying:
- for each audio input node of the graph, a locale that includes the audio input node;
- for each audio output node of the graph, a locale that includes the audio output node; and
- for each processing node of the graph, one or more supported locales for the processing node, wherein a locale that is supported for the processing node includes at least one of a hardware and a software module capable of performing audio processing required by the processing node;

for each unassigned processing node of the graph for which the received information specifies a processing node that is supported by both a first locale that includes a general-purpose computing system hosting a DAW application and a second locale that includes an audio processing device, automatically determining an optimal one of the first and second locales to which the node is to be assigned in order to optimize the property of the graph; and automatically recomposing the audio signal processing graph to assign each of the unassigned processing nodes to their respective optimal nodes, wherein the assignment results in an audio signal processing graph that is optimized for at least one of:
- a latency between a specified input node and a specified output node; and
- a number of inter-locale connections required to connect the plurality of nodes of the graph.

24. The method of claim 23, wherein an unassigned processing node of the graph is a mixer node.

25. The method of claim 24, further comprising decomposing the mixer node into a first mixer stage node and a second mixer stage node, and automatically assigning the first mixer stage node to the first locale and the second mixer stage node to the second locale.

\* \* \* \* \*